(12) United States Patent
Mukawa

(10) Patent No.: US 10,642,040 B2
(45) Date of Patent: May 5, 2020

(54) DISPLAY APPARATUS AND OPTICAL APPARATUS

(71) Applicant: Sony Corporation, Tokyo (JP)

(72) Inventor: Hiroshi Mukawa, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/640,437

(22) Filed: Mar. 6, 2015

(65) Prior Publication Data

US 2015/0260995 A1 Sep. 17, 2015

(30) Foreign Application Priority Data

Mar. 17, 2014 (JP) ................. 2014-053191

(51) Int. Cl.
| | |
|---|---|
| *G02B 27/01* | (2006.01) |
| *G09G 5/10* | (2006.01) |
| *G02B 27/14* | (2006.01) |
| *G02B 5/32* | (2006.01) |
| *F21V 8/00* | (2006.01) |

(52) U.S. Cl.
CPC .......... *G02B 27/0172* (2013.01); *G09G 5/10* (2013.01); *G02B 27/144* (2013.01); *G02B 2027/0118* (2013.01); *G02B 2027/0132* (2013.01); *G02B 2027/0178* (2013.01); *G09G 2320/0626* (2013.01); *G09G 2360/144* (2013.01)

(58) Field of Classification Search
CPC ...... G09G 5/10; G09G 5/00; G09G 2360/144; G02B 2027/0132; G02B 27/0172; G02B 2027/0118; G02B 27/144; G02B 2027/0178

USPC ............................................ 345/8
See application file for complete search history.

(56) References Cited

U.S. PATENT DOCUMENTS

| | | | |
|---|---|---|---|
| 6,137,457 A | 10/2000 | Tokuhashi et al. | |
| 6,504,588 B1 | 1/2003 | Kaneko | |
| 7,924,506 B2 | 4/2011 | Rieger | |
| 8,411,134 B2 | 4/2013 | Tomita | |
| 8,570,242 B2 | 10/2013 | Chosokabe et al. | |
| 8,797,433 B2 | 8/2014 | Kaizu et al. | |
| 8,861,090 B2 | 10/2014 | Mukawa | |
| 8,907,865 B2 | 12/2014 | Miyawaki et al. | |

(Continued)

FOREIGN PATENT DOCUMENTS

| | | |
|---|---|---|
| CN | 1071262 A | 4/1993 |
| CN | 1774661 A | 5/2006 |

(Continued)

OTHER PUBLICATIONS

Keller et al., Head mounted Displays for Medical Use. J Disp Tech. Dec. 1, 2008;4(4):468-72.

(Continued)

*Primary Examiner* — Chineyere D Wills-Burns
(74) *Attorney, Agent, or Firm* — Wolf, Greenfield & Sacks, P.C.

(57) ABSTRACT

A display apparatus includes a frame, an image display device, and a dimming device. The frame is mounted onto a head of an observer. The image display device is attached to the frame. The dimming device is configured to adjust the amount of outside light that comes from the outside. Light transmittance of a partial area of the dimming device is changed based on a signal for displaying an image on the image display device.

21 Claims, 35 Drawing Sheets

(56) References Cited

U.S. PATENT DOCUMENTS

| | | | |
|---|---|---|---|
| 8,976,453 B2 | 3/2015 | Akutsu et al. | |
| 8,988,315 B2 | 3/2015 | Mukawa et al. | |
| 9,016,864 B2 | 4/2015 | Sasazaki et al. | |
| 9,096,920 B1 | 8/2015 | Gomez et al. | |
| 9,164,221 B2 | 10/2015 | Akutsu et al. | |
| 9,201,242 B2 | 12/2015 | Miyawaki et al. | |
| 9,311,752 B2 | 4/2016 | Chosokabe et al. | |
| 9,451,244 B2 | 9/2016 | Sasazaki et al. | |
| 9,488,846 B2 | 11/2016 | Hayashi | |
| 9,558,540 B2 | 1/2017 | Mukawa | |
| 9,569,897 B2 | 2/2017 | Miyawaki et al. | |
| 9,658,456 B2 | 5/2017 | Mukawa | |
| 9,709,809 B2 | 7/2017 | Miyawaki et al. | |
| 9,753,284 B2 | 9/2017 | Machida et al. | |
| 9,759,920 B2 | 9/2017 | Akutsu et al. | |
| 9,766,453 B2 | 9/2017 | Mukawa | |
| 9,791,701 B2 | 10/2017 | Ato et al. | |
| 9,899,000 B2 | 2/2018 | Takahota et al. | |
| 9,933,621 B2 | 4/2018 | Hirano et al. | |
| 9,952,435 B2 | 4/2018 | Tanaka et al. | |
| 9,972,135 B2 | 5/2018 | Mukawa | |
| 10,018,846 B2 | 7/2018 | Machida et al. | |
| 10,302,946 B2 | 5/2019 | Aiki | |
| 10,338,388 B2 | 7/2019 | Hirano et al. | |
| 10,477,174 B2 | 11/2019 | Mukawa | |
| 2002/0101166 A1 | 8/2002 | Weindorf et al. | |
| 2003/0184692 A1 | 10/2003 | Nagae | |
| 2005/0051708 A1 | 3/2005 | Hotelling | |
| 2006/0228073 A1 | 10/2006 | Mukawa et al. | |
| 2007/0012925 A1 | 1/2007 | Hong et al. | |
| 2007/0040780 A1* | 2/2007 | Gass | G02F 1/134363 345/87 |
| 2007/0070859 A1 | 3/2007 | Hirayama | |
| 2007/0091445 A1 | 4/2007 | Amitai | |
| 2007/0159673 A1 | 7/2007 | Freeman et al. | |
| 2008/0007807 A1* | 1/2008 | Yamada | H04N 1/3871 358/540 |
| 2008/0111833 A1 | 5/2008 | Thorn et al. | |
| 2008/0239424 A1 | 10/2008 | Mukawa et al. | |
| 2008/0285140 A1 | 11/2008 | Amitai | |
| 2009/0015740 A1* | 1/2009 | Sagitov | B60J 3/04 349/16 |
| 2009/0244457 A1 | 10/2009 | Onishi et al. | |
| 2009/0295705 A1* | 12/2009 | Chen | G09G 3/3406 345/102 |
| 2010/0110368 A1 | 5/2010 | Chaum | |
| 2010/0128107 A1 | 5/2010 | Tomita | |
| 2010/0220295 A1 | 9/2010 | Mukawa et al. | |
| 2010/0277687 A1 | 11/2010 | Shehadeh et al. | |
| 2010/0302499 A1 | 12/2010 | Watanabe | |
| 2010/0321409 A1 | 12/2010 | Komori et al. | |
| 2011/0050727 A1 | 3/2011 | Mukawa | |
| 2011/0090389 A1 | 4/2011 | Saito | |
| 2011/0241975 A1 | 10/2011 | Mukawa et al. | |
| 2011/0248904 A1 | 10/2011 | Miyawaki et al. | |
| 2011/0248905 A1 | 10/2011 | Chosokabe et al. | |
| 2012/0044571 A1 | 2/2012 | Mukawa | |
| 2012/0119978 A1* | 5/2012 | Border | G02B 27/0172 345/8 |
| 2012/0127434 A1 | 5/2012 | Sasazaki et al. | |
| 2012/0194420 A1 | 8/2012 | Osterhout et al. | |
| 2012/0212398 A1* | 8/2012 | Border | G06F 3/017 345/8 |
| 2012/0218426 A1 | 8/2012 | Kaizu et al. | |
| 2012/0249895 A1* | 10/2012 | Kaifu | H04N 5/238 349/1 |
| 2012/0297014 A1 | 11/2012 | Lahcanski | |
| 2012/0306940 A1 | 12/2012 | Machida et al. | |
| 2012/0320100 A1* | 12/2012 | Machida | G02B 27/017 345/690 |
| 2013/0050432 A1 | 2/2013 | Perez et al. | |
| 2013/0113973 A1 | 5/2013 | Miao | |
| 2013/0128611 A1 | 5/2013 | Akutsu et al. | |
| 2013/0135749 A1 | 5/2013 | Akutsu et al. | |
| 2013/0241948 A1 | 9/2013 | Kimura | |
| 2013/0242555 A1 | 9/2013 | Mukawa | |
| 2013/0257691 A1 | 10/2013 | Saito | |
| 2013/0300766 A1 | 11/2013 | Mukawa | |
| 2014/0022284 A1 | 1/2014 | Chosokabe et al. | |
| 2014/0253605 A1* | 9/2014 | Border | G02B 27/0172 345/690 |
| 2014/0334010 A1 | 11/2014 | Mukawa | |
| 2014/0340286 A1* | 11/2014 | Machida | G02B 26/0833 345/8 |
| 2014/0340550 A1 | 11/2014 | Kaizu et al. | |
| 2014/0347252 A1 | 11/2014 | Miyawaki et al. | |
| 2015/0062699 A1 | 3/2015 | Hayashi | |
| 2015/0109679 A1 | 4/2015 | Mukawa et al. | |
| 2015/0138647 A1 | 5/2015 | Akutsu et al. | |
| 2015/0192835 A1* | 7/2015 | Kim | G09G 3/3208 345/589 |
| 2015/0226970 A1 | 8/2015 | Mukawa | |
| 2015/0229897 A1 | 8/2015 | Mukawa | |
| 2015/0235620 A1 | 8/2015 | Takahota et al. | |
| 2015/0260994 A1 | 9/2015 | Akutsu et al. | |
| 2015/0269784 A1 | 9/2015 | Miyawaki et al. | |
| 2015/0277125 A1 | 10/2015 | Hirano et al. | |
| 2015/0277126 A1 | 10/2015 | Hirano et al. | |
| 2015/0288954 A1 | 10/2015 | Sasazaki et al. | |
| 2015/0338660 A1 | 11/2015 | Mukawa | |
| 2015/0346494 A1 | 12/2015 | Tanaka et al. | |
| 2015/0362735 A1 | 12/2015 | Akutsu et al. | |
| 2015/0370075 A1 | 12/2015 | Ato et al. | |
| 2016/0041394 A1 | 2/2016 | Tanaka et al. | |
| 2016/0062123 A1 | 3/2016 | Tanaka et al. | |
| 2016/0097931 A1 | 4/2016 | Takahota et al. | |
| 2016/0147069 A1 | 5/2016 | Tanaka et al. | |
| 2016/0154243 A1 | 6/2016 | Aiki | |
| 2016/0337570 A1* | 11/2016 | Tan | G06F 3/14 |
| 2017/0069140 A1 | 3/2017 | Mukawa | |
| 2017/0115492 A1 | 4/2017 | Miyawaki et al. | |
| 2017/0184857 A1 | 6/2017 | Ato et al. | |
| 2017/0322420 A1 | 11/2017 | Machida et al. | |
| 2018/0136472 A1 | 5/2018 | Tanaka et al. | |
| 2018/0211449 A1 | 7/2018 | Mukawa | |

FOREIGN PATENT DOCUMENTS

| | | |
|---|---|---|
| CN | 1957269 A | 2/2007 |
| CN | 101141568 A | 3/2008 |
| CN | 103119512 A | 5/2013 |
| CN | 103364953 A | 10/2013 |
| CN | 103389580 A | 11/2013 |
| EP | 1 731 943 A1 | 12/2006 |
| EP | 1 748 305 A1 | 1/2007 |
| EP | 2 535 760 A2 | 12/2012 |
| EP | 2662723 A1 | 11/2013 |
| JP | 57-026822 A | 2/1982 |
| JP | 01-188826 A | 7/1989 |
| JP | 02-004212 A | 1/1990 |
| JP | 08-160340 A | 6/1996 |
| JP | 08-160344 A | 6/1996 |
| JP | 10-126711 A | 5/1998 |
| JP | 10-319240 A | 12/1998 |
| JP | 2000-171750 A | 6/2000 |
| JP | 2003-015075 | 1/2003 |
| JP | 2004-101197 A | 4/2004 |
| JP | 2005-172851 A | 6/2005 |
| JP | 2005-308889 A | 11/2005 |
| JP | 2006-162767 A | 6/2006 |
| JP | 2006-209144 A | 8/2006 |
| JP | 2006-267887 A | 10/2006 |
| JP | 2006-308858 | 11/2006 |
| JP | 2006-343747 | 12/2006 |
| JP | 2007-094175 A | 4/2007 |
| JP | 2007-264324 A | 10/2007 |
| JP | 2008-085548 A | 4/2008 |
| JP | 2008-103916 A | 5/2008 |
| JP | 2009-104170 | 5/2009 |
| JP | 2009-145513 A | 7/2009 |
| JP | 2009-251428 A | 10/2009 |
| JP | 2009-284175 A | 12/2009 |
| JP | 2010-145674 A | 7/2010 |

(56) References Cited

FOREIGN PATENT DOCUMENTS

| | | |
|---|---|---|
| JP | 2010-282231 A | 12/2010 |
| JP | 2011-209732 A | 10/2011 |
| JP | 2012-013940 | 1/2012 |
| JP | 2012-088472 A | 5/2012 |
| JP | 2012-252091 A | 12/2012 |
| JP | 2013-005201 A | 1/2013 |
| JP | 2013-122519 A | 6/2013 |
| JP | 2013-210643 A | 10/2013 |
| JP | 2013-214856 A | 10/2013 |
| WO | WO 2005/093493 | 10/2005 |
| WO | WO 2006/085310 A1 | 8/2006 |
| WO | WO 2008/078320 A2 | 7/2008 |
| WO | WO 2010/087293 A1 | 8/2010 |
| WO | WO-2013111471 A1 * | 8/2013 ......... G02B 26/0833 |
| WO | WO-2013333471 A1 * | 8/2013 ......... G02B 26/0833 |

OTHER PUBLICATIONS

Chinese Office Action and English Translation thereof dated Apr. 10, 20125 in connection with Chinese Application No. 2015101053674.

Chinese Office Action and English Translation thereof dated Sep. 5, 2018 in connection with Chinese Application No. 2015101053674.

European Communication Pursuant to Article 94(3) EPC dated Sep. 27, 2018 in connection with European Application No. 15 152 708.2.

Extended European Search Report dated Mar. 4, 2016 in connection with European Application No. 12866948.8.

Chinese Office Action dated Dec. 3, 2015 and English translation thereof in connection with Chinese Application No. 201280067360.2.

Chinese Office Action and English Translation thereof dated Feb. 24, 2016 in connection with Chinese Application No. 201310157754.3.

Chinese Office Action and English Translation thereof dated May 18, 2017 in connection with Chinese Application No. 201310157754.3.

Extended European Search Report, dated Aug. 5, 2013 in connection with European Application No. 13002324.5.

Partial European Search Report dated Sep. 2, 2015 in connection with European Application No. 15152708.2.

Extended European Search Report dated Dec. 8, 2015 in connection with European Application No. 15152708.2.

Extended European Search Report dated Nov. 28, 2018 in connection with European Application No. 18189233.2.

International Search Report and Written Opinion dated Jan. 15, 2013 in connection with Application No. PCT/JP2012/082461.

International Search Report and Written Opinion dated Mar. 24, 2014 in connection with Application No. PCT/JP2014/000338.

International Preliminary Report on Patentability dated Aug. 7, 2014 in connection with Application No. PCT/JP2012/082461.

International Preliminary Report on Patentability dated Sep. 3, 2015 in connection with Application No. PCT/JP2014/000338.

Japanese Office Action dated Aug. 8, 2017 in connection with Japanese Application No. 2014-053191 and English translation thereof.

* cited by examiner

DISPLAY APPARATUS AND OPTICAL APPARATUS

CROSS REFERENCE TO RELATED APPLICATIONS

This application claims the benefit of Japanese Priority Patent Application JP 2014-053191 filed Mar. 17, 2014, the entire contents of which are incorporated herein by reference.

BACKGROUND

The present disclosure relates to a display apparatus. More particularly, the present disclosure relates to a display apparatus including a dimming device and being used as a head mounted display (HMD), for example, or to an optical apparatus including a dimming device.

A display apparatus used as a head mounted display is publicly known based on Japanese Patent Application Laid-open No. 2006-209144, for example. This display apparatus in the form of eyeglasses includes, on temples thereof, a reception unit configured to receive an image signal transmitted from an image information transmission source, a drive unit configured to decode the image signal received in the reception unit, a display unit configured to display an image obtained by decoding in the drive unit, and a power supply unit configured to supply power to the reception unit, the drive unit, and the display unit. The display unit includes a display including an image output device, an optical member, and a Lippman-Bragg volume hologram sheet.

Additionally, an imaging device is well known, which images the outside using a compact imaging device attached to eyeglasses.

SUMMARY

In general, an area where an image is displayed on the display apparatus described above is set beyond the viewing field of an observer. So, depending on the environment where the display apparatus is provided, it may be difficult for the observer to immediately recognize that an image is displayed or to immediately recognize that an image is to be displayed. Further, it may be difficult for the observer to easily, reliably, and immediately recognize which part of the outside is imaged by the compact imaging device attached to the eyeglasses.

So, firstly, it is desirable to provide a display apparatus having a configuration or a structure that allows an observer to immediately recognize that an image is displayed or allows the observer to recognize that an image is to be displayed. Secondly, it is desirable to provide an optical apparatus having a configuration or a structure that allows the observer to easily, reliably, and immediately recognize which part of the outside is imaged by an imaging device attached to eyeglasses or the like. Thirdly, it is desirable to provide an optical apparatus having a configuration or a structure that allows the observer to easily, reliably, and immediately recognize that a receiving device receives a signal.

According to an embodiment of the present disclosure, there is provided a display apparatus including: a frame mounted onto a head of an observer; an image display device attached to the frame; and a dimming device configured to adjust the amount of outside light that comes from the outside, light transmittance of a partial area of the dimming device being changed based on a signal for displaying an image on the image display device.

According to a first embodiment of the present disclosure, there is provided an optical apparatus including: a frame mounted onto a head of an observer; an imaging device attached to the frame; and a dimming device attached to the frame and configured to adjust the amount of outside light that comes from the outside, a spatial area imaged by the imaging device being displayed on the dimming device.

According to a second embodiment of the present disclosure, there is provided an optical apparatus including: a frame mounted onto a head of an observer; a receiving device; and a dimming device attached to the frame and configured to adjust the amount of outside light that comes from the outside, light transmittance of the dimming device being changed based on a signal received by the receiving device.

The display apparatus according to the embodiment of the present disclosure and the optical apparatuses according to the first and second embodiments of the present disclosure each include the dimming device configured to adjust the amount of outside light that comes from the outside, so that the amount of outside light that comes from the outside can be adequately controlled (can be reduced, for example) by the dimming device. So, for example, in the display apparatus according to the embodiment of present disclosure, an image may be recognized well in the image display device without being disturbed by outside light. In the display apparatus according to the embodiment of the present disclosure, the light transmittance of the partial area of the dimming device is changed based on a signal for displaying an image on the image display device. This allows an observer to easily, reliably, and immediately recognize that an image is displayed. Alternatively, this allows the observer to easily and reliably recognize that an image is to be displayed. Additionally, in the optical apparatus according to the first embodiment of the present disclosure, a spatial area imaged by the imaging device is displayed on the dimming device. This allows the observer to easily, reliably, and immediately recognize which part of the outside is imaged by the imaging device. Furthermore, in the optical apparatus according to the second embodiment of the present disclosure, light transmittance of the dimming device is changed based on a signal received by the receiving device. This allows the observer to easily, reliably, and immediately recognize that the receiving device receives a signal. It should be noted that the effects described herein are merely exemplary ones and are not limited. Further, additional effects may be produced.

These and other objects, features and advantages of the present disclosure will become more apparent in light of the following detailed description of best mode embodiments thereof, as illustrated in the accompanying drawings.

DETAILED DESCRIPTION OF EMBODIMENTS

Figure 1:
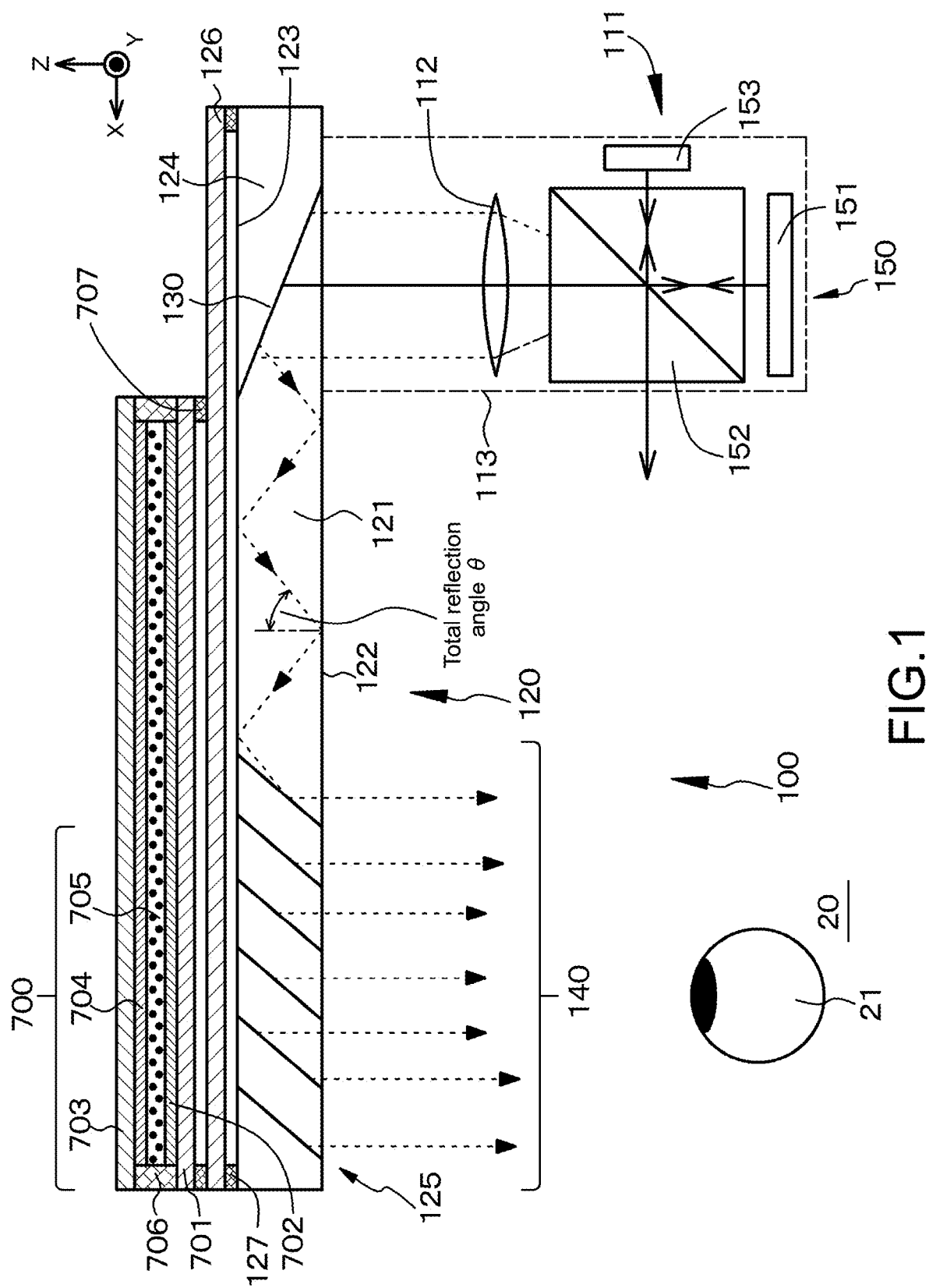
FIG. 1 is a conceptual diagram of an image display device in a display apparatus of Embodiment 1.

Hereinafter, the present disclosure will be described based on embodiments with reference to the drawings but is not limited to the embodiments. Various numerical values and materials in the embodiments are merely exemplary ones. It should be noted that the description is given in the following order.

1. Display Apparatus According to Embodiment of Present Disclosure, Optical Apparatuses According to First and Second Embodiments of Present Disclosure, and Overall Description 2. Embodiment 1 (Display Apparatus According to Embodiment of Present Disclosure and Optical Apparatus According to Second Embodiment of Present Disclosure)

3. Embodiment 2 (Display Apparatus in Modification of Embodiment 1)

4. Embodiment 3 (Display Apparatus in Another Modification of Embodiment 1)

5. Embodiment 4 (Display Apparatus in Still Another Modification of Embodiment 1)

6. Embodiment 5 (Modification of Embodiments 1 to 4)

7. Embodiment 6 (Another Modification of Embodiments 1 to 4)

8. Embodiment 7 (Still Another Modification of Embodiments 1 to 4)

9. Embodiment 8 (Modification of Embodiments 1 to 7)

10. Embodiment 9 (Modification of Embodiment 8)

11. Embodiment 10 (Another Modification of Embodiment 8)

12. Embodiment 11 (Modification of Embodiments 8 to 10)

13. Embodiment 12 (Modification of Embodiment 11)

14. Embodiment 13 (Modification of Embodiments 1 to 12)

15. Embodiment 14 (Modification of Embodiment 13)

16. Embodiment 15 (Optical Apparatus According to First Embodiment of Present Disclosure) and Others

[Display Apparatus According to Embodiment of Present Disclosure, Optical Apparatuses According to First and Second Embodiments of Present Disclosure, and Overall Description]

In a display apparatus according to an embodiment of the present disclosure, an image display device may include (A) an image forming unit, and (B) a light guide unit configured to input, guide, and output light that is output from the image forming unit. In this case, the light guide unit may include (a) a light guide plate configured to output light after input light is propagated inside the light guide plate by total reflection, (b) a first deflection unit configured to deflect at least part of the light input to the light guide plate, to totally reflect the light input to the light guide plate inside the light guide plate, and (c) a second deflection unit configured to deflect the light propagated inside the light guide plate by total reflection, to output, from the light guide plate, the light propagated inside the light guide plate by total reflection. Herein, the term "total reflection" means internal total reflection or total reflection caused inside the light guide plate. The same holds true for the following description.

The light guide unit may be transmissive or semi-transmissive (see-through). Specifically, a portion of the light guide unit, which is opposed to at least the pupil of an observer, can be made transmissive or semi-transmissive (see-through), and a landscape can be viewed through the part of the light guide unit. The display apparatus according to the embodiment of the present disclosure may include one image display device (monocular type) or two image display devices (binocular type). In the binocular type, based on a signal for displaying an image, light transmittance of a partial area of a dimming device may be changed in the both of the image display devices, or light transmittance of a partial area of the dimming device may be changed in one of the image display devices.

In this specification, the term "semi-transmissive" is used in some cases. This term is used in not a meaning that ½ (50%) of incident light is transmitted or reflected, but a meaning that part of incident light is transmitted and the rest is reflected.

In the display apparatus according to the embodiment of the present disclosure including the desirable form described above, the signal for displaying an image on the image display device may be received from the outside. In such a form, information or data on an image displayed on the image display device may be recorded, stored, and saved in a so-called cloud computer or server, for example. When the display apparatus includes a communication unit, for example, a mobile telephone or a smartphone, or when the display apparatus is combined with the communication unit, various types of information or data may be transmitted and received or exchanged between the cloud computer or server and the display apparatus. Further, a signal based on various types of information or data, that is, a signal for displaying an image on the image display device may be received. Alternatively, a signal for displaying an image on the image display device may be stored in the image display device. It should be noted that an image displayed on the image display device includes various types of information or data.

Further, the display apparatus according to the embodiment of the present disclosure including the various desirable forms described above may further include a sensor configured to measure the brightness in the outside environment, and light transmittance of a partial area of the dimming device may be changed based on a measurement result of the brightness in the outside environment obtained by the sensor. The sensor may be formed of a well-known illumination sensor, and the control of the sensor may be performed based on a well-known control circuit provided to the image display device. Each of the optical apparatuses according to the first and second embodiments of the present disclosure may also include a sensor configured to measure the brightness in the outside environment, and light transmittance of a partial area of the dimming device may be changed based on a measurement result of the brightness in the outside environment obtained by the sensor.

Further, in the display apparatus according to the embodiment of the present disclosure including the various desirable forms described above, the dimming device may be attached to the image display device or to a frame. In the case where the image display device includes a light guide plate as described above, the dimming device may be attached to the light guide plate. More specifically, for example, the dimming device may be disposed on a different surface (opposed surface) of the side (surface) on which the image forming unit of the light guide unit is disposed.

In the optical apparatus according to the first embodiment of the present disclosure, the outer edge of a spatial area imaged by an imaging device may be displayed in the form of a frame in the dimming device. Alternatively, light transmittance of an area of the dimming device that corresponds to the spatial area imaged by the imaging device may be made lower than light transmittance of an area of the dimming device that corresponds to the outside of the spatial area imaged by the imaging device. In such a form, the observer sees the spatial area imaged by the imaging device as an area darker than the outside of the spatial area imaged by the imaging device. Alternatively, the light transmittance of the area of the dimming device, the area corresponding to the spatial area imaged by the imaging device, may be made higher than the light transmittance of an area of the dimming device, the area corresponding to the outside of the spatial area imaged by the imaging device. In such a form, the observer sees the spatial area imaged by the imaging device as an area brighter than the outside of the spatial area imaged by the imaging device.

Further, the optical apparatus according to the first embodiment of the present disclosure including various desirable forms described above may further include a dimming-device-controlling device, and a position of an area of the dimming device that corresponds to the spatial area imaged by the imaging device may be corrected by the dimming-device-controlling device. Specifically, when the optical apparatus according to the first embodiment of the present disclosure includes a mobile phone or a smartphone, for example, or when the optical apparatus is combined with a mobile phone, a smartphone, or a personal computer, the spatial area imaged by the imaging device may be displayed on the mobile phone, the smartphone, or the personal computer. In the case where there is a difference between the spatial area displayed on the mobile phone, the smartphone, or the personal computer and the area of the dimming device that corresponds to the spatial area imaged by the imaging device, the area of the dimming device that corresponds to the spatial area imaged by the imaging device is moved/turned or enlarged/contracted using the dimming-device-controlling device, which can be substituted by the mobile phone, the smartphone, or the personal computer. Thus, the difference between the spatial area displayed on the mobile phone, the smartphone, or the personal computer and the area of the dimming device that corresponds to the spatial area imaged by the imaging device may be eliminated.

The display apparatus according to the embodiment of the present disclosure and the optical apparatus according to the first embodiment of the present disclosure including the various desirable forms described above may be combined with each other. The display apparatus according to the embodiment of the present disclosure and the optical apparatus according to the second embodiment of the present disclosure including the various desirable forms described above may be combined with each other. The optical apparatus according to the first embodiment of the present disclosure and the optical apparatus according to the second embodiment of the present disclosure including the various desirable forms described above may be combined with each other. The display apparatus according to the embodiment of the present disclosure, the optical apparatus according to the first embodiment of the present disclosure, and the optical apparatus according to the second embodiment of the present disclosure including the various desirable forms described above may be combined with one another.

In the display apparatus according to the embodiment of the present disclosure, a dimming device may include a first substrate and a second substrate, the first substrate being opposed to a light guide unit, the second substrate being opposed to the first substrate, a first electrode and a second electrode provided to the first substrate and the second substrate, respectively, and a light-transmission control material layer sealed between the first substrate and the second substrate. The first substrate may also serve as a constituent member of the light guide unit. Such a configuration is referred to as a "display apparatus according to a first embodiment of the present disclosure" for convenience sake. In the display apparatus according to the first embodiment of the present disclosure, the first substrate that forms the dimming device also serves as a constituent member of the light guide unit in such a manner. This reduces the total weight of the display apparatus so that this does not give discomfort to a user of the display apparatus. It should be noted that the second substrate may be formed to be thinner than the first substrate.

Further, the dimming device of the optical apparatus according to each of the first and second embodiments of the present disclosure may include a first substrate, a second substrate opposed to the first substrate, a first electrode and a second electrode provided to the first substrate and the second substrate, respectively, and a light-transmission control material layer sealed between the first substrate and the second substrate. At least one of the first substrate and the second substrate may be attached to a frame, for example.

In the dimming device, the light-transmission control material layer may be an optical shutter formed of a liquid crystal material layer, or may be an optical shutter formed of an inorganic EL (electroluminescence) material layer. However, this is not restrictive, and the optical shutter for use in the dimming device may also be an optical shutter configured by an electrophoretic dispersion liquid including a large number of electrically-charged electrophoretic particles and a dispersion medium colored differently from the electrophoretic particles, an optical shutter configured by application of electrodeposition/dissociation that occurs in response to the reversible oxidation reduction of metal, e.g., silver particles, an optical shutter configured by utilizing color change of substance that occurs in response to the oxidation reduction of an electrochromic material, or an optical shutter configured by controlling the light transmittance by electrowetting. When the dimming device includes the light-transmission control material layer that is an optical shutter formed of a liquid crystal material layer, the material for the light-transmission control material layer may be TN (Twisted Nematic) liquid crystal, or STN (Super Twisted Nematic) liquid crystal, for example, but this is not restrictive. When the dimming device includes the light-transmission control material layer that is an optical shutter formed of an inorganic EL material layer, the material for the light-transmission control material layer may be tungsten oxide ($WO_3$), for example, but this is not restrictive. In the display apparatus according to the embodiment of the present disclosure, desirably, the light guide unit and the dimming device are disposed in this order from the observer's side, but this order may be reversed.

The material of the first and second substrates is specifically exemplified by a transparent glass substrate including soda lime glass and super white glass, a plastic substrate, a plastic sheet, and a plastic film. Herein, the plastic material is exemplified by polyethylene terephthalate, polyethylene naphthalate, polycarbonate, cellulose ester such as acetylcellulose, fluorinated polymer such as copolymer of polyvinylidene difluoride or polytetrafluoroethylene and hexafluoropropene, polyether such as polyoxymethylene, polyacetal, polystyrene, polyethylene, polypropylene, polyolefin such as methylpentene polymer, polyimide including polyamideimide or polyetherimide, polyamide, polyethersulfone, polyphenylene sulfide, polyvinylidene difluoride, tetraacetyl cellulose, bromphenoxy, polyarylate, polysulfone, and the like. The plastic sheet and the plastic film may be rigid not to be easily bent, or may be flexible. When the first and second substrates are each formed of a transparent plastic substrate, the inner surface of the substrate may be provided with a barrier layer made of an inorganic or organic material.

The first and second substrates are provided with first and second electrodes, respectively, e.g., so-called transparent electrodes. Specifically, the first and second electrodes are each made of indium tin oxide (ITO, including Sn-doped $In_2O_3$, crystalline ITO, and amorphous ITO), fluorine doped $SnO_2$ (FTO), IFO (F-doped $In_2O_3$), antimony doped $SnO_2$ (ATO), $SnO_2$, ZnO (including Al-doped ZnO and B-doped ZnO), indium zinc oxide (IZO), spinel oxide, oxide with $YbFe_2O_4$ structure, or conductive polymers including polyaniline, polypyrrole, and polythiophene, for example, but these are not restrictive, or a combination of two or more of them is also possible. The first and second electrodes may be each formed by physical vapor deposition (PVD) such as vacuum deposition and sputtering, various types of chemical vapor deposition (CVD), or various types of coating, for example. Patterning of the electrodes may be arbitrarily performed by etching, lifting off, or using various types of masks.

The first and second substrates are bonded together by being sealed at outer edge portions using a sealing agent. The sealing agent for use may be various types of resin including thermosetting resin, light curing resin, moisture curing resin, and anaerobic curing resin, e.g., epoxy resin, urethane resin, acrylic resin, vinyl acetate resin, enethiol resin, silicone resin, and modified polymer resin.

In some cases, light passing through the dimming device may be colored thereby in a desired color. In this case, the color selected by the dimming device may be variable or fixed. In the former case, for example, the dimming device may be a laminate of a dimming device colored in red, a dimming device colored in green, and a dimming device colored in blue. In the latter case, a color to be selected by the dimming device is not restrictive but may be brown, for example.

In some cases, the dimming device may be detachably disposed. In order to detachably dispose the dimming device, for example, the dimming device may be attached to the frame by using a screw made of transparent plastic, by forming a groove to the frame for engagement of the dimming device, or by providing a magnet to the frame. The frame may be also provided with a slide section to slide the dimming device thereinto. The dimming device may be provided with a connector for electrical connection to a control circuit via this connector and a wire. This control circuit is for controlling the light transmittance of the dimming device, and is provided in the control device for controlling the image forming unit, for example. The dimming device may be bent.

In the display apparatus according to the embodiment of the present disclosure, a light shielding member may be provided to an area of the light guide unit where light output from the image forming unit is input. This light shielding member is for shielding the light guide unit from outside light. Such a configuration is referred to as a "display apparatus according to a second embodiment of the present disclosure" for convenience sake. In the display apparatus according to the second embodiment of the present disclosure, with the light shielding member being provided to the area of the light guide unit where light output from the image forming unit is input, the light shielding member shielding the light guide unit from the outside light, even if the operation of the dimming device causes a change in the amount of incoming outside light, this does not cause degradation in image quality on the display apparatus with no undesired stray light because no outside light enters the area of the light guide unit where light output from the image forming unit is input in the first place. It should be noted that the area of the light guide unit where light output from the image forming unit is input is desirably included in the projection image of the light shielding member toward the light guide unit.

The light shielding member may be provided to the light guide unit on the side not provided with the image forming unit, and is provided with a distance from the light guide unit. In the display apparatus having such a configuration, the light shielding member may be made of a non-transparent plastic material, for example. Such a light shielding member may be integrally extended from the casing of the image display device or may be attached to the casing of the image display device. Alternatively, the light shielding member may be integrally extended from the frame or may be attached to the frame. Alternatively, the light shielding member may be disposed at a portion of the light guide unit, on the side not provided with the image forming unit, or may be provided to the dimming device. It should be noted that the light shielding member made of a non-transparent material may be formed on, for example, the surface of the light guide unit by physical vapor deposition (PVD) or chemical vapor deposition (CVD), by printing, or by attaching thereto a film, a sheet, or a foil made of a non-transparent material, e.g., plastic material, metal material, or alloy material. The projection image of the end of the dimming device toward the light guide unit is desirably included in the projection image of the light shielding member toward the light guide unit.

In the display apparatus according to the embodiment of the present disclosure, the light transmittance of the partial area of the dimming device is changed based on a signal for displaying an image on the image display device. In the optical apparatus according to the second embodiment of the present disclosure, the light transmittance of the dimming device is changed based on a signal received by a receiving device. The change status of the light transmittance may include a change from high light transmittance to low light transmittance, a change from low light transmittance to high light transmittance, and a change of high/low light transmittance in a short cycle (a change of light transmittance in blinking state). In the case where the dimming device is already being operated, for example, the light transmittance of the dimming device may be increased. In the case where the dimming device is not operated, the dimming device may be operated to reduce the light transmittance, for example.

The display apparatus according to the embodiment of the present disclosure or the light guide unit according to each of the first to second embodiments of the present disclosure may further include a microphone and may control the operation of the dimming device in response to an audio input via the microphone. Specifically, the switching of the operation/non-operation (on/off) of the dimming device may be controlled in response to a command issued by an observer's voice. Alternatively, the display apparatus according to the embodiment of the present disclosure or the light guide unit according to each of the first to second embodiments of the present disclosure may further include an infrared light input/output unit, and the operation of the dimming device may be controlled using the infrared light input/output unit. Specifically, an observer's blinking may be detected using the infrared light input/output unit, so that the switching of the operation/non-operation (on/off) of the dimming device may be controlled.

In the display apparatus according to the embodiment of the present disclosure or the light guide unit according to each of the first and second embodiments of the present disclosure, when the amount of outside light that passes through the dimming device when the dimming device does not operate is assumed to be "1", the amount of outside light that passes through the dimming device when the dimming device is operating may be assumed to be in the range from 0.3 to 0.8, desirably, 0.5 to 0.8. This allows the observer to easily, reliably, and immediately recognize that an image is displayed. Alternatively, this allows the observer to easily and reliably recognize that an image is to be displayed. Alternatively, this allows the observer to easily and reliably recognize which part of the outside is imaged by the imaging device and to easily, reliably, and immediately recognize that the receiving device receives a signal. In the display apparatus according to the embodiment of the present disclosure, light transmittance of the partial area of the dimming device is changed based on a signal for displaying an image on the image display device, but the position of an area where the light transmittance is changed is inherently arbitrary. Additionally, in the optical apparatus according to the second embodiment of the present disclosure, the light transmittance of the dimming device is changed based on a signal received by the receiving device, but light transmittance of the entire area of the dimming device may be changed, or light transmittance of a partial area may be changed.

In a desirable form of the display apparatus according to the embodiment of the present disclosure, the first deflection unit may reflect light that is input to the light guide plate, and the second deflection unit may transmit and reflect the light propagated inside the light guide plate by total reflection. In this case, the first deflection unit may function as a reflecting mirror and the second deflection unit may function as a semi-transmissive mirror.

In a desirable form of the display apparatus according to the embodiment of the present disclosure, in the case where the first deflection unit reflects all of the light input to the light guide plate, the first deflection unit may be made of metal including an alloy, for example, and formed of a light reflecting film (a kind of mirror) that reflects the light input to the light guide plate. Further, in the case where the first deflection unit reflects part of the light input to the light guide plate, the first deflection unit may be formed of a multi-layer lamination structure in which many dielectric lamination films are laminated, a half mirror, and a polarizing beam splitter, for example. In the first deflection unit, in order that parallel light input to the light guide plate is totally reflected inside the light guide plate, at least part of the parallel light input to the light guide plate is reflected. On the other hand, in the second deflection unit, the parallel light that is propagated inside the light guide plate by total reflection is reflected a plurality of times and output from the light guide plate in the state of parallel light. The second deflection unit may be formed of a multi-layer lamination structure in which many dielectric lamination films are laminated, a half mirror, a polarizing beam splitter, or a holographic diffraction grating film. The first deflection unit and the second deflection unit are disposed inside the light guide plate (incorporated in the light guide plate). In the first deflection unit, the parallel light input to the light guide plate is reflected so as to be totally reflected inside the light guide plate. Meanwhile, in the second deflection unit, the parallel light that is propagated inside the light guide plate by total reflection is reflected or diffracted a plurality of times and output from the light guide plate in the state of parallel light.

Alternatively, the first deflection unit may diffract and reflect the light input to the light guide plate, and the second deflection unit may diffract and reflect the light a plurality of times, the light being propagated inside the light guide plate by total reflection. In such a case, each of the first deflection unit and the second deflection unit may be formed of a diffraction grating element. Further, the diffraction grating element may be formed of a reflective diffraction grating element or a transmissive diffraction grating element. Alternatively, one diffraction grating element may be formed of a reflective diffraction grating element, and the other diffraction grating element may be formed of a transmissive diffraction grating element. It should be noted that examples of the reflective diffraction grating element include a reflective volume holographic diffraction grating. The first deflection unit formed of a reflective volume holographic diffraction grating is referred to as a "first diffraction grating member" for convenience sake, and the second deflection unit formed of a reflective volume holographic diffraction grating is referred to as a "second diffraction grating member" for convenience sake.

The display apparatus according to the embodiment of the present disclosure allows monochrome (for example, green) image display. In this case, for example, the angle of view may be divided into two (more specifically, into two halves, for example), and the first deflection unit may be formed of a laminate of two diffraction grating members corresponding to the respective angles of view divided into two. Alternatively, in the case of color image display, in order to correspond to diffraction reflection of P types of light beams having different P types (for example, P=3, i.e., three types of red, green, and blue) of wavelength bands (or wavelengths), each of the first deflection unit and the second deflection unit may be formed of a laminate of P diffraction grating layers formed of the diffraction grating members. In this case, for each of the diffraction grating members, an interference fringe corresponding to one type of wavelength band (or wavelength) is formed. Alternatively, in order to correspond to diffraction reflection of P types of light beams having different P types of wavelength bands (or wavelengths), the diffraction grating member formed of one diffraction grating layer may also be provided with P types of interference fringes. Alternatively, for example, the following structure may be adopted: a diffraction grating member formed of a diffraction grating layer formed of a reflective volume holographic diffraction grating that causes light having a red wavelength band (or wavelength) to be diffracted and reflected is disposed on a first light guide plate; a diffraction grating member formed of a diffraction grating layer formed of a reflective volume holographic diffraction grating that causes light having a green wavelength band (or wavelength) to be diffracted and reflected is disposed on a second light guide plate; a diffraction grating member formed of a diffraction grating layer formed of a reflective volume holographic diffraction grating that causes light having a blue wavelength band (or wavelength) to be diffracted and reflected is disposed on a third light guide plate; and those first light guide plate, second light guide plate, and third light guide plate are laminated with gaps therebetween. Adopting those configurations allows an increase in diffraction efficiency, an increase in diffraction reception angle, and optimization of diffraction/reflection angle, when light beams having respective wavelength bands (or wavelengths) are diffracted and reflected in the diffraction grating member. It is desirable to dispose a protector such that the reflective volume holographic diffraction grating does not come into direct contact with air.

In the display apparatus according to the embodiment of the present disclosure, the size of the dimming device may be smaller than, the same as, or larger than that of the image display device. Alternatively, the second deflection unit may be positioned in a projected image of the dimming device, or the dimming device may be positioned in a projected image of the second deflection unit. Additionally, as described above, one of the substrates forming the dimming device, i.e., the first substrate, may cover the first deflection unit and the second deflection unit.

Examples of material forming the first diffraction grating member and the second diffraction grating member include a photopolymer material. A constituent material and a basic structure of the first diffraction grating member and the second diffraction grating member each formed of the reflective volume holographic diffraction grating may be the same as those of a reflective volume holographic diffraction grating in related art. The reflective volume holographic diffraction grating means a holographic diffraction grating that diffracts and reflects only positive first-order diffracted light. Although an interference fringe is formed inside and over the surface of the diffraction grating member, a method of forming the interference fringe may be the same as a forming method in related art. Specifically, for example, object light may be applied to a member (for example, photopolymer material) that forms a diffraction grating member from a first predetermined direction on one side, and reference light may be applied to the member that forms the diffraction grating member from a second predetermined direction on the other side at the same time, to record an interference fringe formed by the object light and the reference light in the member that forms the diffraction grating member. When the first predetermined direction, the second predetermined direction, and the wavelengths of the object light and the reference light are adequately selected, a desired pitch of interference fringes on the surface of the diffraction grating member and a desired angle of inclination (slant angle) of the interference fringes can be obtained. The angle of inclination of the interference fringe means an angle formed by the surface of the diffraction grating member (or diffraction grating layer) and the interference fringe. In the case where each of the first diffraction grating member and the second diffraction grating member is formed of a laminate structure of the P diffraction grating layers formed of the reflective volume holographic diffraction gratings, in order to laminate such diffraction grating layers, P diffraction grating layers only need to be independently produced and then laminated on (bonded to) each other with use of an ultraviolet curable adhesive, for example. Alternatively, P diffraction grating layers may be produced by producing one diffraction grating layer with use of a photopolymer material having viscosity and then sequentially attaching the photopolymer materials having viscosity thereto, to produce the diffraction grating layer.

Alternatively, in the image display device according to an embodiment of the present disclosure, the light guide unit may be formed of a semi-transmissive mirror. Light output from the image forming unit is input to the semi-transmissive mirror and output therefrom toward a pupil of an observer. The light output from the image forming unit may be propagated in air and input to the semi-transmissive mirror or propagated inside a transparent member made of, for example, a glass plate or a plastic plate and input to the semi-transmissive mirror. Specifically, the transparent member is a member made of a material that is the same as the material forming a light guide plate, which will be described later. The semi-transmissive mirror may be attached to the image forming unit via the transparent member or via a different member instead of the transparent member.

In a desirable form of the display apparatus according to the embodiment of the present disclosure, the image forming unit may include a plurality of pixels arranged in a two-dimensional matrix. It should be noted that the image forming unit having such a configuration is referred to as an "image forming unit having a first configuration" for convenience sake.

Examples of the image forming unit having a first configuration include: an image forming unit including a reflective spatial light modulation device and a light source; an image forming unit including a transmissive spatial light modulation device and a light source; and an image forming unit including a light-emitting element such as a light-emitting diode (LED), a semiconductor laser element, an organic EL (Electro Luminescence) element, or an inorganic EL element. Of those, it is desirable to use the image forming unit including a reflective spatial light modulation device and a light source. Examples of the spatial light modulation device include a light valve, for example, a transmissive or reflective liquid crystal display such as an LCOS (Liquid Crystal On Silicon), and a digital micromirror device (DMD). Examples of the light source include the light-emitting element described above. Further, the reflective spatial light modulation device may include a liquid crystal display and a polarizing beam splitter. The polarizing beam splitter reflects part of light from the light source and guides the light to the liquid crystal display, and causes part of the light reflected by the liquid crystal display to pass therethrough to guide the light to an optical system. Examples of the light-emitting element forming the light source may include a red light-emitting element, a green light-emitting element, a blue light-emitting element, and a white light-emitting element. Alternatively, red light, green light, and blue light that are output from the red light-emitting element, the green light-emitting element, and the blue light-emitting element, respectively, may be used to achieve color mixture and uniformity in luminance by using a light pipe, to thus obtain white light. Examples of the light-emitting element may include a semiconductor laser element, a solid-state laser, and an LED. The number of pixels may be determined based on the specifications requested for the image display device and exemplified as specific values such as 320*240, 432*240, 640*480, 854*480, 1024*768, and 1920*1080. A collimating optical system that will be described later has a function of converting position information of a pixel into angle information of a light guide unit in the optical system. Examples of the collimating optical system include an optical system that includes a convex lens, a concave lens, a free-form-surface prism, and a hologram lens independently or in combination and has a positive optical power as a whole.

Alternatively, in the display apparatus according to the embodiment of the present disclosure, the image forming unit may include a light source and a scanning unit configured to scan parallel light output from the light source. It should be noted that the image forming unit having such a configuration is referred to as an "image forming unit having a second configuration" for convenience sake.

Examples of the light source in the image forming unit having a second configuration may include a light-emitting element, specifically, a red light-emitting element, a green light-emitting element, a blue light-emitting element, and a white light-emitting element. Alternatively, red light, green light, and blue light that are output from the red light-emitting element, the green light-emitting element, and the blue light-emitting element, respectively, may be used to achieve color mixture and uniformity in luminance by using a light pipe, to obtain white light. Examples of the light-emitting element include a semiconductor laser element, a solid-state laser, and an LED. The number of pixels (virtual pixels) in the image forming unit having a second configuration may also be determined based on the specifications requested for the image display device and exemplified as specific values such as 320*240, 432*240, 640*480, 854*480, 1024*768, and 1920*1080. Further, in the case of color image display and in the case where the light source includes a red light-emitting element, a green light-emitting element, and a blue light-emitting element, for example, it is desirable to perform color composition by using a cross prism. Examples of the scanning unit may include MEMS (Micro Electro Mechanical Systems) including a micromirror that is rotatable in two-dimensional directions and horizontally and vertically scans light output from the light source, and a galvanometer mirror. A relay optical system that will be described next may be formed of a well-known relay optical system.

In the image forming unit having a first configuration or the image forming unit having a second configuration, the light that is changed into a plurality of parallel light beams in the optical system is input to the light guide plate. Such an optical system is an optical system, in which output light is assumed as parallel light, and which is referred to as a "parallel light outputting optical system" in some cases and specifically includes a collimating optical system or a relay optical system. In such a manner, being parallel light is requested based on the necessity to preserve light wavefront information obtained when those light beams are input to the light guide plate, even after those light beams are output from the light guide plate via the first deflection unit and the second deflection unit. In order to generate a plurality of parallel light beams, specifically, for example, a light output unit of the image forming unit may be provided at a spot (position) of the focal distance in the parallel light outputting optical system, for example. The parallel light outputting optical system has a function of converting position information of a pixel into angle information of the light guide unit in the optical system. Examples of the parallel light outputting optical system may include an optical system that includes a convex lens, a concave lens, a free-form-surface prism, and a hologram lens independently or in combination and has a positive optical power as a whole. A light shielding member having an opening may be disposed between the parallel light outputting optical system and the light guide plate so as to prevent undesired light from being output from the parallel light outputting optical system and input to the light guide plate.

Alternatively, for example, as the image forming unit or the light source formed of the light-emitting elements and the light valve, the following configuration may also be exemplified other than the combination of a backlight that emits white light as a whole and a liquid crystal display including red light-emitting pixels, green light-emitting pixels, and blue light-emitting pixels.

[Image Forming Unit A]

An image forming unit A includes (α) a first image forming unit including a first light-emitting panel on which first light-emitting elements that emit blue light are arranged in a two-dimensional matrix, (β) a second image forming unit including a second light-emitting panel on which second light-emitting elements that emit green light are arranged in a two-dimensional matrix, (γ) a third image forming unit including a third light-emitting panel on which third light-emitting elements that emit red light are arranged in a two-dimensional matrix, and (δ) a unit for collecting light beams output from the first image forming unit, the second image forming unit, and the third image forming unit into one optical path (for example, the unit corresponds to a dichroic prism; the same holds true for the following description), in which the light-emitting/non-light-emitting states of the first light-emitting elements, the second light-emitting elements, and the third light-emitting elements are controlled.

[Image Forming Unit B]

An image forming unit B includes (α) a first image forming unit including a first light-emitting element that emits blue light, and a first light passage control device for controlling the passage/non-passage of output light output from the first light-emitting element that emits blue light, the first light passage control device being a kind of light valve and including a liquid crystal display, a digital micromirror device (DMD), or an LCOS, for example; the same holds true for the following description, (β) a second image forming unit including a second light-emitting element that emits green light, and a second light passage control device (light valve) for controlling the passage/non-passage of output light output from the second light-emitting element that emits green light, (γ) a third image forming unit including a third light-emitting element that emits red light, and a third light passage control device (light valve) for controlling the passage/non-passage of output light output from the third light-emitting element that emits red light, and (δ) a unit for collecting light beams passing through the first light passage control device, the second light passage control device, and the third light passage control device into one optical path, in which the passage/non-passage of the output light beams output from those light-emitting elements is controlled by the light passage control devices, and thus an image is displayed. Examples of units for leading the output light beams output from the first light-emitting element, the second light-emitting element, and the third light-emitting element to the light passage control devices, i.e., light leading members, include light guide members, microlens arrays, mirrors or reflective plates, and condenser lenses.

[Image Forming Unit C]

An image forming unit C includes (α) a first image forming unit including a first light-emitting panel on which first light-emitting elements that emit blue light are arranged in a two-dimensional matrix, and a blue light passage control device (light valve) for controlling the passage/non-passage of output light output from the first light-emitting panel, (β) a second image forming unit including a second light-emitting panel on which second light-emitting elements that emit green light are arranged in a two-dimensional matrix, and a green light passage control device (light valve) for controlling the passage/non-passage of output light output from the second light-emitting panel, (γ) a third image forming unit including a third light-emitting panel on which third light-emitting elements that emit red light are arranged in a two-dimensional matrix, and a red light passage control device (light valve) for controlling the passage/non-passage of output light output from the third light-emitting panel, and (δ) a unit for collecting light beams passing through the blue light passage control device, the green light passage control device, and the red light passage control device into one optical path, in which the passage/non-passage of the output light beams output from those first light-emitting panel, second light-emitting panel, and third light-emitting panel is controlled by the light passage control devices (light valves), and thus an image is displayed.

[Image Forming Unit D]

An image forming unit D, which is an image forming unit for color display of a field sequential system, includes (α) a first image forming unit including a first light-emitting element that emits blue light, (β) a second image forming unit including a second light-emitting element that emits green light, (γ) a third image forming unit including a third light-emitting element that emits red light, (δ) a unit for collecting light beams output from the first image forming unit, the second image forming unit, and the third image forming unit into one optical path, and (ε) a light passage control device (light valve) for controlling the passage/non-passage of the light output from the unit for collecting light beams into one optical path, in which the passage/non-passage of the output light beams output from those light-emitting elements is controlled by the light passage control device, and thus an image is displayed.

[Image Forming Unit E]

An image forming unit E, which is also an image forming unit for color display of a field sequential system, includes (α) a first image forming unit including a first light-emitting panel on which first light-emitting elements that emit blue light are arranged in a two-dimensional matrix, (β) a second image forming unit including a second light-emitting panel on which second light-emitting elements that emit green light are arranged in a two-dimensional matrix, (γ) a third image forming unit including a third light-emitting panel on which third light-emitting elements that emit red light are arranged in a two-dimensional matrix, (δ) a unit for collecting light beams output from the respective first image forming unit, second image forming unit, and third image forming unit into one optical path, and (ε) a light passage control device (light valve) for controlling the passage/non-passage of the light output from the unit for collecting light beams into one optical path, in which the passage/non-passage of the output light beams output from those light-emitting panels is controlled by the light passage control device, and thus an image is displayed.

[Image Forming Unit F]

An image forming unit F is an image forming unit for color display of a passive matrix type or an active matrix type in which an image is displayed by controlling the light-emitting/non-light-emitting states of first light-emitting elements, second light-emitting elements, and third light-emitting elements.

[Image Forming Unit G]

An image forming unit G, which is an image forming unit for color display of a field sequential system, includes light passage control devices (light valves) for controlling the passage/non-passage of output light beams from light-emitting element units arranged in a two-dimensional matrix, in which the light-emitting/non-light-emitting states of first light-emitting elements, second light-emitting elements, and third light-emitting elements in the light-emitting element units are controlled on a time division basis, and further the passage/non-passage of the output light beams output from the first light-emitting elements, the second light-emitting elements, and the third light-emitting elements is controlled by the light passage control devices, and thus an image is displayed.

Alternatively, in the case where the display device according to the embodiment of the present disclosure is of a binocular type, the display device can have the following configuration: the light guide plate is disposed on the center of the observer's face in relation to the image forming unit as a whole; a connection member to connect two image display devices is further provided; the connection member is attached to one side of the frame, which faces the observer, at the central part located between two pupils of the observer; and a projected image of the connection member is included in a projected image of the frame.

In such a manner, with the structure in which the connection member is attached to the central part of the frame that is located between the two pupils of the observer, i.e., without the structure in which the image display devices are directly attached to the frame, when the frame is mounted onto the head of the observer, the temple portions are expanded outwards. As a result, even if the frame is deformed, such a deformation of the frame does not cause a displacement (positional change) of the image forming unit or the light guide plate, or causes little displacement, if any. For that reason, the angle of convergence of left and right images can be certainly prevented from being changed. Moreover, since it is unnecessary to enhance the rigidity of the front portion of the frame, it is possible to avoid causing an increase in weight of the frame, lowering in design quality, and a rise in cost. Besides, since the image display devices are not attached directly to the eyeglasses-type frame, the design, color, and the like of the frame can be freely selected according to the observer's preference, and thus there are few restrictions imposed on the design of the frame and the degree of freedom on a design basis is high. In addition, the connection member is disposed between the observer and the frame, and, moreover, the projected image of the connection member is included in the projected image of the frame. In other words, when the head mounted display is viewed from the front of the observer, the connection member is hidden behind the frame. So, a high design quality can be given to the head mounted display.

It is desirable that the connection member be attached to the side of the frame, which faces the observer, at the central part of the front portion located between the two pupils of the observer. The central part corresponds to a bridge portion in normal eyeglasses.

The two image display devices are connected to each other with the connection member. Specifically, the following form may be provided: the image forming units are attached to both ends of the connection member such that the mounting state can be adjusted. In this case, it is desirable that the image forming units be located on the outside in relation to the pupils of the observer. In such a configuration, furthermore, it is desirable to satisfy:

$0.01*L \leq \alpha \leq 0.30*L$, desirably $0.05*L \leq \alpha \leq 0.25*L$;

$0.35*L \leq \beta \leq 0.65*L$, desirably $0.45*L \leq \beta \leq 0.55*L$;

and $0.70*L \leq \gamma \leq 0.99*L$, desirably $0.75*L \leq \gamma \leq 0.95*L$, where a distance from the center of the mounting portion of one image forming unit to one end of the frame (an endpiece on one side) is represented by $\alpha$, a distance from the center of the connection member to the one end of the frame (the endpiece on the one side) is represented by $\beta$, a distance from the center of the mounting portion of the other image forming unit to the one end of the frame (the endpiece on the one side) is represented by $\gamma$, and the length of the frame is represented by L. The mounting of the image forming units to both ends of the connection member is specifically performed as follows, for example: three through-holes are provided at three positions of each of the ends of the connection member; screw-engagement portions corresponding to the through-holes are provided to the image forming units; and screws are inserted into the respective through-holes and screwed into the screw-engagement portions provided to the image forming units. A spring is inserted in advance between each screw and a corresponding screw-engagement portion. In such a manner, the mounting state of the image forming units (inclination of the image forming units with respect to the connection member) can be adjusted based on the fastening state of the screws.

Herein, the center of the mounting portion of the image forming unit indicates a bisection point, along the axial direction of the frame, of a portion where a projected image of the image forming unit, which is obtained by projecting the image forming unit and the frame onto a virtual plane, is superimposed on a projected image of the frame, in the state where the image forming unit is attached to the connection member. Further, the center of the connection member indicates a bisection point, along the axis direction of the frame, of a portion where the connection member is in contact with the frame, in the state where the connection member is attached to the frame. The length of the frame indicates the length of the projected image of the frame, in the case where the frame is curved. It should be noted that a projection direction is a direction vertical to the observer's face.

Alternatively, the two image display devices are connected to each other with the connection member, and specifically, the following form can be adopted: two light guide plates are connected to each other with the connection member. There is a case where the two light guide plates are integrally produced, and in such a case, the connection member is attached to such a light guide plate integrally produced. Such a form is also included in the form in which the two light guide plates are connected to each other with the connection member. Assuming that a distance from the center of one of the image forming units to one end of the frame is α' and a distance from the center of the other one of the image forming units to the one end of the frame is γ', the values of α' and γ' are desirably set to the same as the values of α and γ described above. It should be noted that the center of the image forming unit indicates a bisection point, along the axis direction of the frame, of a portion where a projected image of the image forming unit, which is obtained by projecting the image forming unit and the frame onto a virtual plane, is superimposed on a projected image of the frame, in the state where the image forming unit is attached to the light guide plate.

The shape of the connection member is substantially optional as long as the projected image of the connection member is included in the projected image of the frame. Examples of the shape of the connection member include bar-like shapes and strip-like shapes. Examples of the material forming the connection member include metals, alloys, plastics, and combinations thereof.

A light beam that is output from the center of the image forming unit and passes through a nodal point on the image forming unit side of the optical system is referred to as a "central light beam", and a light beam in the central light beam, which is vertically input to the light guide unit, is referred to as a "central incident light beam". It is assumed that a point at which the central incident light beam is input to the light guide unit is a light guide unit central point, an axis that passes through the light guide unit central point and is parallel to the axis direction of the light guide unit is an X axis, and an axis that passes through the light guide unit central point and coincides with the normal line of the light guide unit is a Z axis. The horizontal direction in the display apparatus according to the embodiment of the present disclosure is a direction that is parallel to the X axis, and is hereinafter referred to as an "X-axis direction" in some cases. Herein, the optical system is disposed between the image forming unit and the light guide unit and changes light output from the image forming unit into parallel light. Subsequently, a light flux changed into the parallel light in the optical system is input to the light guide unit, guided to the light guide unit, and output from the light guide unit. Further, the central point of the first deflection unit is referred to as a "light guide unit central point".

The light guide plate has two parallel surfaces (first surface and second surface) extending parallel to the axis of the light guide plate (the axis corresponds to a longitudinal direction or horizontal direction and corresponds to the X axis). It should be noted that the width direction of the light guide plate, which corresponds to a height direction or a vertical direction, corresponds to a Y axis. Assuming that a surface of the light guide plate, to which light is input, is an input surface of the light guide plate, and a surface of the light guide plate, from which light is output, is an output surface of the light guide plate, the input surface of the light guide plate and the output surface of the light guide plate may be each formed of the first surface. Alternatively, the input surface of the light guide plate may be formed of the first surface, and the output surface of the light guide plate may be formed of the second surface. The interference fringe of the diffraction grating member extends substantially parallel to the Y axis.

Examples of the material forming the light guide plate may include glasses including an optical glass such as a quartz glass or BK7, and plastic materials (for example, PMMA (poly methyl methacrylate), polycarbonate resin, acrylic resin, amorphous polypropylene resin, and styrene resin including AS resin (acrylonitrile styrene copolymer)). The shape of the light guide plate is not limited to be a flat shape and may be a curved shape.

In the display device according to the embodiment of the present disclosure, the frame may include a front portion disposed on the front of the observer, and two temple portions turnably attached to both ends of the front portion via hinges. It should be noted that earpiece portions are attached to the tip ends of the respective temple portions. The image display device is attached to the frame. Specifically, for example, the image forming unit only needs to be attached to the temple portion. Further, a configuration in which the front portion and the two temple portions are incorporated can be adopted. In other words, when the whole of the display device according to the embodiment of the present disclosure is viewed, generally, the frame has substantially the same structure as that of normal eyeglasses. The materials forming the frame may be the same as materials forming normal eyeglasses, such as metals, alloys, plastics, and combinations thereof. Furthermore, a configuration in which nose pads are attached to the front portion can be adopted. In other words, when the whole of the display device according to the embodiment of the present disclosure is viewed, an assembled body of the frame and the nose pads has substantially the same structure as that of normal eyeglasses, except for the absence of a rim. The nose pads can have a well-known configuration and structure.

Besides, in the display device according to the embodiment of the present disclosure, it is desirable to adopt the following form from the viewpoint of design or ease of mounting: wires (signal line, power supply line, etc.) extending from one or two image forming units are extended from the tip ends of the earpiece portions to the outside through the inside of the temple portions and the earpiece portions and are connected to a control device (control circuit or control unit). Further, it is also possible to adopt the following form: each image forming unit includes a headphone portion and a headphone portion wire, which extends from each image forming unit, is extended from the tip end of the earpiece portion to the headphone portion through the inside of the temple portion and the earpiece portion. Examples of the headphone portion may include an inner ear type headphone portion and a canal type headphone portion. More specifically, it is desirable to adopt a form in which the headphone portion wire is extended to the headphone portion so as to run around the rear side of a pinna (auricle) from the tip end of the earpiece portion.

Also in the optical apparatus according to each of the first and second embodiments of the present disclosure, the frame may include a front portion disposed on the front of the observer, and two temple portions turnably attached to both ends of the front portion via hinges. It should be noted that the earpiece portions are attached to the tip ends of the respective temple portions. The dimming device is attached to the frame. Specifically, for example, the dimming device only needs to be attached to the front portion. Further, a configuration in which the front portion and the two temple portions are incorporated can be adopted. In other words, when the whole of the optical apparatus according to each of the first and second embodiments of the present disclosure is viewed, generally, the frame has substantially the same structure as that of normal eyeglasses. Alternatively, when the whole of the optical apparatus according to each of the first and second embodiments of the present disclosure is viewed, the dimming device is disposed instead of the lenses of the normal eyeglasses. The materials forming the frame may be the same as materials forming normal eyeglasses, such as metals, alloys, plastics, and combinations thereof. Furthermore, a configuration in which nose pads are attached to the front portion can be adopted. In other words, when the whole of the optical apparatus according to each of the first and second embodiments of the present disclosure is viewed, an assembled body of the frame and the nose pads has substantially the same structure as that of normal eyeglasses, except for the absence of a rim. The nose pads can have a well-known configuration and structure. In the optical apparatus according to the first embodiment of the present disclosure, an imaging device may be attached to the central part or an end of the frame or to the temple portion. In the optical apparatus according to each of the first and second embodiments of the present disclosure, the dimming device may be attached to the lenses of normal eyeglasses, or the lenses and the dimming device may be apposed.

The display apparatus according to the embodiment of the present disclosure can form a head mounted display (HMD). This allows reduction in weight and downsizing of the display device and allows a user to relieve discomfort when the display device is mounted onto the user's head, to a large extent. Further, this allows manufacturing cost to be reduced.

In the optical apparatus according to the first embodiment of the present disclosure, the imaging device may be an imaging device having a well-known configuration and structure. Specifically, the imaging device may include a solid-state imaging device, which has a CCD (Charge Coupled Device) or a CMOS (Complementary Metal Oxide Semiconductor) sensor, and a lens, for example.

Also in the display apparatus according to the embodiment of the present disclosure, for example, the imaging device may be attached to the central part or end of the front portion or to the temple portion. Wires from the imaging device may be connected to one image display device (or image forming unit) via the front portion, for example, or may be included in the wires extending from the image display device (or image forming unit). In such a form, as in the optical apparatus according to the first embodiment of the present disclosure, a spatial area imaged by the imaging device may be displayed on the dimming device.

The display apparatus according to the embodiment of the present disclosure including the various modifications described above may be available for displaying received electronic mails; for displaying various types of information in various sites on the Internet; for displaying various types of descriptions about how to drive, operate, maintain, or disassemble an observation target such as a variety of devices, and symbols, codes, marks, emblems, patterns, and the like; for displaying various types of descriptions about an observation target such as people and products, and symbols, codes, marks, emblems, patterns, and the like; for displaying moving and still images; for displaying subtitles in movies and the like; for displaying descriptions about video or closed captions in synchronization with video display; for displaying descriptions about an observation target in acting performances, Kabuki, Noh, Kyogen, Operas, music recitals, ballet, various types of theater plays, amusement parks, art museums, tourist attractions, tourist spots, and sightseeing signs, and the details of story, the progress of story, the background of story, and the like; and for displaying closed captions. For acting performances, Kabuki, Noh, Kyogen, Operas, music recitals, ballet, various types of theater plays, amusement parks, art museums, tourist attractions, tourist spots, sightseeing signs, and the like, the display apparatus may display characters as images related to an observation target whenever appropriate. Specifically, an image control signal is transmitted to the display apparatus and images are displayed on the display apparatus based on the progress of story in movies or in acting performances, based on a predetermined schedule and time allocation, in response to an operator's operation under the control of a computer or the like, for example. For display of various types of descriptions about observation targets such as various types of devices, people, and products, the observation targets such as various types of devices, people, and products may be imaged using an imaging device, and the imaged details may be analyzed in the display apparatus. In this manner, the display apparatus may be able to display various types of descriptions created in advance about the observation targets such as various types of devices, people, and products. Alternatively, the display apparatus according to the embodiment of the present disclosure may be used as a stereoscopic display apparatus. In this case, a polarizer plate or a polarizer film may be detachably provided to the light guide unit, or bonded to the light guide unit, as appropriate.

An image signal supplied to the image forming unit includes not only an image signal (for example, character data) but also luminance data (luminance information) on images to be displayed, chromaticity data (chromaticity information), or both the luminance data and the chromaticity data, for example. The luminance data may be luminance data corresponding to the luminance at a predetermined area including an observation target viewed through the light guide unit, and the chromaticity data may be chromaticity data corresponding to the chromaticity at the predetermined area including the observation target viewed through the light guide unit. With an image signal including such luminance data on images, the images to be displayed become controllable in terms of luminance (brightness), and with an image signal including such chromaticity data on images, the images to be displayed become controllable in terms of chromaticity (color). Moreover, with an image signal including such luminance and chromaticity data on images, the images to be displayed become controllable in terms of both luminance (brightness) and chromaticity (color). When the luminance data in use corresponds to the luminance at a predetermined area including an observation target viewed through the image display device, the luminance data may be adjusted in value to increase the luminance of an image to be displayed, i.e., to make the image brighter when it is displayed, if the luminance at the predetermined area including the observation target viewed through the image display device is increased. When the chromaticity data in use corresponds to the chromaticity at the predetermined area including the observation target viewed through the image display device, the chromaticity data may be adjusted in value to obtain, roughly, a complementary color relationship between the chromaticity at the predetermined area including the observation target viewed through the image display device and the chromaticity of an image to be displayed. The complementary colors mean a pair of colors that are opposite to each other on the color circle, e.g., red and green, yellow and purple, and blue and orange. The complementary colors also mean a pair of colors that produces a color with reduced chroma when mixed in appropriate proportions, e.g., white for light, and black for objects. However, the complementary characteristics are not the same in terms of visual effects when the colors are placed next to each other, and when the colors are mixed together. The complementary colors are also referred to as antagonistic colors, contrast colors, or opposing colors. It should be noted that the expression of "opposing colors" directly identifies which colors are opposite to each other, whereas the expression of "complementary colors" identifies colors in a rather wider scope. The pair of complementary colors produces synergistic effects of enhancing their respective colors, and this is called complementary color harmony.

[Embodiment 1]

Figure 2:
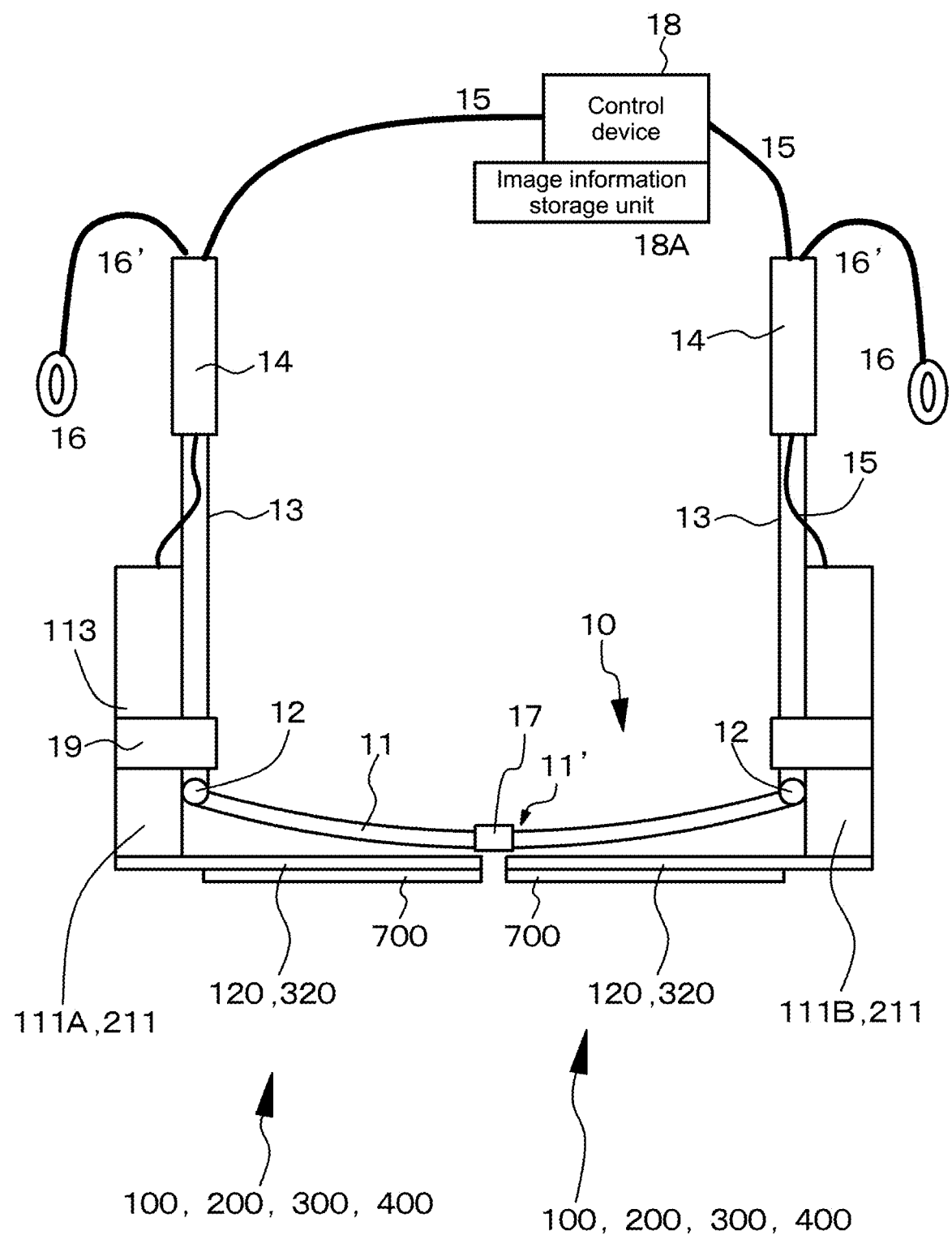
FIG. 2 is a schematic diagram of the display apparatus of Embodiment 1 and the like when viewed from above.
Figure 3A:
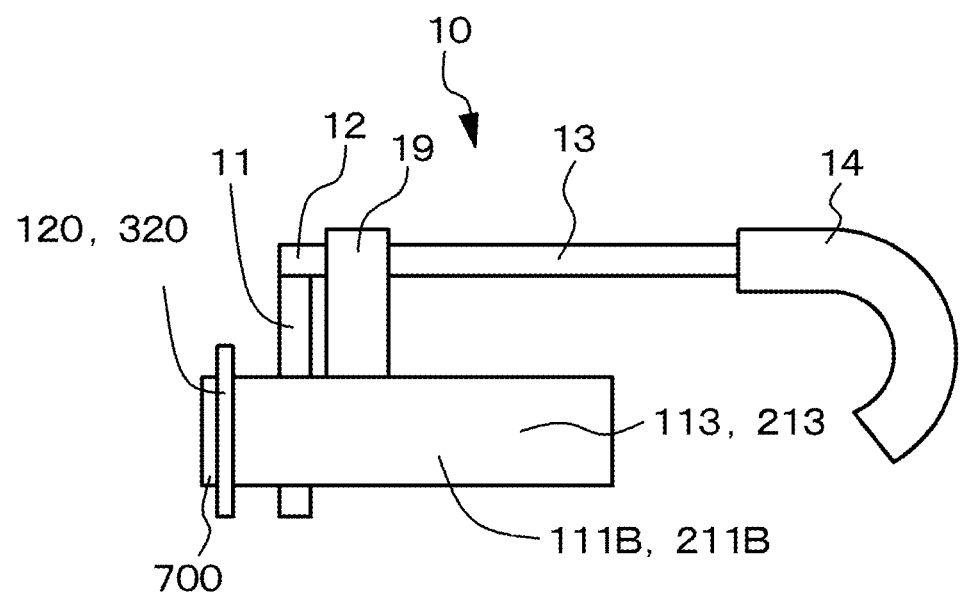
FIGS. 3A and 3B are a schematic diagram of the display device of Embodiment 1 when viewed from a lateral direction and a schematic diagram of a part including a light guide unit and a dimming device in the display apparatus of Embodiment 1 when viewed from the front, respectively.
Figure 3B:
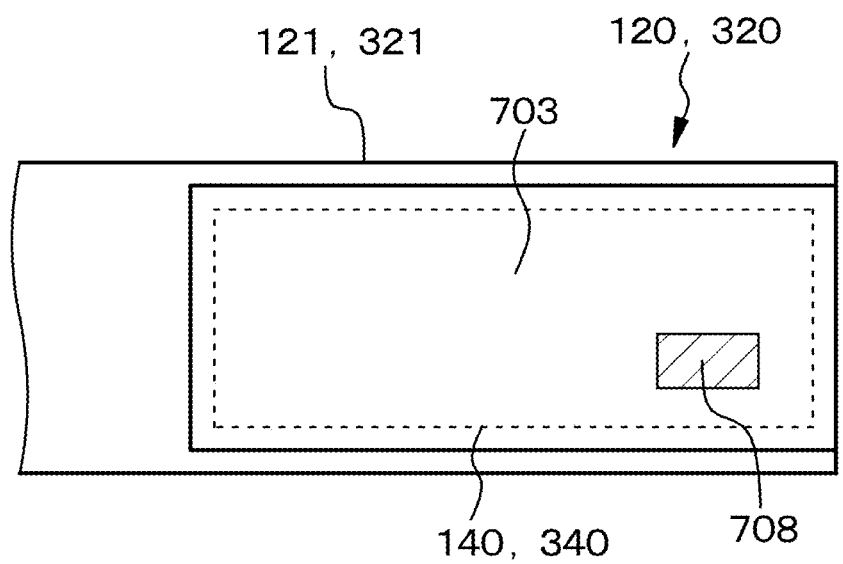
Figure 4A:
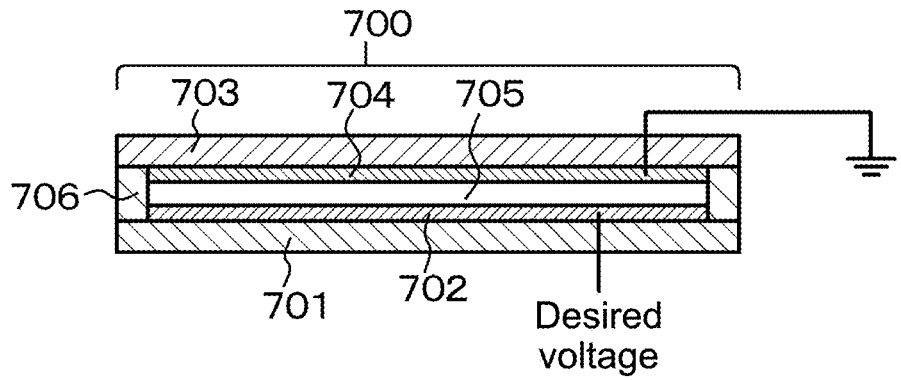
FIGS. 4A and 4B are each a schematic cross-sectional diagram of the dimming device, schematically showing the behavior of the dimming device in the display apparatus of Embodiment 1.
Figure 4B:
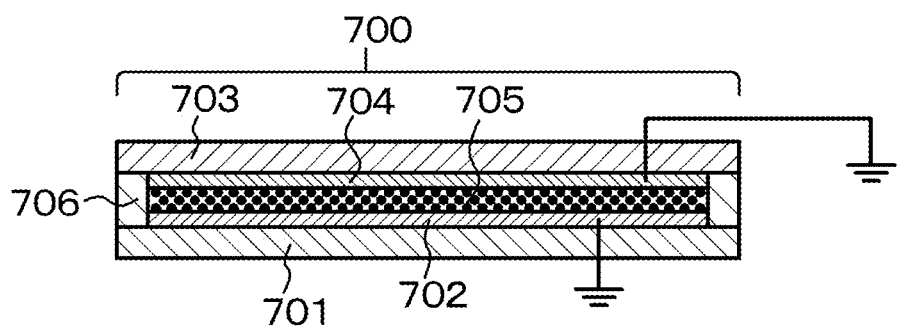
Figure 5:
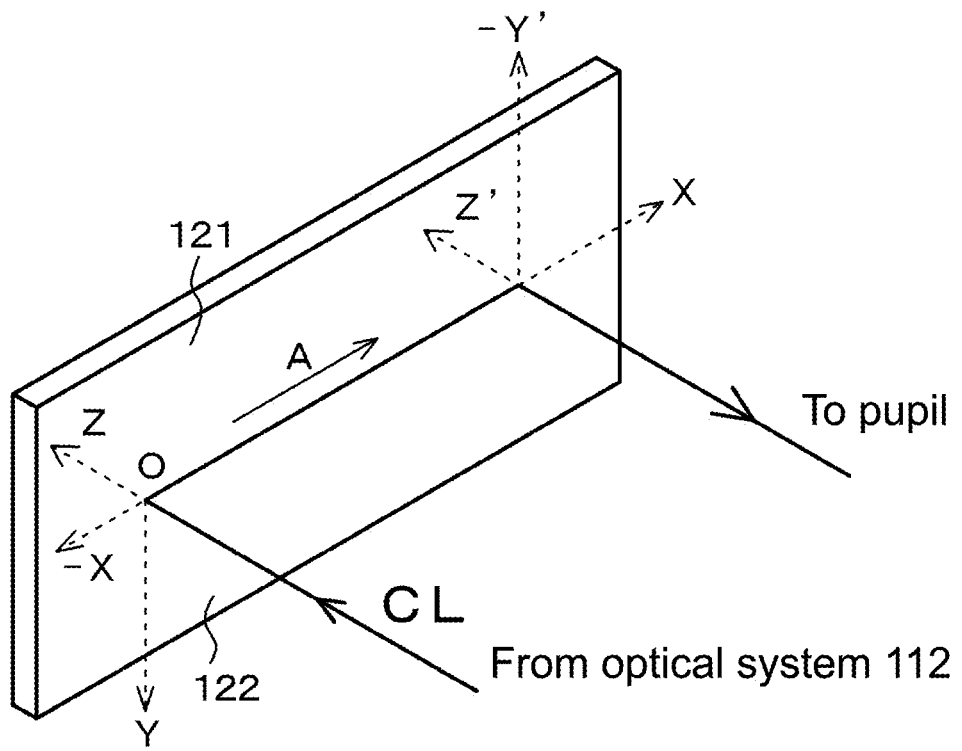
FIG. 5 is a schematic diagram showing light propagation in a light guide plate that forms an image display device.

Embodiment 1 relates to the display apparatus according to the embodiment of the present disclosure, and to the optical apparatus according to the second embodiment of the present disclosure. FIG. 1 is a conceptual diagram of an image display device of Embodiment 1. FIG. 2 is a schematic diagram of the display apparatus (specifically, head mounted display (HMD)) of Embodiment 1 and the like when viewed from above. FIG. 3A is a schematic diagram of the display apparatus of Embodiment 1 when viewed from a lateral direction. FIG. 3B is a schematic diagram of a part including a light guide unit and a dimming device in the display apparatus of Embodiment 1 when viewed from the front. FIGS. 4A and 4B are each a schematic cross-sectional diagram of the dimming device, schematically showing the behavior of the dimming device in the display apparatus of Embodiment 1. FIG. 5 is a schematic diagram showing light propagation in a light guide plate that forms the image display device.

More specifically, the display apparatus of Embodiment 1 or Embodiments 2 to 14 that will be described later is a head mounted display (HMD) including (i) a frame (for example, eyeglasses-type frame 10) mounted onto a head of an observer 20, (ii) an image display device 100, 200, 300, 400, or 500 attached to the frame 10, and (iii) a dimming device 700 configured to adjust the amount of outside light that comes from the outside. Specifically, the display apparatus of Embodiment 1 or Embodiments 2 to 14 that will be described later is of a binocular type including two image display devices, but may be of a monocular type including one image display device. Further, an image forming unit 111 or 211 allows monochrome (for example, green) image display. Light transmittance of a partial area 708 of the dimming device 700 (see a hatched area of FIG. 3B or FIG. 16B that will be described later) may be changed based on a signal for displaying an image on the image display device 100, 200, 300, 400, or 500.

Alternatively, the optical apparatus of Embodiment 1 or Embodiments 2 to 14 that will be described later includes (i) a frame 10 mounted onto a head of an observer 20, (ii) a receiving device, and (iii) a dimming device 700 attached to the frame 10 and configured to adjust the amount of outside light that comes from the outside. Based on a signal received by the receiving device, light transmittance of the dimming device 700 is changed. It should be noted that in Embodiments 2 to 14, the term "display apparatus" will be used for description, instead of the term "optical apparatus".

Specifically, for example, the control device (control circuit or control unit) 18 of the display apparatus, which will be described later, is incorporated with a communication unit (receiving device), or the display apparatus includes a communication unit (receiving device) such as a mobile phone or a smartphone. Further, in the display apparatus, information or data on an image displayed on the image display device or a signal to be received by the receiving device is recorded, stored, and saved in a so-called cloud computer or server, for example. In such a manner, various types of information or data, and signals can be transmitted and received or exchanged between the display apparatus and the cloud computer or the server, and signals based on various types of information or data, i.e., signals for displaying images on the image display device can be received. Further, the receiving device can receive the signals. When the display apparatus receives a signal for displaying an image on the image display device 100, 200, 300, 400, or 500, e.g., electronic mails and various types of information in a variety of sites on the Internet, the light transmittance of the partial area 708 of the dimming device 700 is changed under the control of the control device 18, before the electronic mails and various types of information in a variety of sites on the Internet are displayed on the image display device 100, 200, 300, 400, or 500. Alternatively, the signals for displaying images on the image display device 100, 200, 300, 400, or 500 may be stored in the image display device, e.g., specifically in an image information storage unit 18A in the control device 18, and before images are displayed on the image display device 100, 200, 300, 400, or 500, the light transmittance of the partial area 708 of the dimming device 700 is changed under the control of the control device 18. Alternatively, the light transmittance of the dimming device 700 is changed based on the signal received by the receiving device.

It should be noted that in those states, electronic mails and various types of information in a variety of sites on the Internet and the signals stored in the image display device, e.g., specifically in the control device 18 are not necessarily displayed on the image display device 100, 200, 300, 400, or 500. The change status of the light transmittance of the partial area 708 of the dimming device 700 may include a change from high light transmittance to low light transmittance, a change from low light transmittance to high light transmittance, and a change of high/low light transmittance in a short cycle (a change of light transmittance in blinking state). In the case where the dimming device 700 is already being operated, for example, the light transmittance of the dimming device 700 may be increased. In the case where the dimming device 700 is not operated, the dimming device 700 may be operated to reduce the light transmittance, for example.

When the amount of outside light that passes through the dimming device 700 when the dimming device 700 does not operate is assumed to be "1", it is desirable that the amount of outside light that passes through the dimming device when the dimming device 700 is operating be in the range from 0.3 to 0.8, desirably, 0.5 to 0.8.

The dimming device 700 may be ON at all times, may be operated/not operated (turned ON/OFF) in response to an observer's command (operation), or may be OFF under normal conditions and may start operating in response to a signal for displaying an image on the image display device 100, 200, 300, 400, or 500. In order to be operated/not operated in response to an observer's command (operation), the display apparatus may further include a microphone, and may control the operation of the dimming device 700 in response to an audio input via the microphone, for example. Specifically, the dimming device may be controlled to operate/not to operate in response to a command issued by an observer's voice. Alternatively, the display apparatus may further include an infrared light input/output unit, and using this infrared light input/output unit, may control the operation of the dimming device 700. That is, an observer's blinking may be detected using the infrared light input/output unit to control the dimming device 700 to operate/not to operate.

Each of the image display devices 100, 200, 300, 400, and 500 of Embodiment 1 and Embodiments 2 to 14 that will be described later includes (A) an image forming unit 111 or 211, (B) a light guide unit 120, 320, or 520 configured to input, guide, and output light that is output from the image forming unit 111 or 211, and (C) an optical system (parallel light outputting optical system) 112 or 254 configured to change light output from the image forming unit 111 or 211 into parallel light, in which a light flux changed into the parallel light in the optical system 112 or 254 is input to the light guide unit 120, 320, or 520, guided therethrough, and output therefrom.

The image display device 100, 200, 300, 400, or 500 may be attached to the frame in a fixed manner or detachably. Herein, the optical system 112 or 254 is disposed between the image forming unit 111 or 211 and the light guide unit 120, 320, or 520. The light flux changed into the parallel light in the optical system 112 or 254 is input to the light guide unit 120, 320, or 520, guided therethrough, and output therefrom. Further, the light guide unit 120, 320, or 520 is semi-transmissive (see-through). Specifically, portions of the light guide units, which are opposed to at least the both eyes of the observer 20 (more specifically, light guide plate 121 or 321 and second deflection unit 140 or 340 that will be described later), are semi-transmissive (see-through).

In Embodiment 1 or Embodiments 2 to 14 that will be described later, in a light beam (central incident light beam CL) that is output from the center of the image forming unit 111 or 211 and passes through a nodal point on the image forming unit side of the optical system 112 or 254, it is assumed that a point at which the central incident light beam vertically input to the light guide unit 120 or 320 is input to the light guide unit 120, 320, or 520 is a light guide unit central point O, an axis that passes through the light guide unit central point O and is parallel to the axis direction of the light guide unit 120, 320, or 520 is an X axis, and an axis that passes through the light guide unit central point O and coincides with the normal line of the light guide unit 120, 320, or 520 is a Z axis. It should be noted that the central point of the first deflection unit 130 or 330 that will be described next is the light guide unit central point O. In other words, as shown in FIG. 5, in the image display device 100, 200, 300, 400, or 500, the central incident light beam CL that is output from the center of the image forming unit 111 or 211 and passes through a nodal point on the image forming unit side of the optical system 112 or 254 vertically impinges on the light guide plate 121 or 321. In other words, the central incident light beam CL is input to the light guide plate 121 or 321 at an incident angle of 0 degrees. In this case, the center of the displayed image coincides with a direction of a perpendicular of a first surface 122 or 322 of the light guide plate 121 or 321.

Each of the light guide units 120 and 320 in Embodiment 1 and Embodiments 2 to 4 and 6 to 14 that will be described later includes (a) a light guide plate 121 or 321 configured to output light after input light is propagated inside the light guide plate by total reflection, (b) a first deflection unit 130 or 330 configured to deflect at least part of the light input to the light guide plate 121 or 321, to totally reflect the light input to the light guide plate 121 or 321 inside the light guide plate 121 or 321, and (c) a second deflection unit 140 or 340 configured to deflect the light propagated inside the light guide plate 121 or 321 by total reflection, to output, from the light guide plate 121 or 321, the light propagated inside the light guide plate 121 or 321 by total reflection.

In Embodiment 1 or Embodiments 2 to 14 that will be described later, the dimming device 700 configured to adjust the amount of outside light that comes from the outside is provided to the light guide unit 120, 320, or 520 on the side not provided with the image forming unit 111 or 211. Specifically, using an adhesive 707, the dimming device 700 as a kind of optical shutter is fixed to the light guide unit 120, 320, or 520, specifically, to a protection member (protection plate) 126 or 326 that protects the light guide plate 121 or 321 or a semi-transmissive mirror 520. The dimming device 700 is provided to the area of the light guide unit 120, 320, or 520 on the side opposite to the observer 20. It should be noted that the protection member (protection plate) 126 or 326 is bonded to a second surface 123 or 323 of the light guide plate 121 or 321 using an adhesive 127 or 327, and the protection member (protection plate) 126 or 326 covers the first deflection unit 130 or 330 and the second deflection unit 140 or 340. The second deflection unit 140 or 340 is positioned in the projection image of the dimming device 700.

Here, in Embodiment 1, the first deflection unit 130 and the second deflection unit 140 are disposed inside the light guide plate 121. The first deflection unit 130 reflects light input to the light guide plate 121, and the second deflection unit 140 transmits and reflects the light a plurality of times, the light being propagated inside the light guide plate 121 by total reflection. In other words, the first deflection unit 130 functions as a reflecting mirror and the second deflection unit 140 functions as a semi-transmissive mirror. More specifically, the first deflection unit 130 provided inside the light guide plate 121 is made of aluminum (Al) and is formed of a light reflecting film (a kind of mirror) that reflects the light input to the light guide plate 121. Meanwhile, the second deflection unit 140 provided inside the light guide plate 121 is formed of a multi-layer lamination structure in which many dielectric lamination films are laminated. The dielectric lamination films includes a layer of $TiO_2$ (titanium dioxide) being a high dielectric material, and a layer of $SiO_2$ (silicon dioxide) being a low dielectric material, for example. The multi-layer lamination structure in which many dielectric lamination films are laminated is described in Japanese Unexamined Patent Application Publication No. 2005-521099. Six dielectric lamination films are exemplarily shown in the figures, but this is not restrictive. In the structure, a dielectric lamination film and another dielectric lamination film include therebetween a very thin layer made of the same material as the light guide plate 121. In the first deflection unit 130, in order that the parallel light input to the light guide plate 121 is totally reflected inside the light guide plate 121, the parallel light input to the light guide plate 121 is reflected (or diffracted). Meanwhile, in the second deflection unit 140, the parallel light that is propagated inside the light guide plate 121 by total reflection is reflected (or diffracted) a plurality of times and output from the light guide plate 121 toward the pupil 21 of the observer 20 in the state of parallel light.

The first deflection unit 130 may be formed by cutting out a portion 124 in which the first deflection unit 130 of the light guide plate 121 is to be provided, providing a slope on which the first deflection unit 130 is to be provided to the light guide plate 121, performing vacuum deposition on the slope to obtain a light reflecting film, and then bonding the cut-out portion 124 of the light guide plate 121 to the first deflection unit 130. Further, the second deflection unit 140 may be formed by producing a multi-layer lamination structure in which many dielectric lamination films (formed by vapor deposition, for example) made of the same material as the light guide unit 121, e.g., glass, are laminated, cutting out a portion 125 in which the second deflection unit 140 of the light guide plate 121 is to be provided, to obtain a slope, bonding the multi-layer lamination structure to the slope, and shaping the outline by abrasion, for example. This allows the light guide unit 120 to be obtained, the light guide unit 120 being provided with the light guide plate 121 including the first and second deflection units 130 and 140.

Here, in Embodiment 1 or Embodiments 2 to 4 and 6 to 14 that will be described later, the light guide plate 121 or 321 that is made of an optical glass or a plastic material includes two parallel surfaces (first surface 122 or 322 and second surface 123 or 323) extending parallel to a light propagation direction (X axis) by internal total reflection of the light guide plate 121 or 321. The first surface 122 or 322 and the second surface 123 or 323 are opposed to each other. Parallel light is input from the first surface 122 or 322 that corresponds to a light input surface, and is output from the first surface 122 or 322 that corresponds to a light output surface, after being propagated inside the light guide plate 121 or 321 by total reflection. It should be noted that the light guide plate 121 or 321 is not limited to this configuration, and the light input surface may be formed of the second surface 123 or 323, and the light output surface may be formed of the first surface 122 or 322.

In Embodiment 1 or Embodiment 3 that will be described later, the image forming unit 111 is an image forming unit having a first configuration and includes a plurality of pixels arranged in a two-dimensional matrix. Specifically, the image forming unit 111 includes a reflective spatial light modulation device 150 and a light source 153 formed of a light-emitting diode that emits white light. The entire image forming unit 111 is housed in a casing 113 (in FIG. 1, indicated by alternate long and short dash line). Such a casing 113 is provided with an opening (not shown), and light is output through the opening from the optical system (parallel light outputting optical system, collimating optical system) 112. The reflective spatial light modulation device 150 includes a liquid crystal display (LCD) 151 formed of an LCOS as a light valve, and a polarizing beam splitter 152. The polarizing beam splitter 152 reflects part of light from the light source 153 and guides the light to the liquid crystal display 151, and transmits part of the light reflected by the liquid crystal display 151 and guides the light to the optical system 112. The liquid crystal display 151 includes a plurality of (for example, 640*480) pixels (liquid crystal cells) arranged in a two-dimensional matrix. The polarizing beam splitter 152 has a well-known configuration and structure. Non-polarized light output from the light source 153 impinges on the polarizing beam splitter 152. In the polarizing beam splitter 152, a P-polarized light component passes therethrough and is output to the outside of the system. On the other and, an S-polarized light component is reflected on the polarizing beam splitter 152, input to the liquid crystal display 151, reflected inside the liquid crystal display 151, and output from the liquid crystal display 151. Herein, in the light output from the liquid crystal display 151, light beams output from pixels for displaying "white" contain the P-polarized light component in a high proportion, while light beams output from pixels for displaying "black" contain the S-polarized light component in a high proportion. So, of the light output from the liquid crystal display 151 and impinging on the polarizing beam splitter 152, the P-polarized light component passes through the polarizing beam splitter 152 and is guided to the optical system 112. On the other hand, the S-polarized light component is reflected on the polarizing beam splitter 152 and returned back to the light source 153. The optical system 112 is formed of a convex lens, for example, and in order to generate parallel light, the image forming unit 111 (more specifically, liquid crystal display 151) is disposed at a spot (position) of the focal distance in the optical system 112.

The frame 10 includes a front portion 11 disposed on the front of an observer 20, two temple portions 13 turnably attached to both ends of the front portion 11 via hinges 12, and earpiece portions (also referred to as tip cells, ear pieces, or ear pads) 14 attached to the tip ends of the respective temple portions 13. Further, nose pads (not shown in FIG. 2) are attached to the frame 10. In other words, basically, the assembled body of the frame 10 and the nose pads has substantially the same structure as that of normal eyeglasses. Furthermore, the casings 113 are detachably attached to the temple portions 13 with mounting members 19. The frame 10 is made of metal or plastic. It should be noted that each casing 113 may be attached to the temple portion 13 so as not to be detached with the mounting member 19. Further, for an observer wearing his/her own eyeglasses, each casing 113 may be detachably attached to the temple portion of the frame of the eyeglasses owned by the observer with the mounting member 19. Each casing 113 may be attached to the outer side of the temple portion 13 or to the inner side of the temple portion 13.

Moreover, wires (signal line, power supply line, etc.) 15 extending from one image forming unit 111A are extended from the tip end of the earpiece portion 14 to the outside through the inside of the temple portion 13 and the earpiece portion 14 and are connected to a control device (control circuit or control unit) 18. Moreover, each of the image forming units 111A and 111B includes a headphone portion 16. Headphone portion wires 16', which extend from the respective image forming units 111A and 111B, are extended from the tip ends of the earpiece portions 14 to the headphone portions 16 through the inside of the temple portions 13 and the earpiece portions 14. More specifically, each headphone portion wire 16' is extended to the headphone portion 16 so as to run around the rear side of a pinna (auricle) from the tip end of the earpiece portion 14. Such a configuration can provide a neatly designed display apparatus without giving an impression on messy arrangement of the headphone portions 16 and the headphone portion wires 16'.

The wires (signal line, power supply line, etc.) 15 are connected to the control device (control circuit) 18 as described above. The control device 18 is provided with an image information storage unit 18A, for example. The control device 18 performs processing for image display. The control device 18 and the image information storage unit 18A may be each formed of a well-known circuit.

An imaging device 17 including a solid-state imaging device and a lens (not shown) may be attached to a central part 11' of the front portion 11 with an adequate mounting member (not shown). The solid-state imaging device is formed of a CCD or a CMOS sensor. A signal supplied from the imaging device 17 is transmitted to, for example, the image forming unit 111A via a wire (not shown) extended from the imaging device 17.

The dimming device 700 according to Embodiment 1 is formed of an optical shutter in which a light-transmission control material layer 705 is formed of a liquid crystal material layer. Specifically, the dimming device 700 includes a transparent first substrate 701 opposed to the light guide unit 120, a transparent second substrate 703 opposed to the first substrate 701, a first electrode 702 and a second electrode 704 that are provided to the first substrate 701 and the second substrate 703, respectively, and the light-transmission control material layer 705 that is sealed between the first substrate 701 and the second substrate 703. Herein, the first substrate 701 and the second substrate 703 are each made of a plastic material. Further, the first electrode 702 and the second electrode 704 are each formed of a transparent electrode made of indium tin oxide (ITO) and each formed by a combination of PVD such as sputtering and lifting off. Specifically, the light-transmission control material layer 705 is formed of a liquid crystal material layer made of a TN (Twisted Nematic) liquid crystal material. The first electrode 702 and the second electrode 704 are provided by patterning, and the light transmittance of the partial area 708 of the dimming device 700 may be changed to be different from light transmittance of another area. The first electrode 702 and the second electrode 704 are connected to the control device 18 via connectors and wires (not shown). The two substrates 701 and 703 are sealed together at outer edge portions using a sealing agent 706. The first substrate 701 of the dimming device 700 and the protection member 126 (protecting the light guide plate 121) are bonded to each other by the adhesive 707. Further, polarizer films are affixed to the outer surfaces of the first substrate 701 and the second substrate 703, but those polarizer films are not shown. The first substrate 701 in the dimming device 700 is shorter than the light guide plate 121, and the first substrate 701 in the dimming device 700 is fixed to the protection member 126 using the adhesive 707. The adhesive 707 is provided at the outer edge portion of the first substrate 701. This is applicable also to other Embodiments to be described below. The light guide unit 120 and the dimming device 700 are disposed in this order from the observer's side.

The light transmittance of the dimming device 700 may be controlled by a voltage applied to the first electrode 702 and the second electrode 704. Specifically, for example, when a voltage is applied to the first electrode 702 with the second electrode 704 being grounded, this causes a change of liquid crystal alignment in the liquid crystal material layer forming the light-transmission control material layer 705, so that the light transmittance of the liquid crystal material layer is changed (see FIGS. 4A and 4B). For voltage application to the first electrode 702 and the second electrode 704, an observer may operate a control knob provided to the control device 18. That is, the observer may adjust the light transmittance of the dimming device 700 while observing images provided by the light guide unit 120 or 320.

As described above, in the display apparatus of Embodiment 1, since the light transmittance of the partial area of the dimming device is changed based on a signal for displaying an image on the image display device, this allows the observer to easily, reliably, and immediately recognize that an image is displayed. Alternatively, this allows the observer to easily and reliably recognize that an image is to be displayed. Alternatively, in the optical apparatus of Embodiment 1, since the light transmittance of the dimming device is changed based on a signal received by the receiving device, this allows the observer to easily, reliably, and immediately recognize that the receiving device receives a signal.

It should be noted that in Embodiment 1 described above, the dimming device 700 is attached to the image display device 100, i.e., specifically, the dimmer unit 700 is attached to the light guide plate 121. Alternatively, the dimming device 700 may be attached to the frame 10 or to the casing 113.

Figure 30:
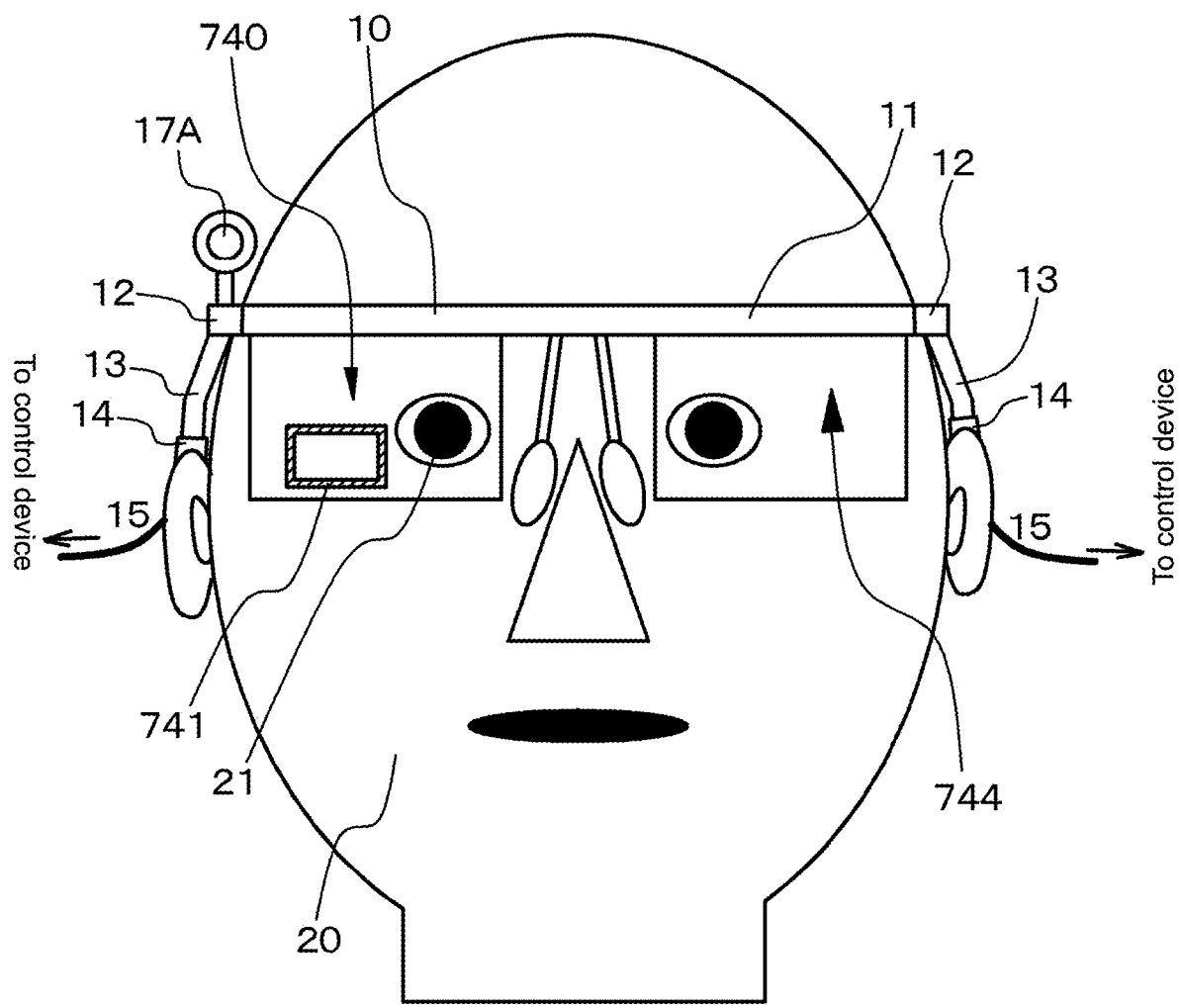
FIG. 30 is a schematic diagram of an optical apparatus and the like of Embodiment 15 when viewed from the front.

Further, in each of the optical apparatuses of Embodiments 1 to 14, the dimming device may be attached to the frame without providing the image display device (see FIG. 30, for example). In other words, the dimming device may include a first substrate, a second substrate opposed to the first substrate, a first electrode and a second electrode provided to the first substrate and the second substrate, respectively, and a light-transmission control material layer sealed between the first substrate and the second substrate, and at least one of the first substrate and the second substrate may be attached to the frame. The same holds true for Embodiment 15 to be described later. The dimming device may be attached to the lenses of normal eyeglasses, or the lenses and the dimming device may be apposed and attached to the frame.

[Embodiment 2]

Figure 6:
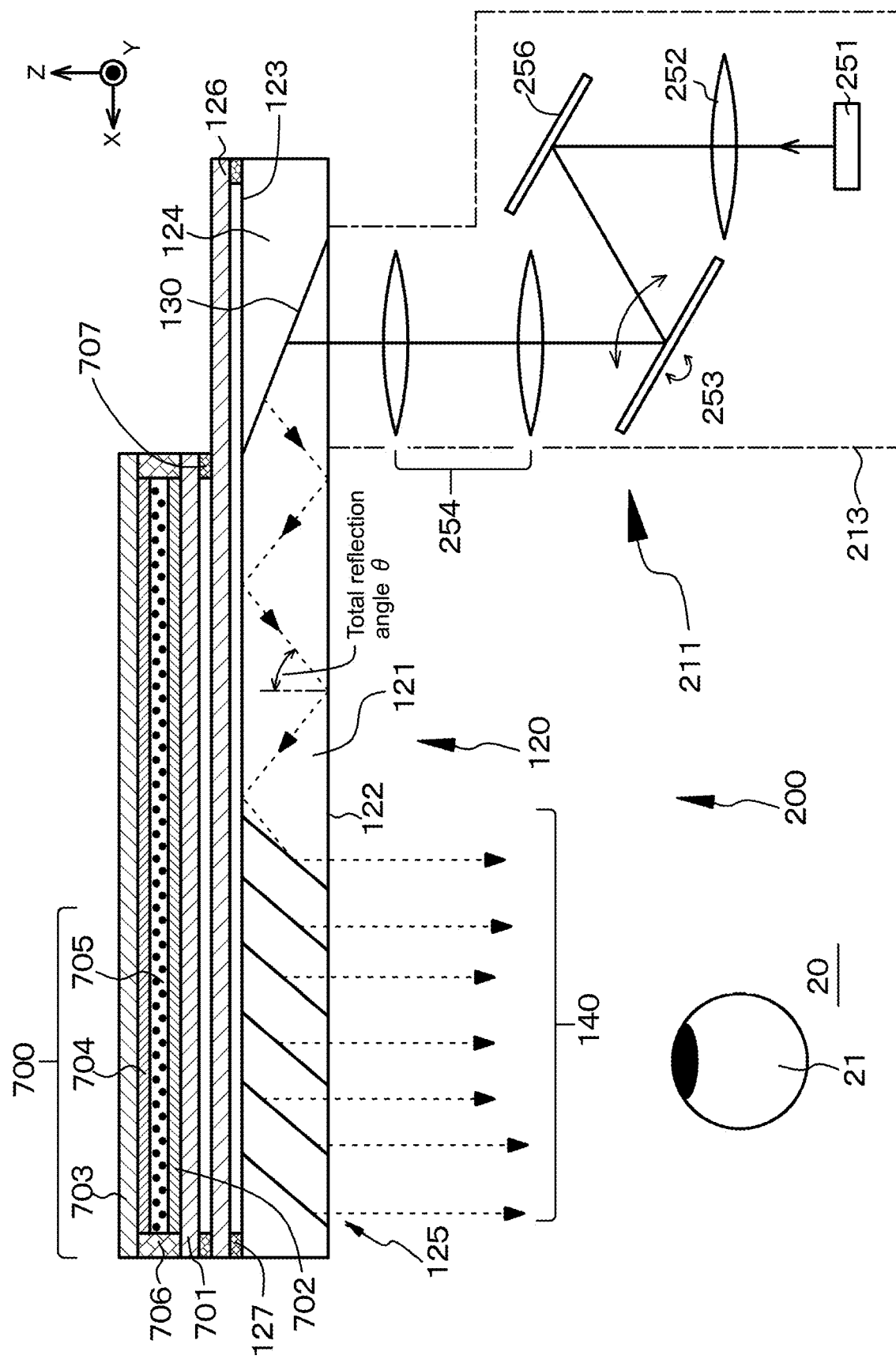
FIG. 6 is a conceptual diagram of an image display device in a display apparatus of Embodiment 2.

Embodiment 2 is a modification of Embodiment 1. As FIG. 6 shows a conceptual diagram of an image display device 200 in a display apparatus (head mounted display) of Embodiment 2, an image forming unit 211 in Embodiment 2 is formed of an image forming unit having a second configuration. In other words, the image forming unit 211 includes a light source 251 and a scanning unit 253 configured to scan parallel light output from the light source 251. More specifically, the image forming unit 211 includes (i) the light source 251, (ii) a collimating optical system 252 configured to change light output from the light source 251 into parallel light, (iii) the scanning unit 253 configured to scan the parallel light output from the collimating optical system 252, and (iv) a relay optical system 254 configured to relay the parallel light scanned by the scanning unit 253 for output therefrom. It should be noted that the entire image forming unit 211 is housed in a casing 213 (in FIG. 6, indicated by alternate long and short dash line). Such a casing 213 is provided with an opening (not shown), and light is output through the opening from the relay optical system 254. Each casing 213 is detachably attached to the temple portion 13 with the mounting member 19.

The light source 251 is formed of a light-emitting diode that emits white light. The light output from the light source 251 is input to the collimating optical system 252 having a positive optical power as a whole and is output as parallel light. The parallel light is reflected on a total reflection mirror 256. Horizontal scanning and vertical scanning are performed by the scanning unit 253 including a MEMS. The MEMS includes a micromirror that is rotatable in two-dimensional directions and with which the incident parallel light can be scanned in a two-dimensional manner. By the scanning, the parallel light is converted into a kind of two-dimensional image, resulting in the generation of virtual pixels (the number of pixels is, for example, the same as in Embodiment 1). The light from the virtual pixels passes through the relay optical system (parallel light outputting optical system) 254 formed of a well-known relay optical system, and a light flux changed into parallel light is input to the light guide unit 120.

The light guide unit 120, to which the light flux changed into the parallel light in the relay optical system 254 is input, through which the light flux is guided, and from which the light flux is output, has the same configuration and structure as the light guide unit described in Embodiment 1, and thus detailed description thereof will be omitted. Further, as described above, the display apparatus of Embodiment 2 also has substantially the same configuration and structure as the display apparatus of Embodiment 1 except for the difference on the image forming unit 211, and thus detailed description thereof will be omitted.

[Embodiment 3]

Figure 7:
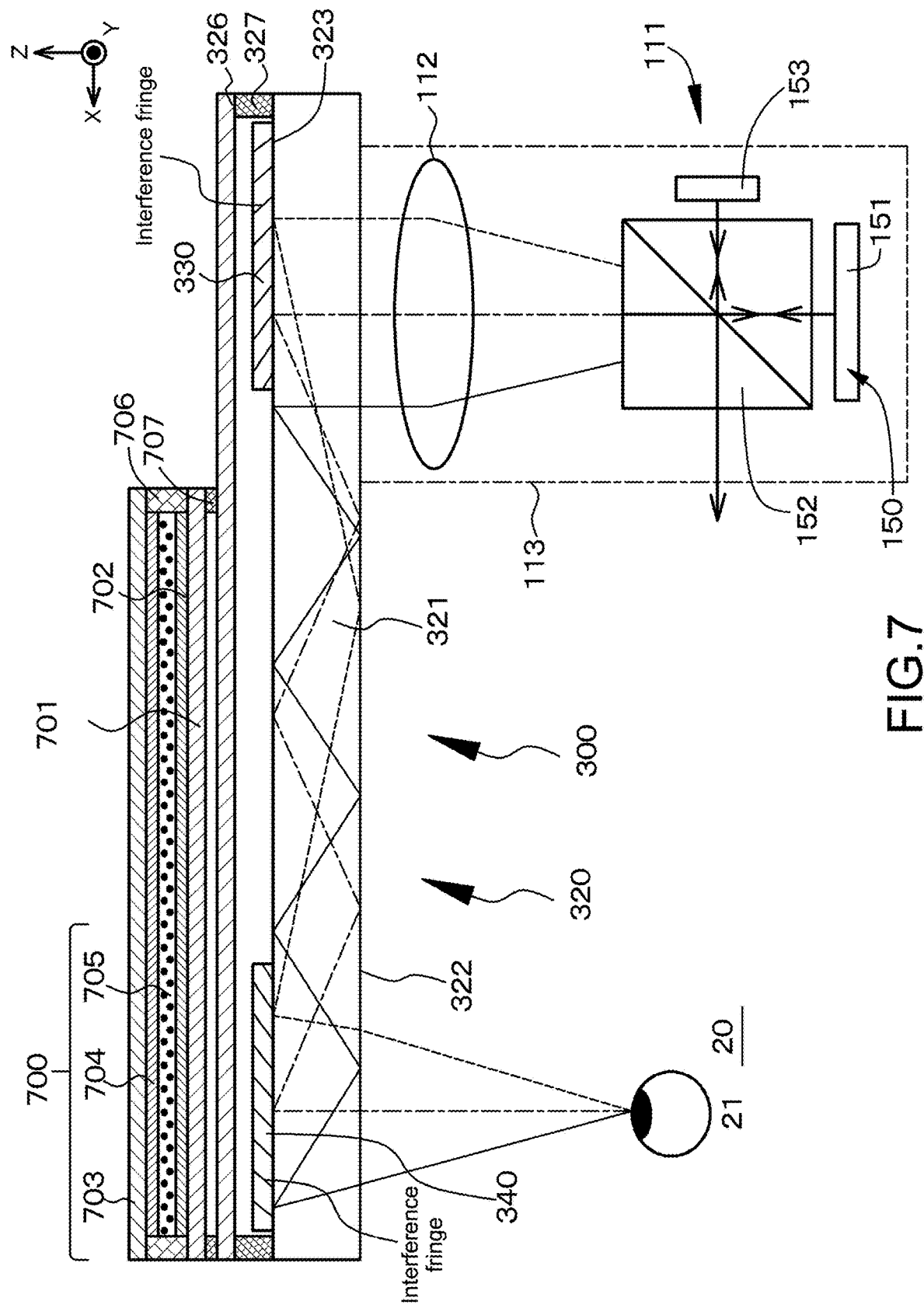
FIG. 7 is a conceptual diagram of an image display device in a display apparatus of Embodiment 3.
Figure 8:
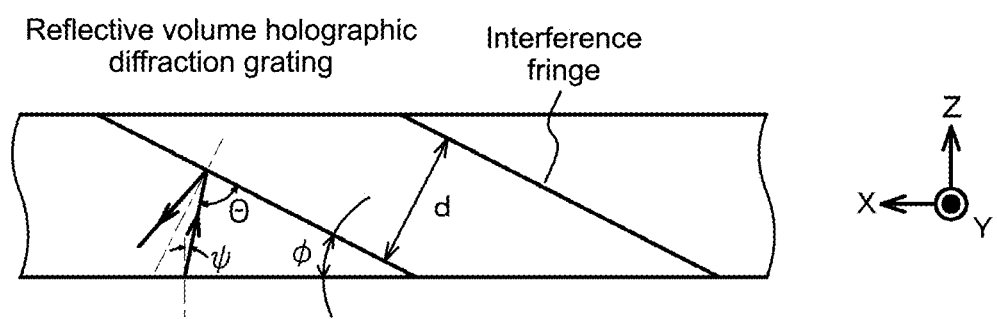
FIG. 8 is a schematic cross-sectional diagram of a reflective volume holographic diffraction grating in a partially enlarged form in the display apparatus of Embodiment 3.

Embodiment 3 is also a modification of Embodiment 1. FIG. 7 is a conceptual diagram of an image display device 300 in a display apparatus (head mounted display) of Embodiment 3. FIG. 8 is a schematic cross-sectional diagram of a reflective volume holographic diffraction grating in a partially enlarged form. In Embodiment 3, the image forming unit 111 is formed of the image forming unit having a first configuration, similarly in Embodiment 1. A light guide unit 320 is basically the same as the light guide unit 120 in Embodiment 1 in terms of structure and configuration except for differences in structures and configurations of the first deflection unit and the second deflection unit.

In Embodiment 3, the first deflection unit and the second deflection unit are disposed on a surface of the light guide plate 321 (specifically, on the second surface 323 of the light guide plate 321). The first deflection unit diffracts and reflects light input to the light guide plate 321, and the second deflection unit diffracts and reflects the light a plurality of times, the light being propagated inside the light guide plate 321 by total reflection. Herein, the first deflection unit and the second deflection unit are each a diffraction grating element, specifically a reflective diffraction grating element, and more specifically a reflective volume holographic diffraction grating. In the description below, the first deflection unit formed of a reflective volume holographic diffraction grating is referred to as a "first diffraction grating member 330" for convenience sake, and the second deflection unit formed of a reflective volume holographic diffraction grating is referred to as a "second diffraction grating member 340" for convenience sake.

In Embodiment 3 or Embodiment 4 that will be described later, the first diffraction grating member 330 and the second diffraction grating member 340 are each a laminate structure of a single diffraction grating layer. Each diffraction grating layer is made of photopolymer, and is provided with an interference pattern formed to correspond to one type of wavelength band (or wavelength). The diffraction grating layer is produced by a method in related art. The interference pattern formed on the diffraction grating layer (diffraction optical element) is constant in pitch, and is linear and parallel to the Y axis. The axes of the first diffraction grating member 330 and the second diffraction grating member 340 are both parallel to the X axis, and the normal lines thereto are parallel to the Z axis.

FIG. 8 is a schematic cross-sectional diagram of a reflective volume holographic diffraction grating in a partially enlarged form. In the reflective volume holographic diffraction grating, an interference fringe having an angle of inclination (slant angle) $\varphi$ is formed. Herein, the angle of inclination $\varphi$ means an angle formed by the surface of the reflective volume holographic diffraction grating and the interference fringe. The interference fringe is formed inside and over the surface of the reflective volume holographic diffraction grating. The interference fringe satisfies a Bragg's Law. Herein, the Bragg's Law indicates a condition that satisfies the following expression (A), where m represents a positive integer, $\lambda$ represents a wavelength, d represents a pitch of a lattice plane (intervals of normal line direction of the virtual plane including the interference fringe), and $\theta$ represents a complementary angle of the incident angle to the interference fringe. Further, a relationship among a complementary angle $\theta$, an angle of inclination $\varphi$, and an incident angle $\psi$ when light enters the diffraction grating member at the incident angle $\psi$ is expressed by the following expression (B).

$$m \cdot \lambda = 2 \cdot d \cdot \sin(\theta) \quad (A)$$

$$\theta = 90° - (\varphi + \psi) \quad (B)$$

As described above, the first diffraction grating member 330 is disposed on (bonded to) the second surface 323 of the light guide plate 321, and in order that the parallel light input from the first surface 322 to the light guide plate 321 is totally reflected inside the light guide plate 321, the first diffraction grating member 330 diffracts and reflects the parallel light input to the light guide plate 321. Further, as described above, the second diffraction grating member 340 is disposed on (bonded to) the second surface 323 of the light guide plate 321, diffracts and reflects the parallel light a plurality of times, the parallel light being propagated inside the light guide plate 321 by total reflection, and outputs the parallel light as it is from the first surface 322 of the light guide plate 321.

Also in the light guide plate 321, the parallel light is propagated inside the light guide plate 321 by total reflection and then output therefrom. At that time, since the light guide plate 321 is thin and an optical path travelling inside the light guide plate 321 is long, the number of times the total reflection occurs until the light reaches the second diffraction grating member 340 differs depending on each angle of view. More specifically, in the parallel light that is input to the light guide plate 321, the number of reflections of the parallel light that is input at an angle of a direction approaching the second diffraction grating member 340 is smaller than the number of reflections of the parallel light that is input to the light guide plate 321 at an angle of a direction moving apart from the second diffraction grating member 340. This is because parallel light that is diffracted and reflected in the first diffraction grating member 330 and is input to the light guide plate 321 at an angle of a direction approaching the second diffraction grating member 340 has a smaller angle formed together with the normal line of the light guide plate 321 when the light propagated inside the light guide plate 321 impinges on the internal surface of the light guide plate 321, than parallel light that is input to the light guide plate 321 at an angle of a direction opposite to the direction approaching the second diffraction grating member 340. Further, the interference fringes formed in the second diffraction grating member 340 and the interference fringes formed in the first diffraction grating member 330 are symmetrical with respect to the virtual plane, which is vertical to the axis of the light guide plate 321. The surfaces of the first diffraction grating member 330 and the second diffraction grating member 340, which are not opposed to the light guide plate 321, are each covered with the protection member (protection plate) 326 so as to prevent the first diffraction grating member 330 and the second diffraction grating member 340 from being damaged. It should be noted that the light guide plate 321 and the protection member 326 are bonded to each other in their outer circumferential portions with the adhesive 327. Alternatively, the light guide plate 321 may be protected by attaching a transparent protection film to the first surface 322.

The light guide plate 321 in Embodiment 4 that will be described later is basically the same as the light guide plate 321 described above in terms of structure and configuration.

As described above, the display apparatus of Embodiment 3 has substantially the same structure and configuration as the display apparatus of Embodiment 1 except for the difference in the light guide unit 320, and thus detailed description thereof will be omitted.

[Embodiment 4]

Figure 9:
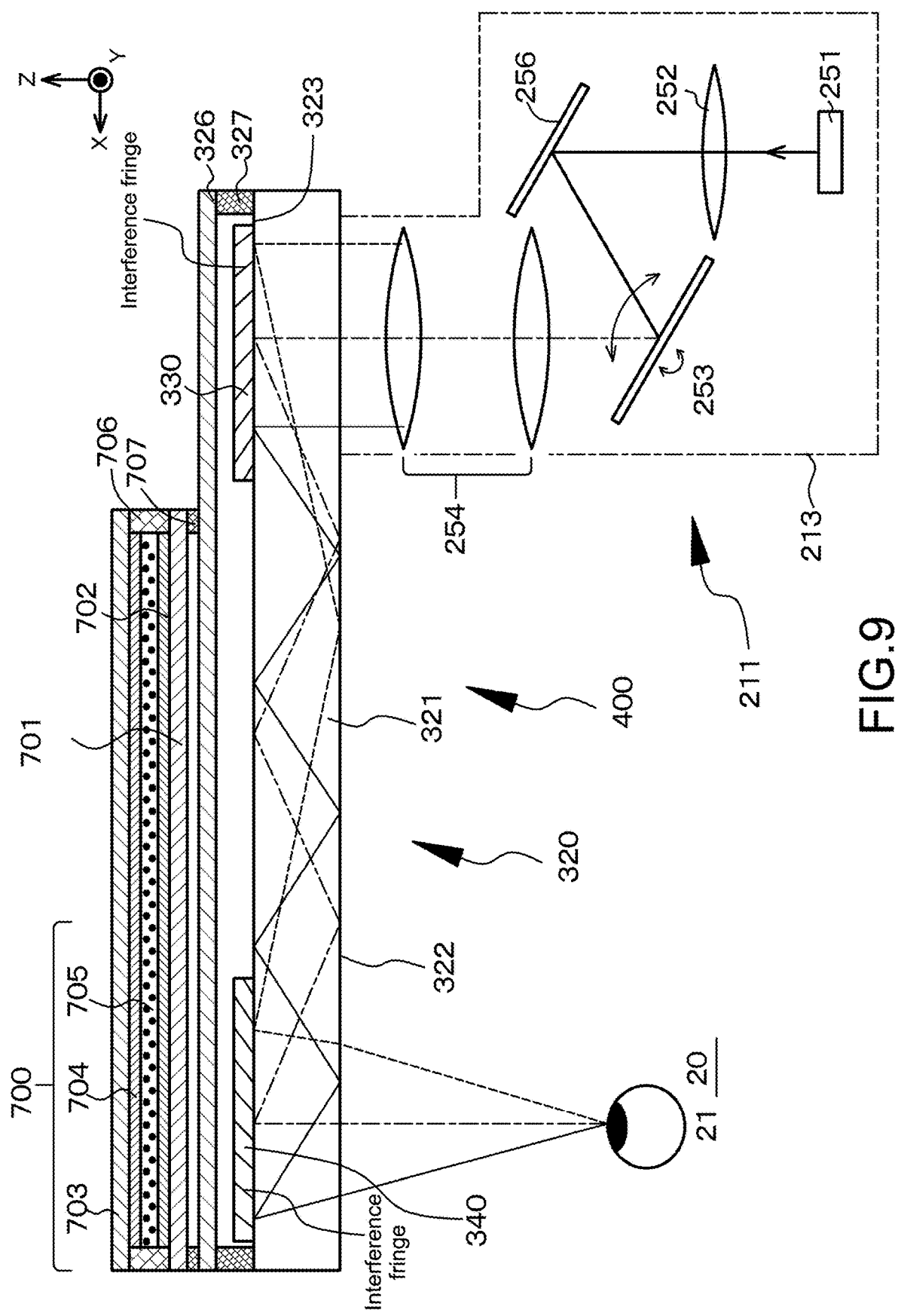
FIG. 9 is a conceptual diagram of an image display device in a display apparatus of Embodiment 4.

Embodiment 4 is a modification of Embodiment 3. FIG. 9 is a conceptual diagram of an image display device in a display apparatus (head mounted display) of Embodiment 4. The components in an image display device 400 of Embodiment 4, i.e., the light source 251, the collimating optical system 252, the scanning unit 253, the parallel light outputting optical system (relay optical system 254), and the like are in the same structure and configuration as those in Embodiment 2 (the image forming unit having a second configuration). A light guide unit 320 of Embodiment 4 has the same structure and configuration as the light guide unit 320 in Embodiment 3. The display apparatus of Embodiment 4 has substantially the same structure and configuration as the display apparatus of Embodiment 2 except for the differences described above, and thus detailed description thereof will be omitted.

[Embodiment 5]

Figure 10:
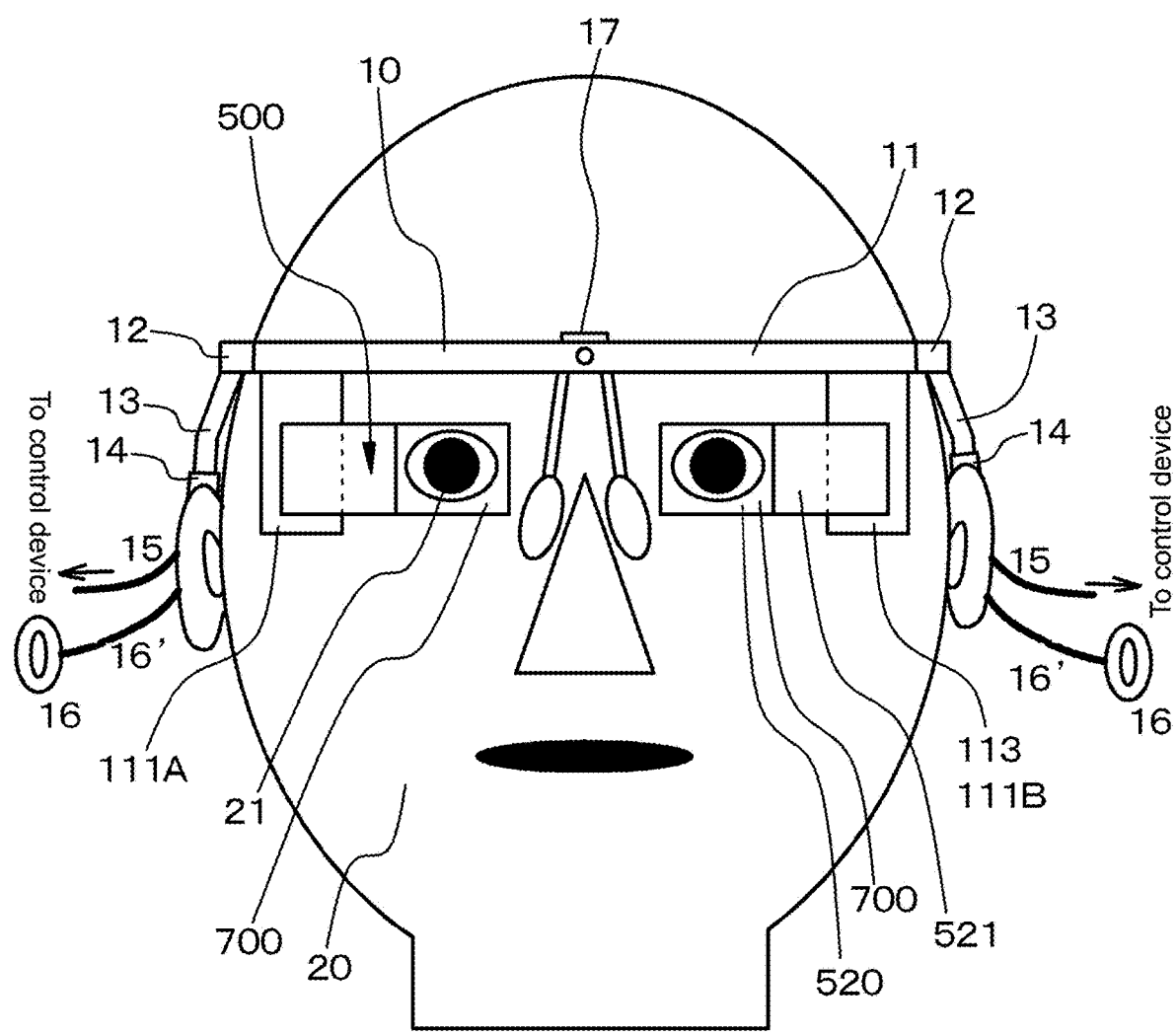
FIG. 10 is a schematic diagram of a display apparatus of Embodiment 5 when viewed from the front.
Figure 11:
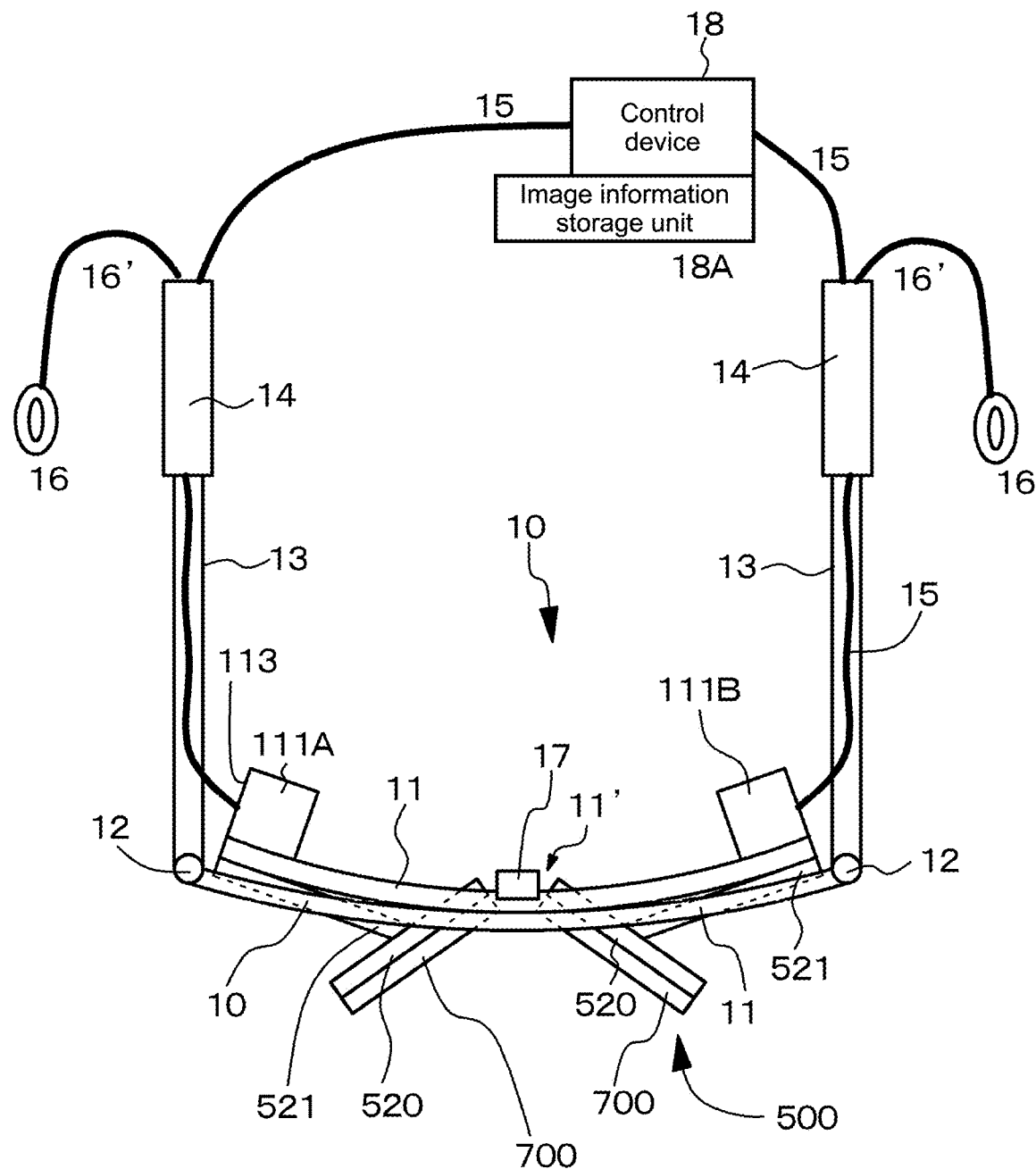
FIG. 11 is a schematic diagram of the display apparatus of Embodiment 5 when viewed from above.

Embodiment 5 is also a modification of the image display devices of Embodiments 1 to 4. FIG. 10 is a schematic diagram of a display apparatus of Embodiment 5 when viewed from the front, and FIG. 11 is a schematic diagram of the display apparatus when viewed from above.

In Embodiment 5, a light guide unit 520 that forms an image display device 500 is formed of a semi-transmissive mirror. Light output from the image forming unit 111A or 111B is input to the semi-transmissive mirror and output therefrom toward a pupil 21 of an observer 20. It should be noted that Embodiment 5 has a structure in which the light output from the image forming unit 111A or 111B is propagated inside a transparent member 521 made of a glass plate, a plastic plate, or the like and input to the light guide unit 520 (semi-transmissive mirror), but may have a structure in which the light is propagated in air and input to the light guide unit 520. Further, the image forming unit may be the image forming unit 211 described in Embodiment 2.

Each of the image forming units 111A and 111B is attached to the front portion 11 with use of screws, for example. Further, the member 521 is attached to each of the image forming units 111A and 111B, the light guide unit 520 (semi-transmissive mirror) is attached to the member 521, and the dimming device 700 is attached to the light guide unit 520 (semi-transmissive mirror). The display apparatus of Embodiment 5 also has substantially the same configuration and structure as the display apparatuses of Embodiments 1 to 4 except for the difference described above, and thus detailed description thereof will be omitted.

[Embodiment 6]

Figure 12A:
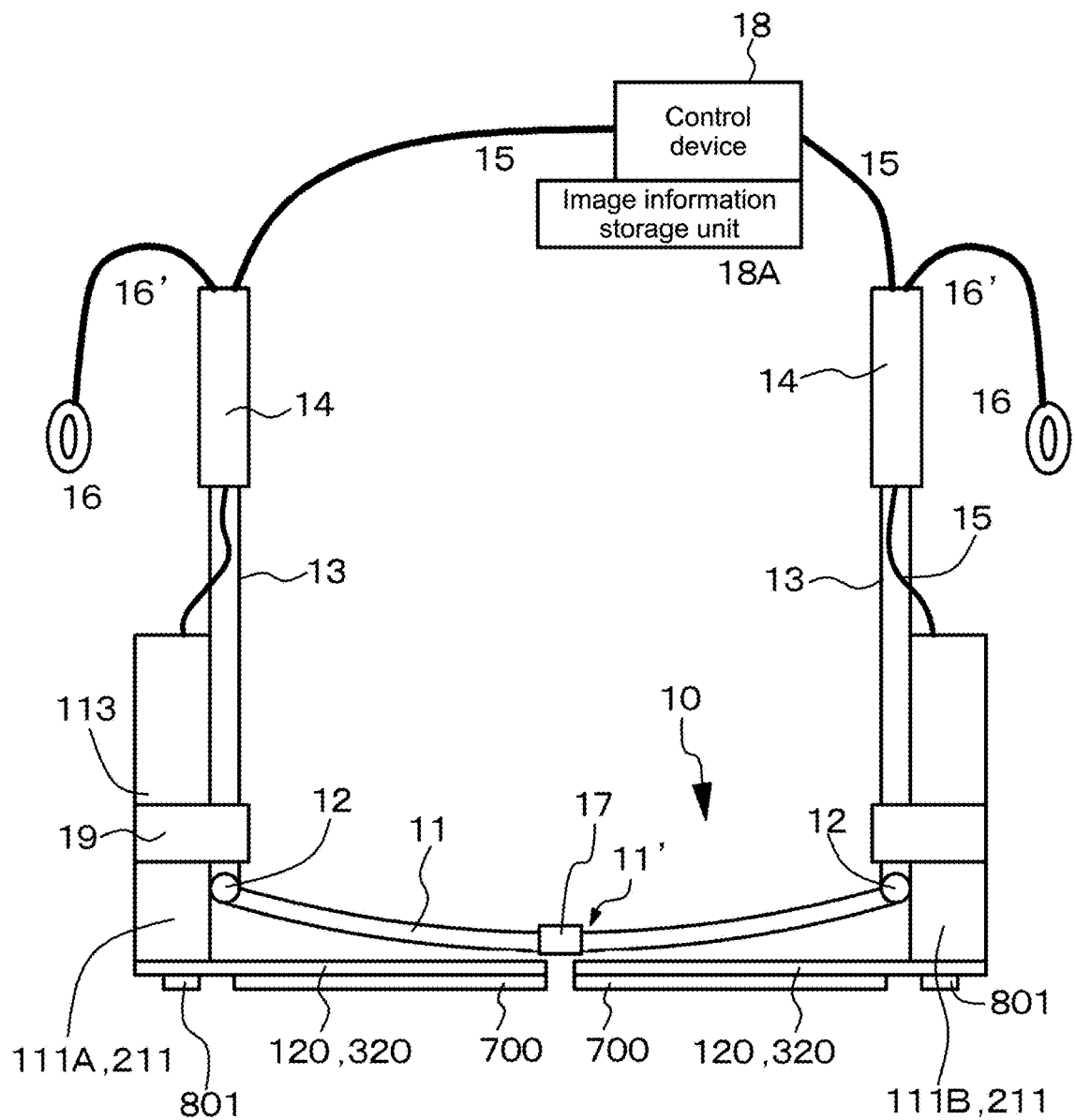
FIGS. 12A and 12B are a schematic diagram of a display apparatus of Embodiment 6 when viewed from above and a schematic diagram of a circuit for controlling an illumination sensor, respectively.
Figure 12B:
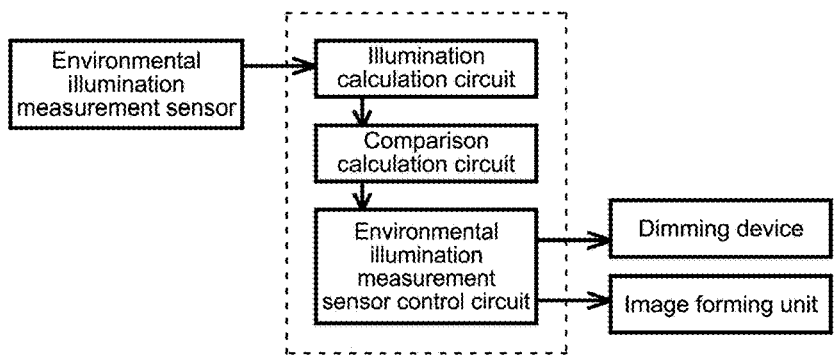

Embodiment 6 is also a modification of Embodiments 1 to 4. FIG. 12A is a schematic diagram of a display apparatus of Embodiment 6 when viewed from above, and FIG. 12B is a schematic diagram of a circuit for controlling an illumination sensor. The display apparatus of Embodiment 6 further includes a sensor 801 that measures the brightness in the outside environment. Based on a measurement result of the brightness in the outside environment obtained by the sensor (hereinafter, referred to as "first illumination sensor" for convenience sake) 801, light transmittance of a partial area of the dimming device 700 is changed.

In other words, the display apparatus of Embodiment 6 further includes the first illumination sensor (environmental illumination measurement sensor) 801 that measures the illumination in the environment where the display apparatus is disposed. The display apparatus controls the light transmittance of the dimming device 700 based on the measurement result of the first illumination sensor 801. Together with or separately from the control over the light transmittance, the display apparatus controls the luminance of images to be formed by the image forming unit 111 or 211 based on the measurement result of the first illumination sensor 801. The first illumination sensor 801 in the well-known structure and configuration may be provided to the outer end portion of the light guide unit 120 or 320, or to the outer end portion of the dimming device. The first illumination sensor 801 is connected to the control device 18 via connectors and wires (not shown). The control device 18 includes a circuit for controlling the first illumination sensor 801. This circuit for controlling the first illumination sensor 801 includes an illumination calculation circuit, a comparison calculation circuit, and an environmental illumination measurement sensor control circuit. The illumination calculation circuit calculates the illumination based on the measurement value provided by the first illumination sensor 801. The comparison calculation circuit compares the calculation result of the illumination calculation circuit, i.e., illumination value, with a standard value. The environmental illumination measurement sensor control circuit controls the dimming device 700 and/or the image forming unit 111 or 211 based on the value obtained by the comparison calculation circuit. Those circuits may be each formed of a well-known circuit. For controlling the dimming device 700, the light transmittance therein is controlled, and for controlling the image forming unit 111 or 211, the luminance of images to be formed thereby is controlled. It should be noted that the control over the light transmittance in the dimming device 700 and the control over the luminance of images formed by the image forming unit 111 or 211 may be executed separately or executed in correlation with each other.

For example, when the first illumination sensor 801 shows the measurement result of a predetermined value (first illumination measurement value) or higher, the dimming device 700 is adjusted to have the light transmittance of a predetermined value (first light transmittance) or lower. On the other hand, when the first illumination sensor 801 shows the measurement result of a predetermined value (second illumination measurement value) or lower, the dimming device 700 is adjusted to have the light transmittance of a predetermined value (second light transmittance) or higher. Herein, the first illumination measurement value may be 10 lux, the first light transmittance may take any value in a range from 1% to 30% inclusive, the second illumination measurement value may be 0.01 lux, and the second light transmittance may take any value in a range from 51% to 99% inclusive, for example.

The first illumination sensor (environmental illumination measurement sensor) 801 in Embodiment 6 is applicable to the display apparatuses described in Embodiments 2 to 5. When the display apparatus is provided with an imaging device, the first illumination sensor 801 may be formed of light-receiving elements provided to the imaging device for exposure measurement.

In the display apparatus of Embodiment 6 or Embodiment 7 that will be described next, the light transmittance of the dimming device is controlled based on the measurement result of the first illumination sensor (environmental illumination measurement sensor), and the luminance of images to be formed by the image forming unit is controlled also based on the measurement result of the first illumination sensor. Moreover, as will be described next, the light transmittance of the dimming device is controlled based on the measurement result of the second illumination sensor (transmitted-light illumination measurement sensor), and the luminance of images to be formed by the image forming unit is controlled also based on the measurement result of the second illumination sensor. This can provide high-contrast to images viewed by an observer, and also optimize the surrounding conditions for observer's image observation while being dependent on the illumination in the ambient environment where the display apparatus is disposed.

[Embodiment 7]

Figure 13A:
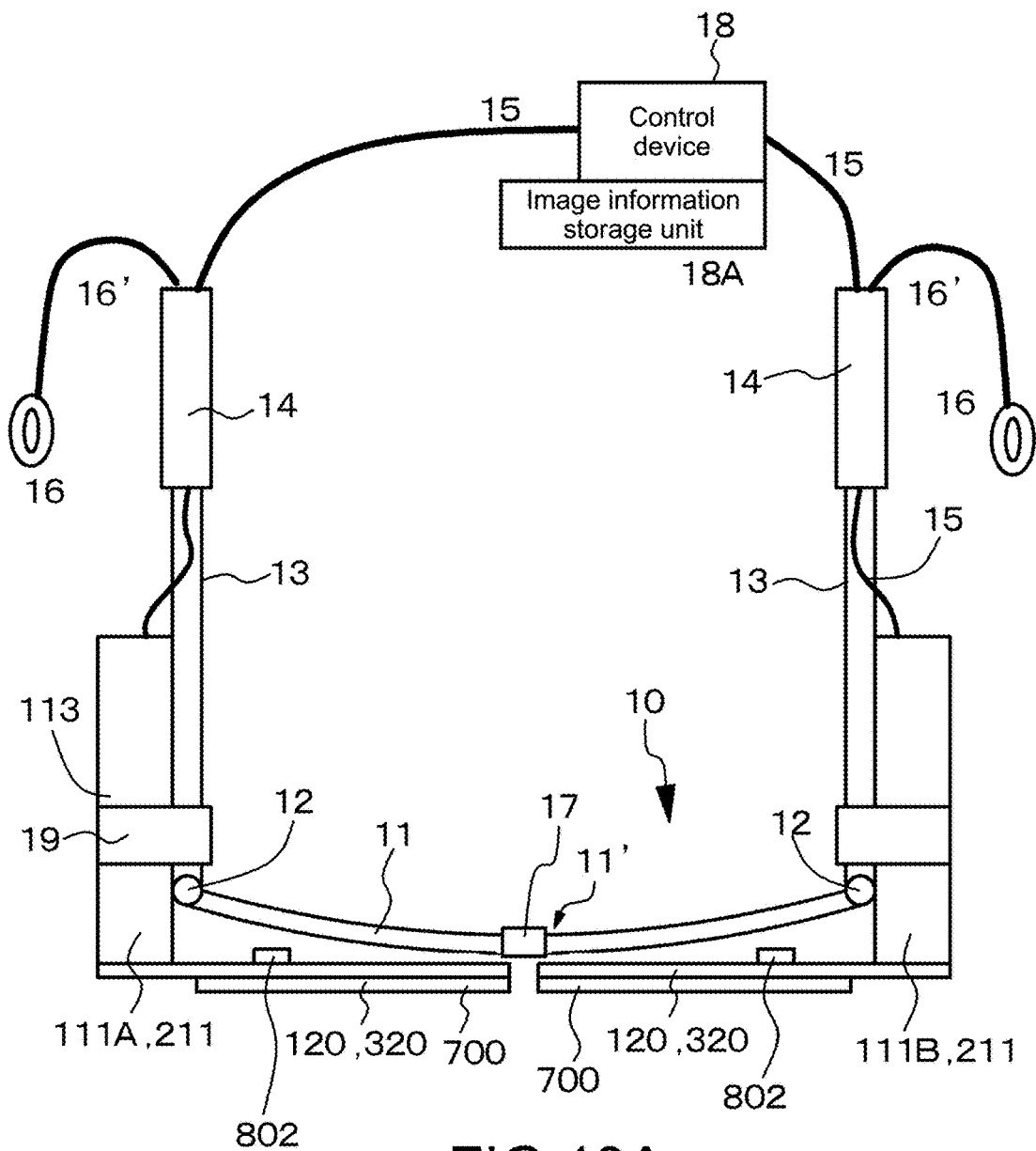
FIGS. 13A and 13B are a schematic diagram of a display apparatus of Embodiment 7 when viewed from above and a schematic diagram of a circuit for controlling an illumination sensor, respectively.
Figure 13B:
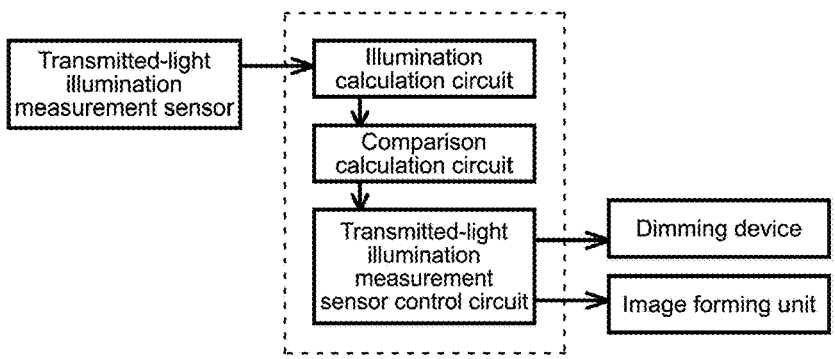

Embodiment 7 is also a modification of Embodiments 1 to 4. FIG. 13A is a schematic diagram of a display apparatus of Embodiment 7 when viewed from above, and FIG. 13B is a schematic diagram of a circuit for controlling an illumination sensor.

The display apparatus of Embodiment 7 further includes a second illumination sensor (transmitted-light illumination measurement sensor) 802 that measures the illumination based on light that passes through the dimming device from the outside environment, that is, measures the illumination of environment light, i.e., whether the light is adjusted to have a desired value of illumination after passing through the dimming device. The measurement result of the second illumination sensor 802 is used as a basis to control the light transmittance of the dimming device 700. Together with or separately from the control over the light transmittance, the display apparatus controls the luminance of images to be formed by the image forming unit 111 or 211 based on the measurement result of the second illumination sensor 802. The second illumination sensor 802 in the well-known structure and configuration is disposed closer to the observer's side in relation to the light guide unit 120, 320, or 520. Specifically, the second illumination sensor 802 may be disposed to face the surface of the light guide unit 121 or 321 on the observer's side. The second illumination sensor 802 is connected to the control device 18 via connectors and wires (not shown). The control device 18 includes a circuit for controlling the second illumination sensor 802. This circuit for controlling the second illumination sensor 802 includes an illumination calculation circuit, a comparison calculation circuit, and a transmitted-light illumination measurement sensor control circuit. The illumination calculation circuit calculates the illumination based on the measurement value provided by the second illumination sensor 802. The comparison calculation circuit compares the calculation result of the illumination calculation circuit, i.e., illumination value, with a standard value. The transmitted-light illumination measurement sensor control circuit controls the dimming device 700 and/or the image forming unit 111 or 211 based on the value obtained by the comparison calculation circuit. Those circuits may be each formed of a well-known circuit. For controlling the dimming device 700, the light transmittance therein is controlled, and for controlling the image forming unit 111 or 211, the luminance of images to be formed thereby is controlled. It should be noted that the control over the light transmittance in the dimming device 700 and the control over the luminance of images formed by the image forming unit 111 or 211 may be executed separately or executed in correlation with each other. Considering the illumination measured by the first illumination sensor 801, when the measurement result of the second illumination sensor 802 shows that the illumination is not controlled to obtain a desired value of illumination, i.e., the measurement result of the second illumination sensor 802 is not of a desired value of illumination, or when a delicate illumination adjustment is still expected, the dimming device may be adjusted in light transmittance while monitoring the value of the second illumination sensor 802.

The second illumination sensor (transmitted-light illumination measurement sensor) 802 in Embodiment 7 is applicable to the display apparatuses described in Embodiments 2 to 4. Alternatively, the second illumination sensor 802 in Embodiment 7 may be combined with the first illumination sensor 801 in Embodiment 6 for use. If this is the case, with various tests, the control over the light transmittance in the dimming device 700 may be executed separately from or in correlation with the control over the luminance of images to be formed by the image forming unit 111 or 211.

[Embodiment 8]

Figure 14:
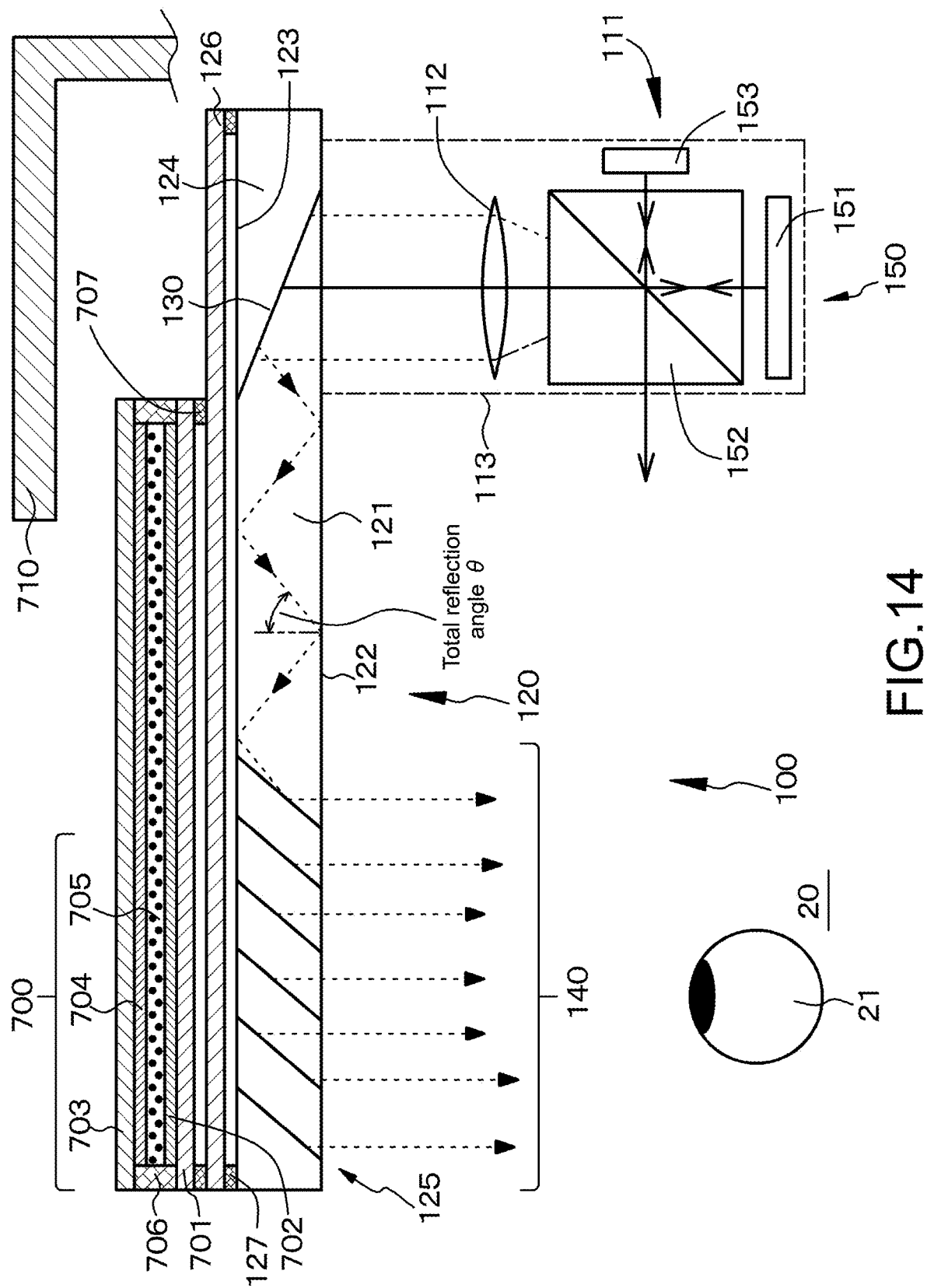
FIG. 14 is a conceptual diagram of an image display device in a display apparatus of Embodiment 8.
Figure 15:
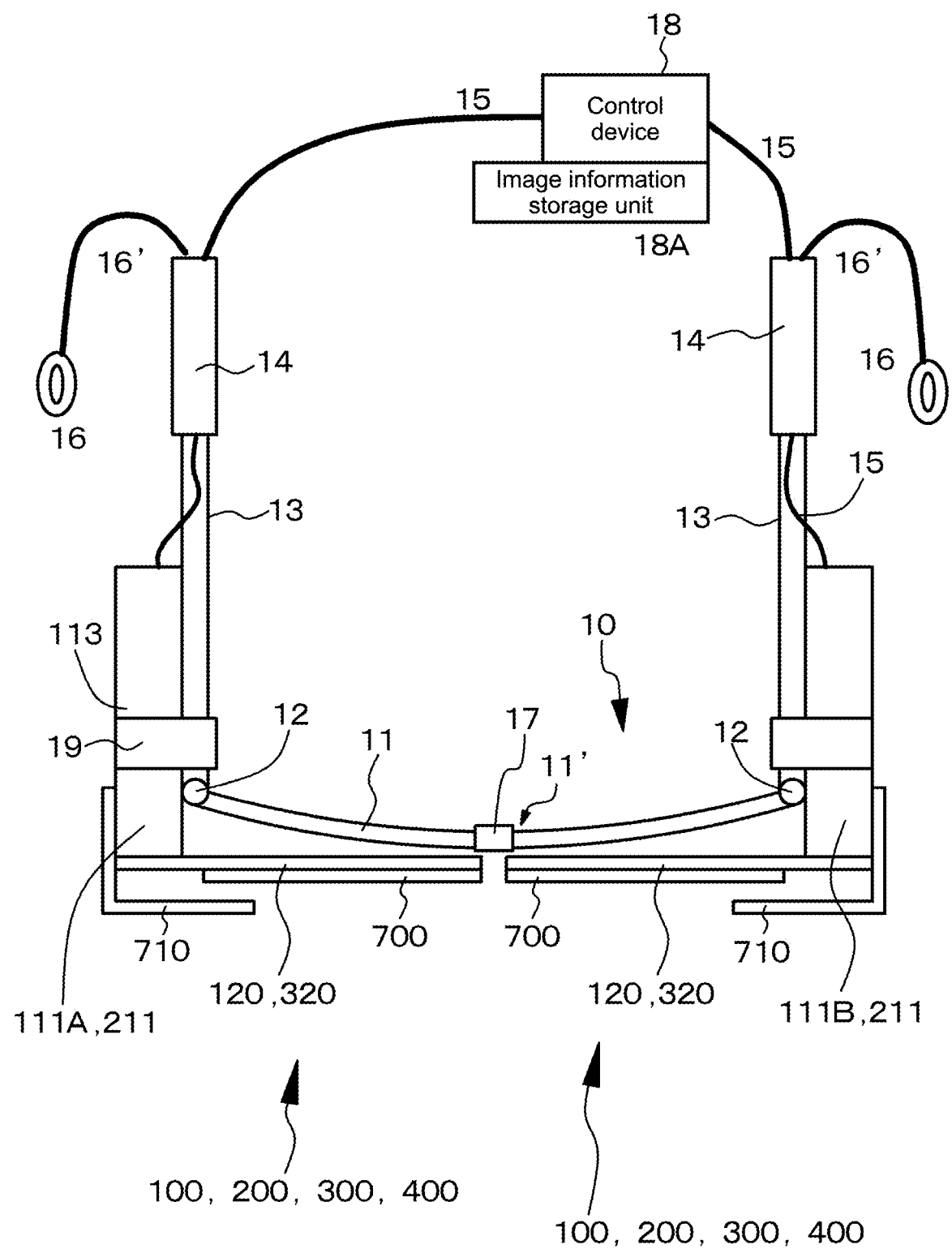
FIG. 15 is a schematic diagram of the display apparatus of Embodiment 8 when viewed from above.
Figure 16A:
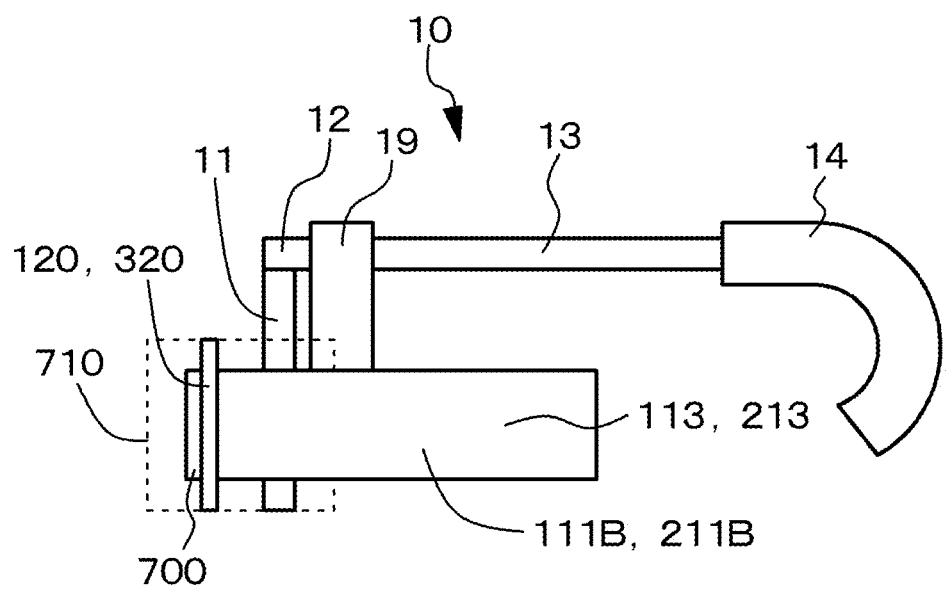
FIGS. 16A and 16B are a schematic diagram of the display apparatus of Embodiment 8 when viewed from a lateral direction and a schematic diagram of a part including a light guide unit and a dimming device in the display apparatus of Embodiment 8 when viewed from the front, respectively.
Figure 16B:
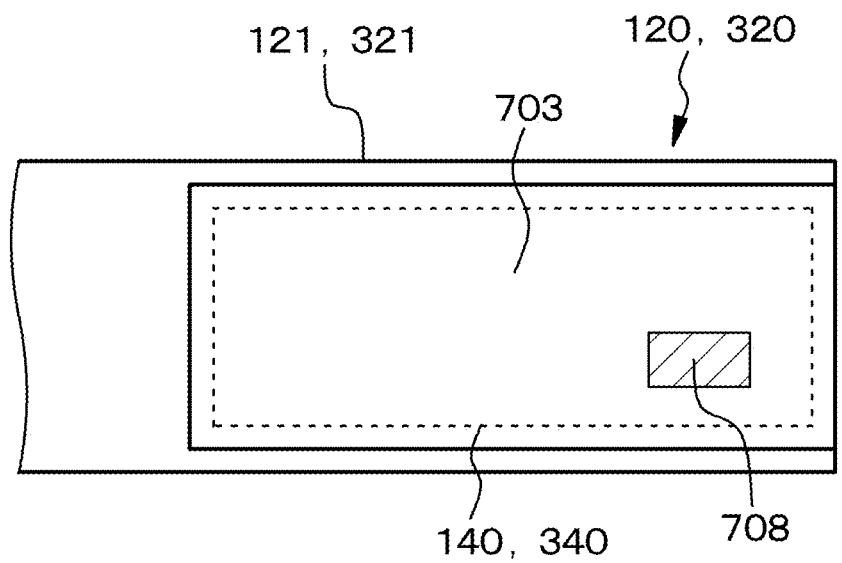
Figure 17:
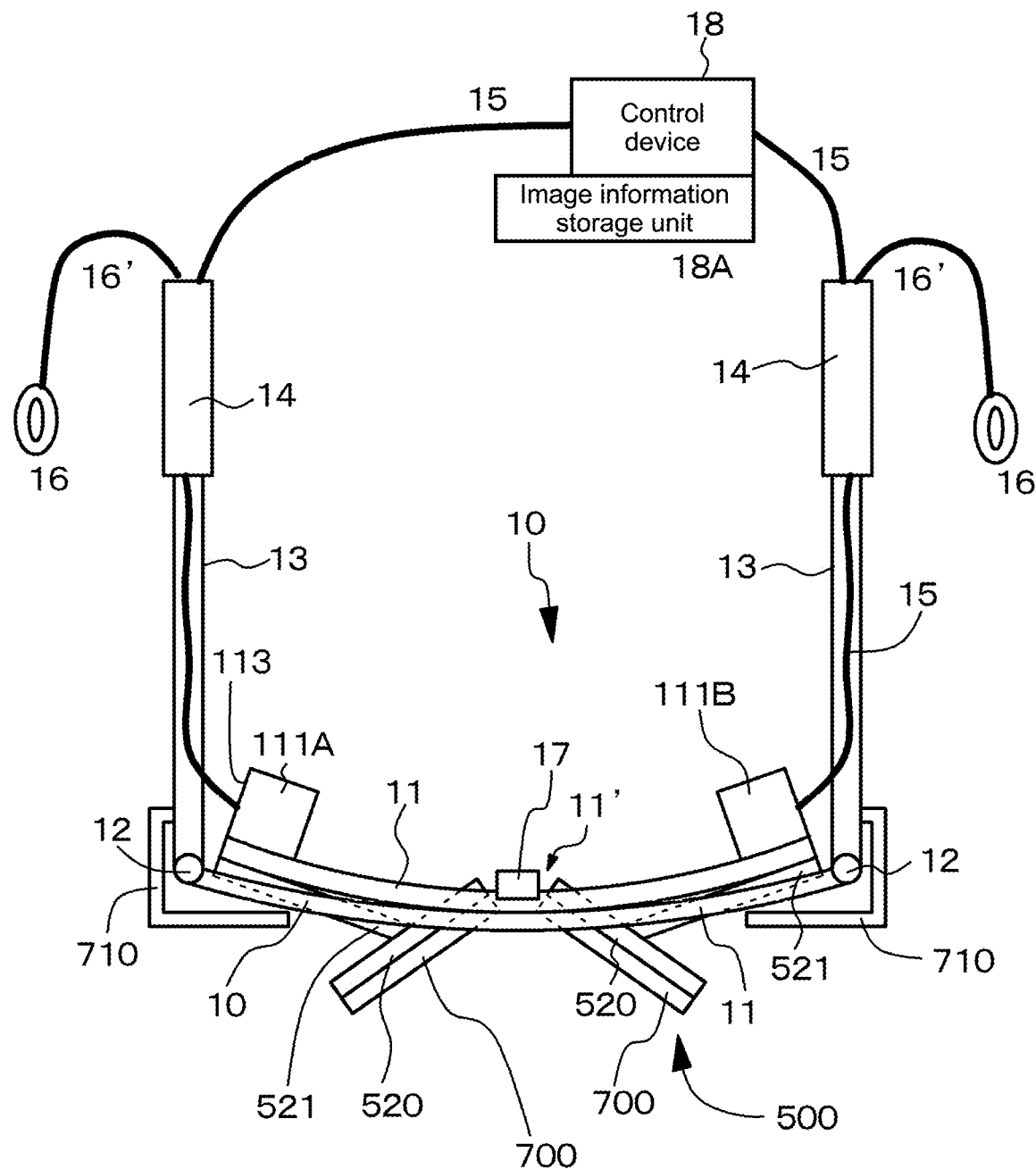
FIG. 17 is a conceptual diagram of a modification of the display apparatus of Embodiment 8.

Embodiment 8 is a modification of Embodiments 1 to 7 and relates to the display apparatus according to the second embodiment of the present disclosure. FIG. 14 is a conceptual diagram of an image display device of Embodiment 8. FIG. 15 is a schematic diagram of the display apparatus (specifically, head mounted display (HMD)) of Embodiment 8 when viewed from above. FIG. 16A is a schematic diagram of the display apparatus when viewed from a lateral direction. FIG. 16B is a schematic diagram of a part including a light guide unit and a dimming device in the display apparatus when viewed from the front. In FIG. 16A, a light shielding member is indicated by a dotted line. Further, FIG. 17 is a conceptual diagram of a modification of the display apparatus of Embodiment 8. An example shown in FIG. 15 is a modification of the display apparatuses of Embodiments 1 to 4, and an example shown in FIG. 17 is a modification of the display apparatus of Embodiment 5.

In the display apparatus of Embodiment 8, a light shielding member 710 is provided to an area of the light guide unit 120 where light output from the image forming unit 111A or 111B is input, specifically to an area where the first deflection unit 130 is provided. This light shielding member 710 is for shielding the light guide unit 120 from the outside light. Herein, the projection image of the light shielding member 710 toward the light guide unit 120 includes the area of the light guide unit 120 where the light output from the image forming unit 111A or 111B is input. The projection image of the light shielding member 710 toward the light guide unit 120 also includes the projection image of the end of the dimming device 700 toward the light guide unit 120.

In Embodiment 8, the light shielding member 710 is provided to the light guide unit 120 on the side not provided with the image forming unit 111A or 111B, and is provided with a distance from the light guide unit 120. The light shielding member 710 is made of a non-transparent plastic material, for example. This light shielding member 710 is integrally extended from the casing 113 of the image display device 111A or 111B, or is attached to the casing 113 of the image forming unit 111A or 111B. Alternatively, the light shielding member 710 is integrally extended from the frame 10, or is attached to the frame 10. In the shown example, the light shielding member 710 is integrally extended from the casing 113 of the image forming unit 111A or 111B.

In the display apparatus of Embodiment 8, the light shielding member is provided to an area of the light guide unit where light output from the image forming unit is input. This light shielding member is for shielding the light guide unit from the outside light. Therefore, even if the operation of the dimming device changes the amount of incoming outside light, this does not cause degradation in image quality on the display apparatus with no undesired stray light because no outside light enters the area of the light guide unit where light output from the image forming unit is input, i.e., the first deflection unit 130, in the first place.

[Embodiment 9]

Figure 18:
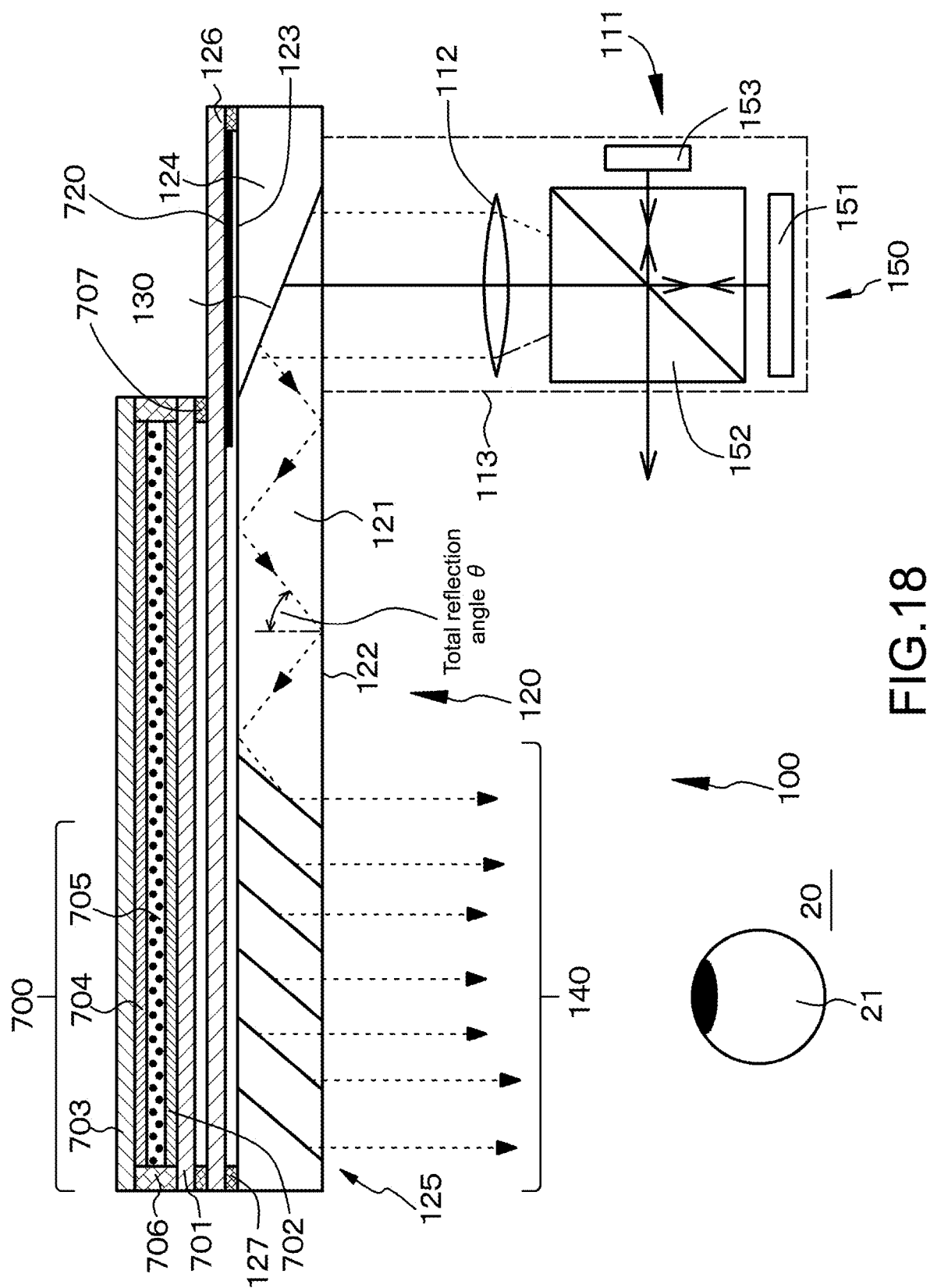
FIG. 18 is a conceptual diagram of an image display device in a display apparatus of Embodiment 9.

Embodiment 9 is a modification of Embodiment 8. As shown in a conceptual diagram of FIG. 18, unlike the display apparatus of Embodiment 8, a display apparatus of Embodiment 9 includes a light shielding member 720 in a portion of the light guide unit 120 on the side not provided with the image forming unit 111A or 111B. Specifically, the light shielding member 720 may be formed by printing on the light guide unit 120 (specifically on the inner surface of the protection member 126) using a non-transparent ink. Except for the above, the display apparatus of Embodiment 9 has the same structure and configuration as the display apparatus of Embodiment 8, and thus detailed description thereof will be omitted. The light shielding member 720 of Embodiment 9 may be combined with the light shielding member 710 of Embodiment 8 for use. The light shielding member 720 may be formed on the outer surface of the protection member 126.

[Embodiment 10]

Figure 19:
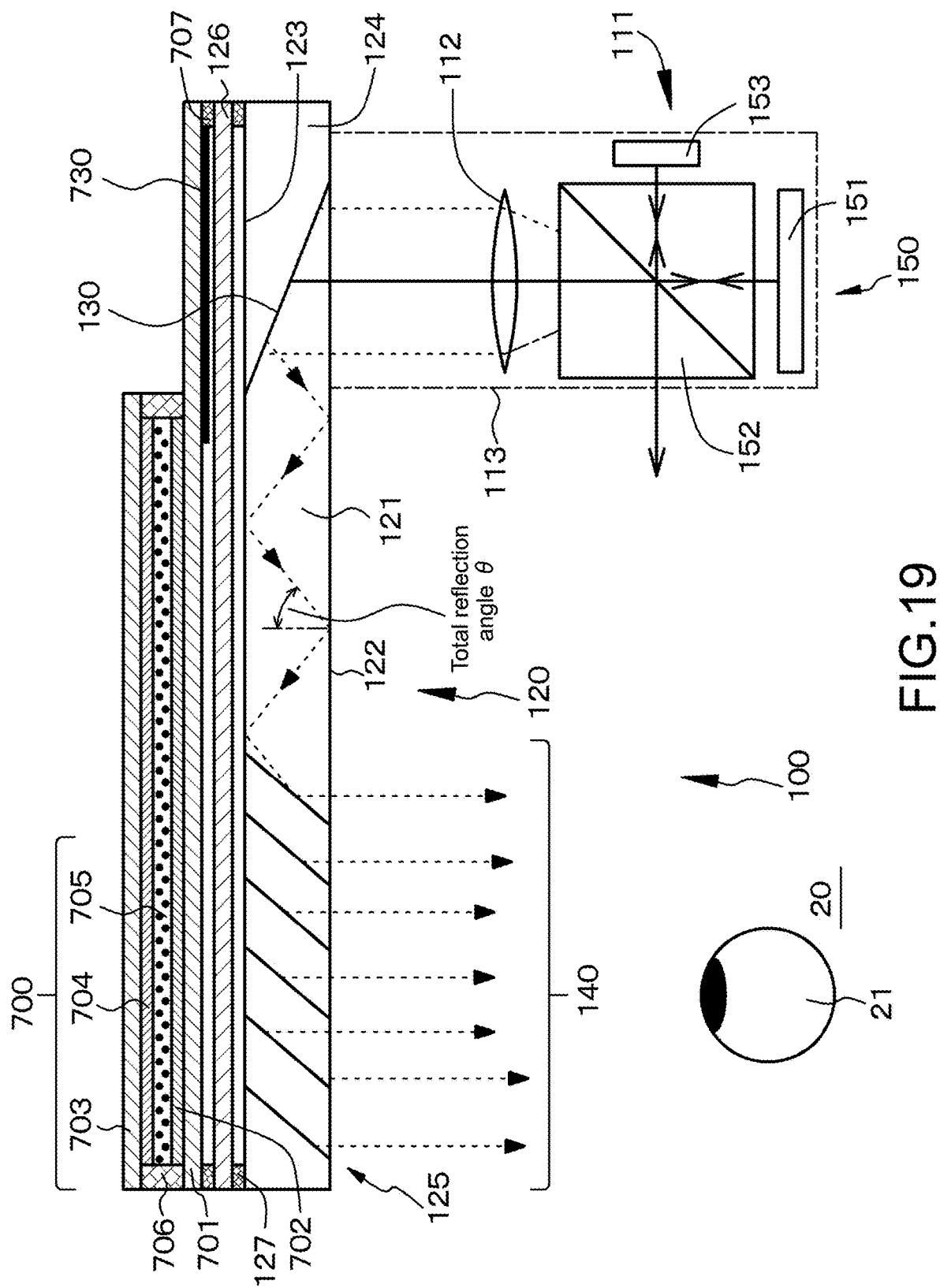
FIG. 19 is a conceptual diagram of an image display device in a display apparatus of Embodiment 10.
Figure 20:
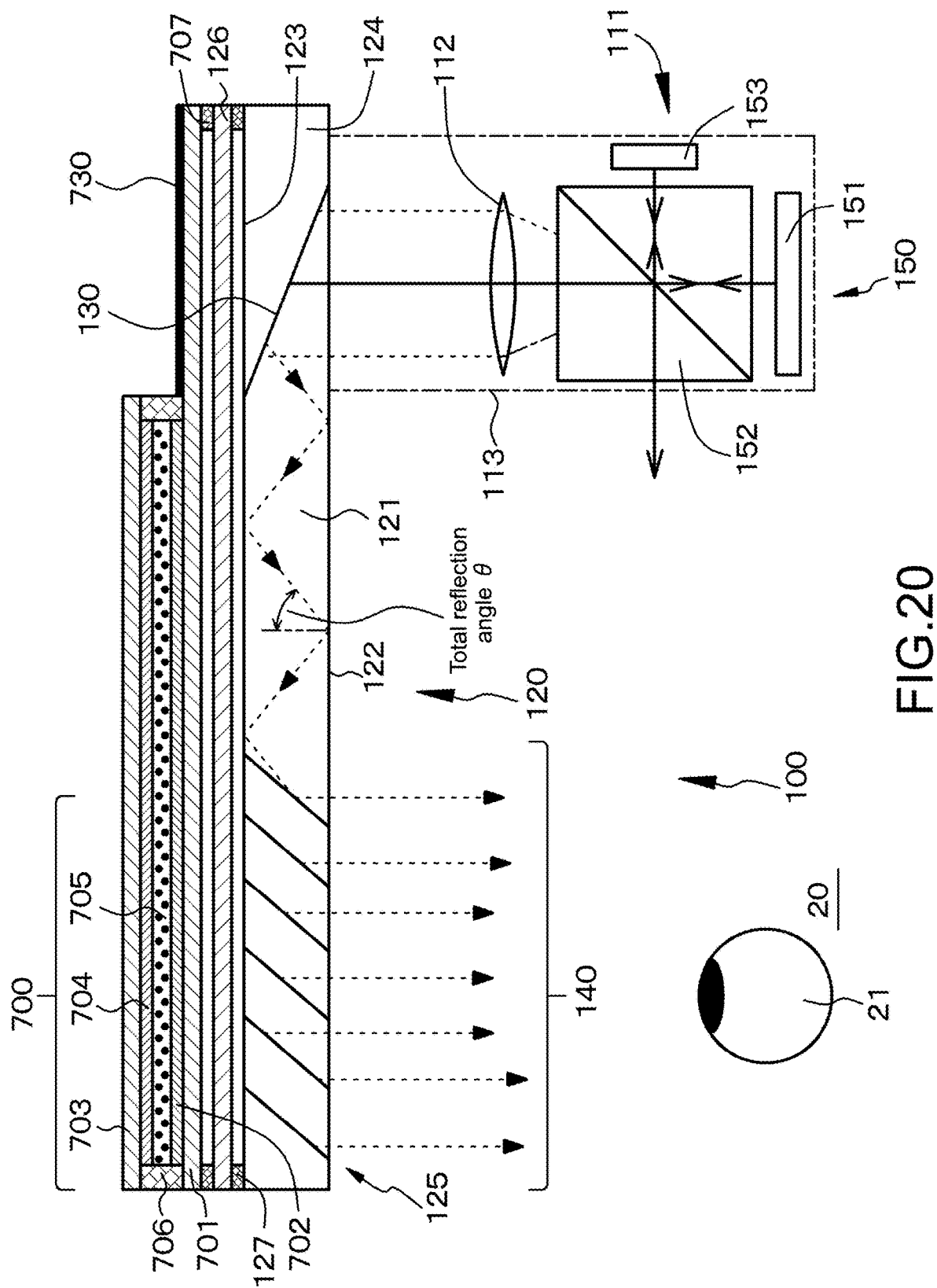
FIG. 20 is a conceptual diagram of a modification of the image display device in the display apparatus of Embodiment 10.

Embodiment 10 is also a modification of Embodiment 8. As shown in a conceptual diagram of FIG. 19 or 20, unlike the display apparatuses of Embodiments 8 and 9, a display apparatus of Embodiment 10 includes a light shielding member 730 in the dimming device 700. Specifically, the light shielding member 730 may be formed by printing on the dimming device 700 using a non-transparent ink. In the example of FIG. 19, the light shielding member 730 is formed on the outer surface of the first substrate 701 in the dimming device 700, and in the example of FIG. 20, the light shielding member 730 is formed on the inner surface of the first substrate 701 in the dimming device 700. Except for the above, the display apparatus of Embodiment 10 has the same structure and configuration as the display apparatus of Embodiment 8, and thus detailed description thereof will be omitted. The light shielding member 730 of Embodiment 10 may be combined with the light shielding member 710 of Embodiment 8 for use, the light shielding member 730 of Embodiment 10 may be combined with the light shielding member 720 of Embodiment 9 for use, or the light shielding member 730 of Embodiment 10 may be combined with the light shielding members 710 and 720 of Embodiments 8 and 9.

[Embodiment 11]

Figure 21:
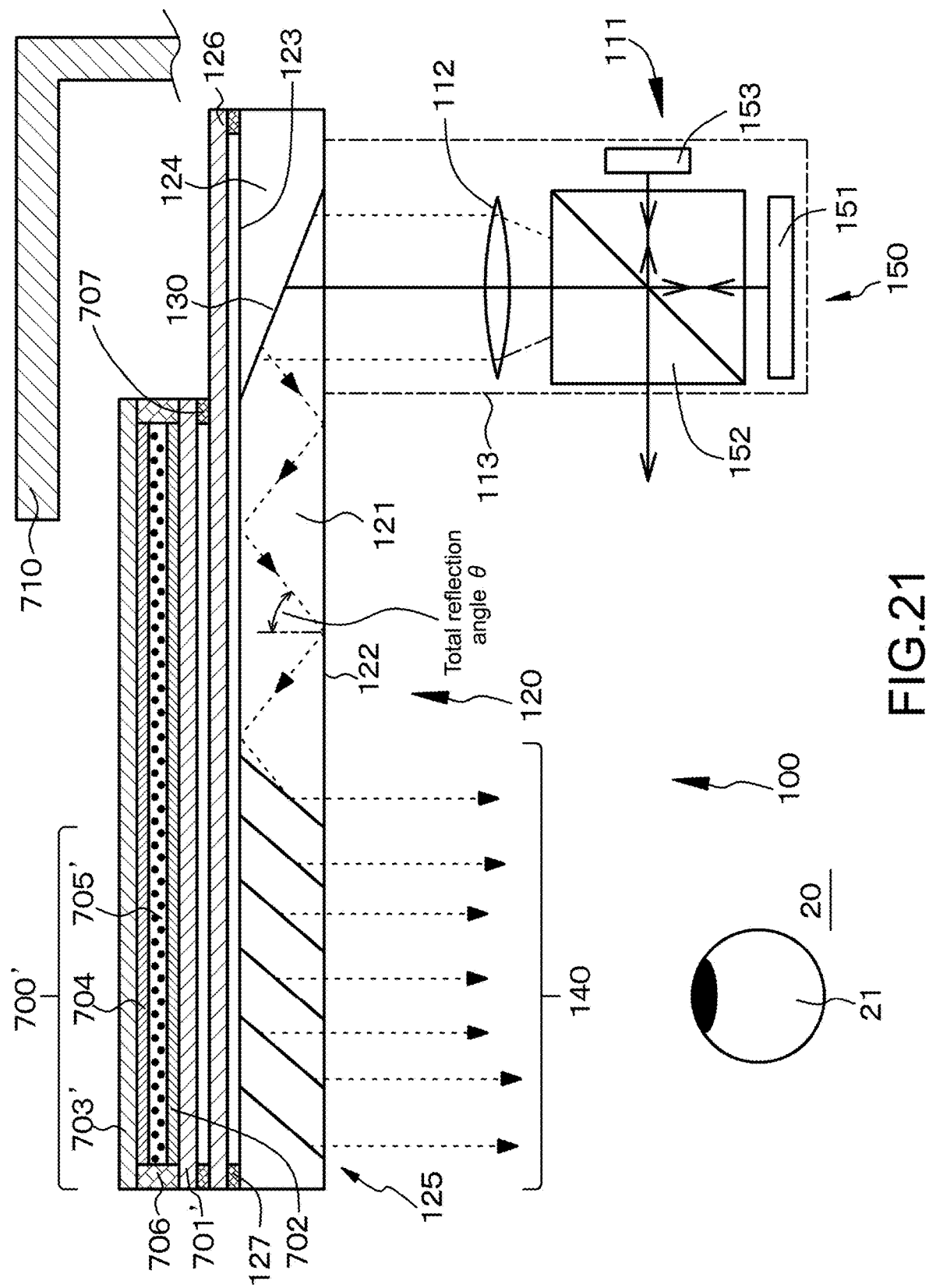
FIG. 21 is a conceptual diagram of an image display device in a display apparatus of Embodiment 11.

Embodiment 11 is a modification of Embodiments 1 to 10. In Embodiments 1 to 10, the light-transmission control material layer 705 is formed of a liquid crystal material layer. Meanwhile, as shown in a conceptual diagram of FIG. 21, in a dimming device 700' in a display apparatus of Embodiment 11, a light-transmission control material layer 705' is an optical shutter formed of an inorganic EL material layer. Herein, the inorganic EL material layer is made of tungstic oxide ($WO_3$). Also in the dimming device 700', a first substrate 701' and a second substrate 703' are each a transparent glass substrate such as soda lime glass or super white glass, and the second substrate 703' is made thinner than the first substrate 701'. Specifically, the second substrate 703' is formed with the thickness of 0.2 mm, and the first substrate 701' is formed with the thickness of 0.4 mm.

Except for the above, the display apparatus of Embodiment 11 has the same structure and configuration as the display apparatuses of Embodiments 8 to 10, and thus detailed description thereof will be omitted. It should be noted that the first substrate 701' in the dimming device 700' is bonded to the protection member 126 using the adhesive 707 similarly to Embodiment 8.

[Embodiment 12]

Figure 22:
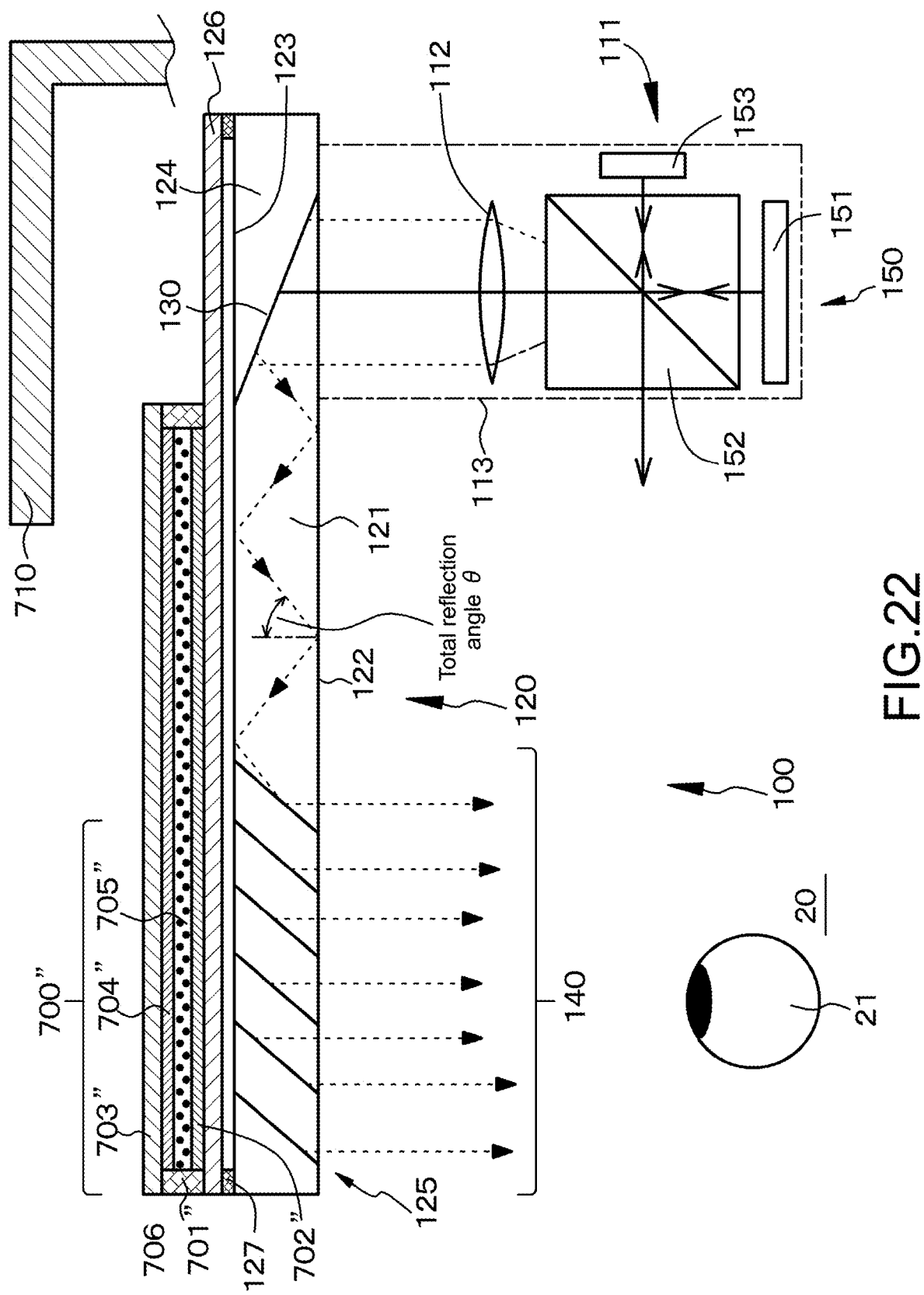
FIG. 22 is a conceptual diagram of an image display device in a display apparatus of Embodiment 12.

Embodiment 12 relates to the display apparatus according to the first embodiment of the present disclosure and is a modification of Embodiment 11. As shown in a conceptual diagram of FIG. 22, in a display apparatus of Embodiment 12, a dimming device 700'' includes a first substrate 701'' and a second substrate 703'', the first substrate 701'' being opposed to the light guide unit 120, the second substrate 703'' being opposed to the first substrate 701'', an electrode 702'' and an electrode 704'' provided to the first substrate 701'' and the second substrate 703'', respectively, and a light-transmission control material layer 705'' sealed between the first substrate 701'' and the second substrate 703''. The first substrate 701'' also serves as a constituent member (specifically the protection member 126) of the light guide unit 120. In other words, the first substrate 701'' and the protection member 126 are one specific member, and are for shared use.

As described above, in Embodiment 12, the first substrate 701'' that forms the dimming device 700'' also serves as a constituent member (the protection member 126) of the light guide unit 120. This reduces the total weight of the display apparatus so that this does not give discomfort to a user of the display apparatus.

Except for the above, the display apparatus of Embodiment 12 has the same structure and configuration as the display apparatus of Embodiment 11, and thus detailed description thereof will be omitted. Moreover, the light shielding member in the display apparatus of Embodiment 12 has the same structure and configuration as the dimming device in each of the display apparatuses of Embodiments 8 to 10, and thus detailed description thereof will be omitted.

[Embodiment 13]

Figure 23:
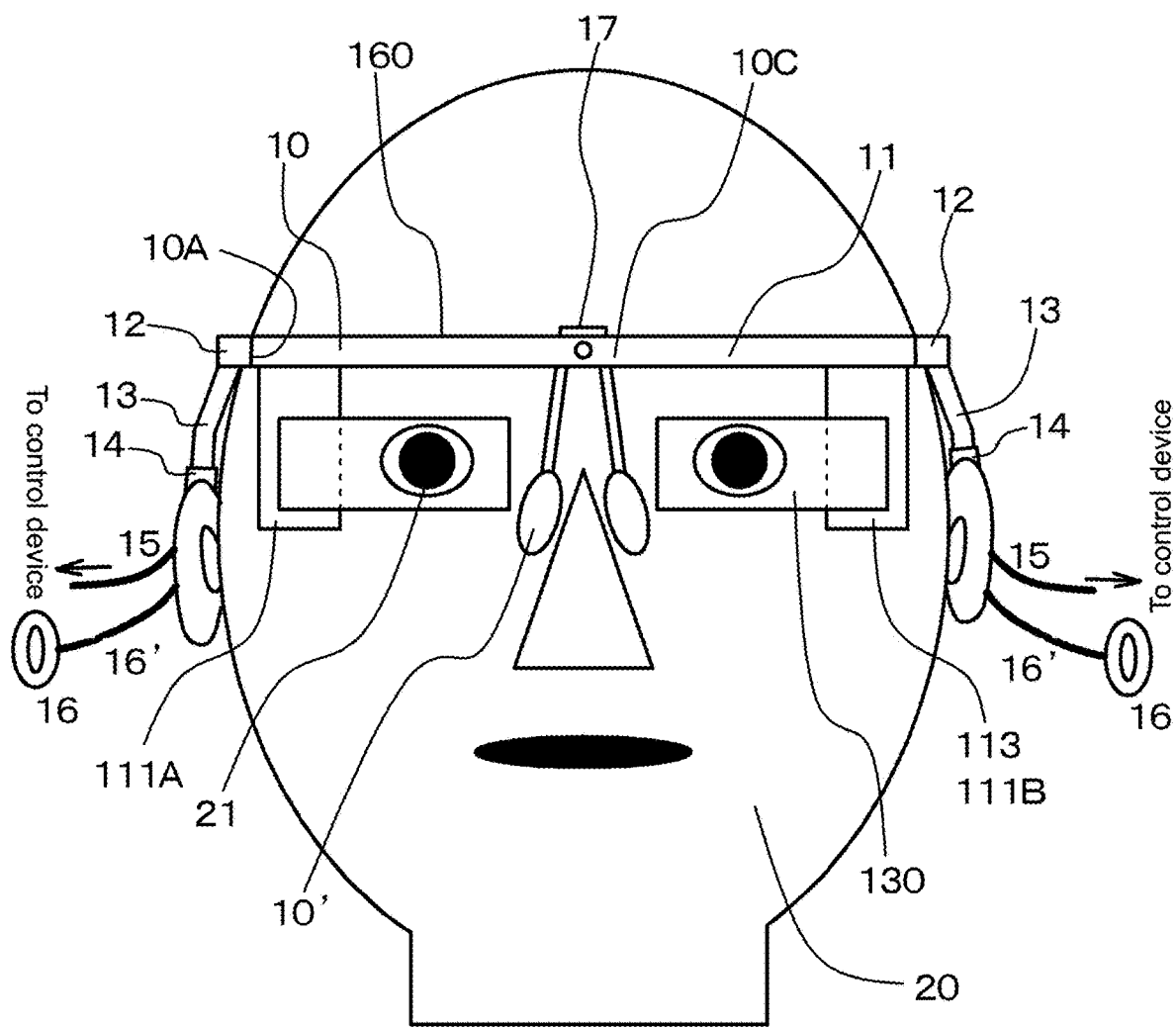
FIG. 23 is a schematic diagram of a display apparatus of Embodiment 13 when viewed from the front.
Figure 24:
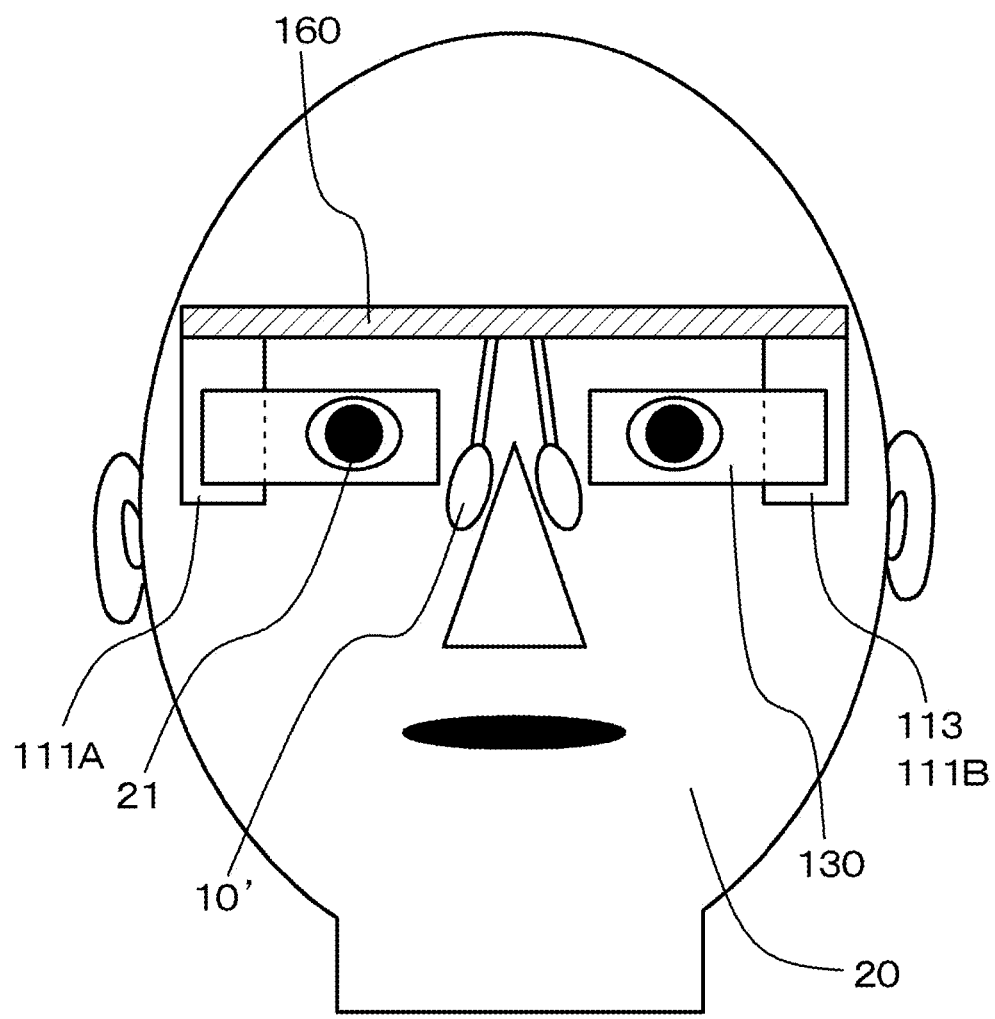
FIG. 24 is a schematic diagram of the display apparatus of Embodiment 13 (in a state assuming that a frame is removed) when viewed from the front.
Figure 25:
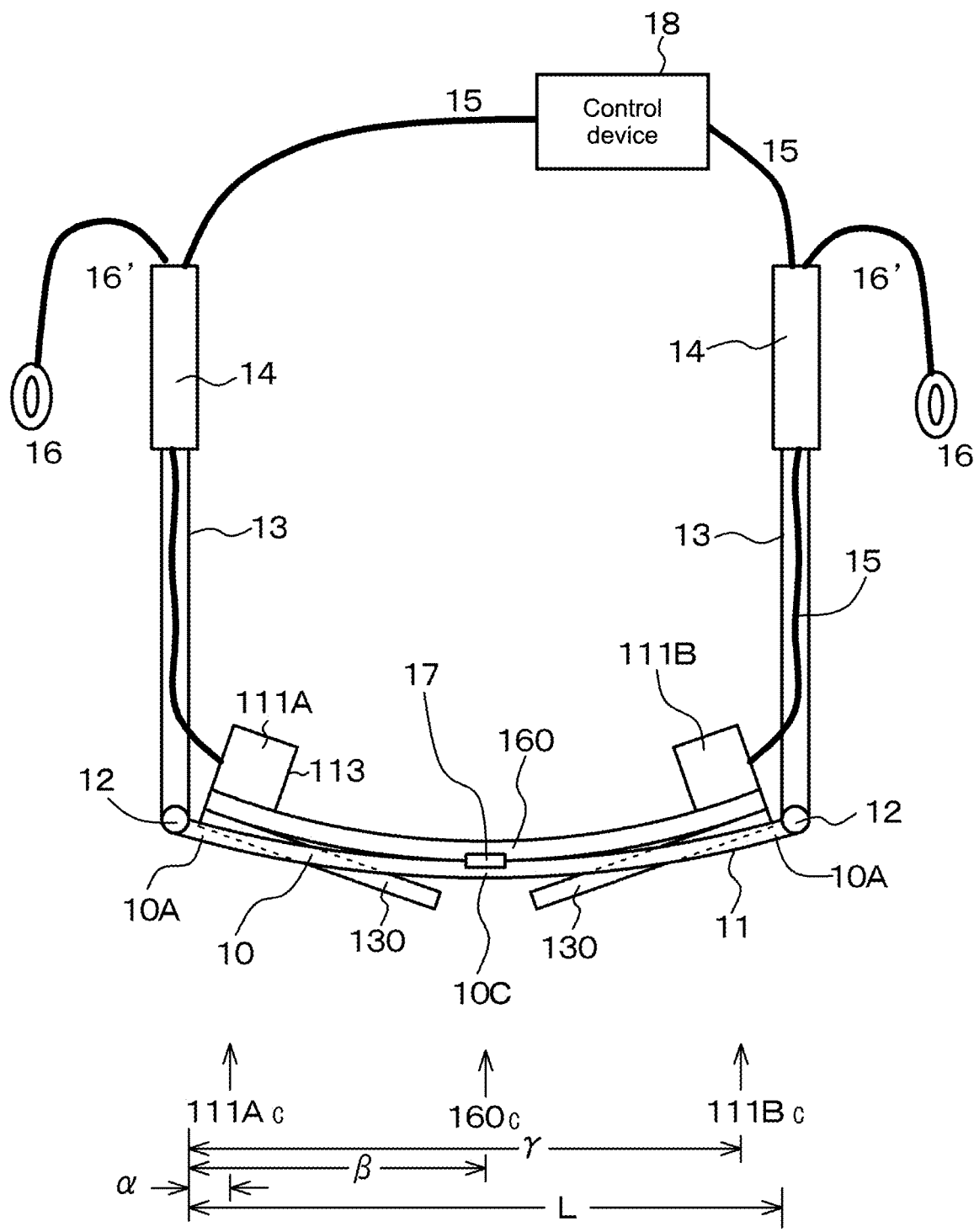
FIG. 25 is a schematic diagram of the display apparatus of Embodiment 13 when viewed from above.
Figure 26:
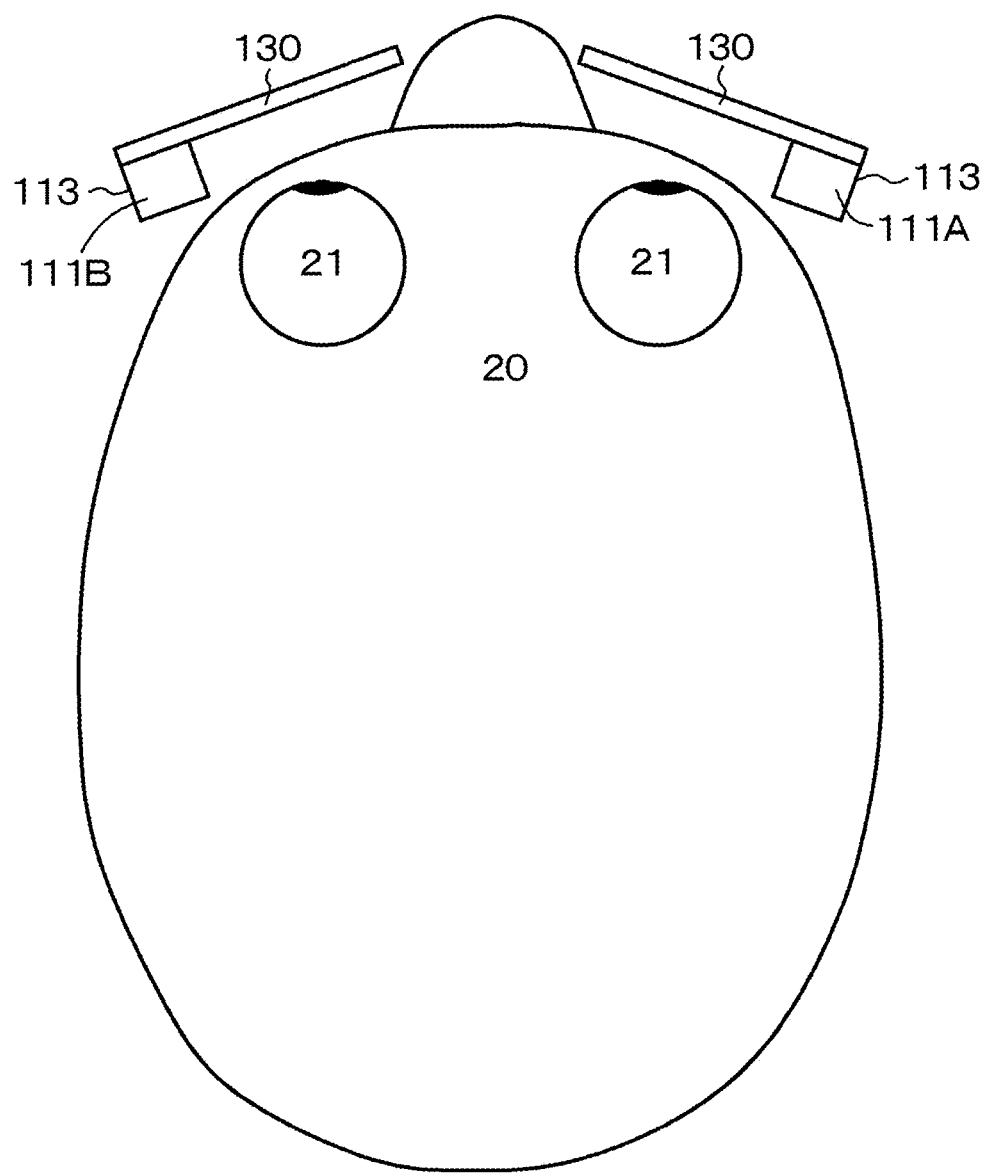
FIG. 26 is a diagram showing a state where the display device of Embodiment 13 is mounted onto the head of an observer when viewed from above (showing only the image display devices and omitting the illustration of the frame)

Embodiment 13 is a modification of Embodiments 1 to 12. FIG. 23 is a schematic diagram of a head mounted display of Embodiment 13 when viewed from the front. FIG. 24 is a schematic diagram of the head mounted display of Embodiment 13 (in a state assuming that a frame is removed) when viewed from the front. Further, FIG. 25 is a schematic diagram of the head mounted display of Embodiment 13 when viewed from above. FIG. 26 is a diagram showing a state where the head mounted display of Embodiment 13 is mounted onto the head of an observer 20 when viewed from above. It should be noted that FIG. 26 shows only the image display devices and the illustration of the frame is omitted for convenience sake. Additionally, in the following description, the image display device is typified by the image display device 100, but needless to say, the image display device 200, 300, 400, or 500 can be applied to the image display device. In Embodiments 13 and 14, the illustration of the dimming device 700 is omitted.

The head mounted display of Embodiment 13 further includes a connection member 160 that connects the two image display devices 100. The connection member 160 is attached to one side of a frame 10, which faces the observer, at a central part 10C located between two pupils 21 of the observer 20 (i.e., attached between the observer 20 and the frame 10), with use of screws (not shown), for example.

Moreover, a projected image of the connection member 160 is included in a projected image of the frame 10. In other words, when the head mounted display is viewed from the front of the observer 20, the connection member 160 is hidden behind the frame 10, and the connection member 160 is not visually recognized. Additionally, the two image display devices 100 are connected to each other with the connection member 160, but specifically, the image forming units 111A and 111B are stored in respective casings 113, and the casings 113 are attached to both ends of the connection member 160 such that the mounting state can be adjusted. The image forming units 111A and 111B are located on the outside in relation to the pupils 21 of the observer 20. Specifically, the following expressions are satisfied:

$\alpha=0.1*L;$ $\beta=0.5*L;$ and $\gamma=0.9*L,$ where a distance from the center $111A_C$ of the mounting portion of one image forming unit 111A to one end of the frame 10 (an endpiece on one side) is represented by α, a distance from the center $160_C$ of the connection member 160 to the one end of the frame 10 (the endpiece on the one side) is represented by β, a distance from the center $111B_C$ of the mounting portion of the other image forming unit 111B to the one end of the frame 10 (the endpiece on the one side) is represented by γ, and the length of the frame 10 is represented by L.

The mounting of the image forming units (specifically, image forming units 111A and 111B) to both ends of the connection member 160 is specifically performed as follows, for example: three through-holes (not shown) are provided at three positions of each of the ends of the connection member; tapped hole portions (screw-engagement portions (not shown)) corresponding to the through-holes are provided to the image forming units 111A and 111B; and screws (not shown) are inserted into the respective through-holes and screwed into the hole portions provided to the image forming units 111A and 111B. A spring is inserted in advance between each screw and a corresponding hole portion. In such a manner, the mounting state of the image forming units (inclination of the image forming units with respect to the connection member) can be adjusted based on the fastening state of the screws. After the mounting, the screws are hidden by caps (not shown). It should be noted that in FIGS. 24 and 28, to clearly specify the connection members 160 and 170, the connection members 160 and 170 are hatched. The connection member 160 is attached to the central part 10C of the frame 10 that is located between the two pupils 21 of the observer 20. The central part 10C corresponds to the bridge portion in normal eyeglasses. Further, nose pads 10' are attached to the side of the connection member 160, which faces the observer 20. It should be noted that in FIGS. 25 and 29, the illustration of the nose pads 10' is omitted. The frame 10 and the connection member 160 are made of metal or plastic, and the shape of the connection member 160 is a curved bar-like shape.

In such a manner, in the head mounted display (HMD) of Embodiment 13, the connection member 160 connects the two image display devices 100, and the connection member 160 is attached to the central part 10C of the frame 10 that is located between the two pupils 21 of the observer 20. In other words, each of the image display devices 100 is not directly attached to the frame 10. So, when the frame 10 is mounted onto the head of the observer 20, the temple portions 13 are expanded outwards. As a result, even if the frame 10 is deformed, such a deformation of the frame 10 does not cause a displacement (positional change) of the image forming unit 111A or 111B, or causes little displacement, if any. For that reason, the angle of convergence of left and right images can be certainly prevented from being changed. Moreover, since it is unnecessary to enhance the rigidity of the front portion 11 of the frame 10, it is possible to avoid causing an increase in weight of the frame 10, lowering in design quality, and a rise in cost. Besides, since the image display devices 100 are not attached directly to the eyeglasses-type frame 10, the design, color, and the like of the frame 10 can be freely selected according to the observer's preference, and thus there are few restrictions imposed on the design of the frame 10 and the degree of freedom on a design basis is high. In addition, when the head mounted display is viewed from the front of the observer, the connection member 160 is hidden behind the frame 10. So, a high design quality can be given to the head mounted display.

[Embodiment 14]

Figure 27:
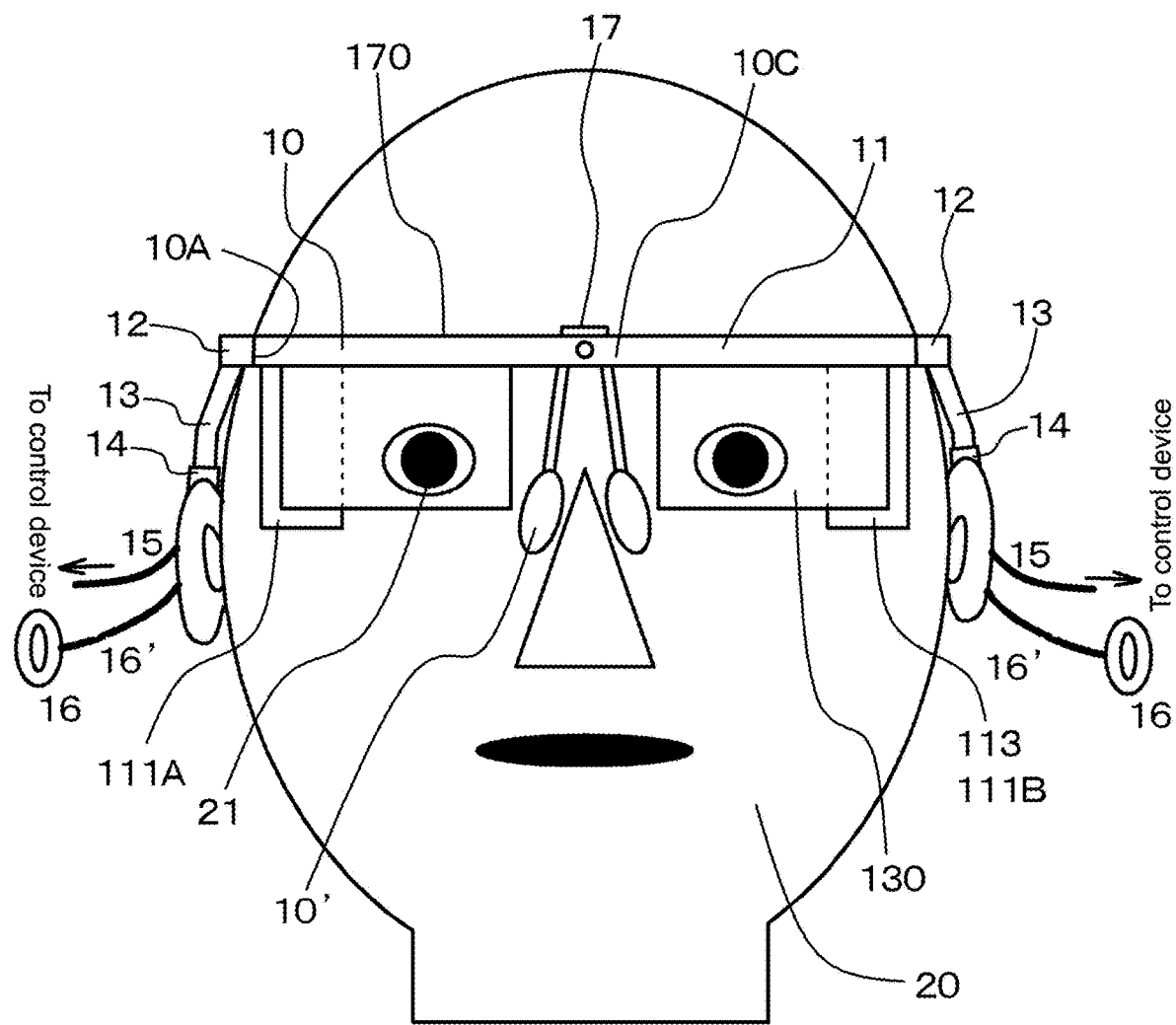
FIG. 27 is a schematic diagram of a display apparatus of Embodiment 14 when viewed from the front.
Figure 28:
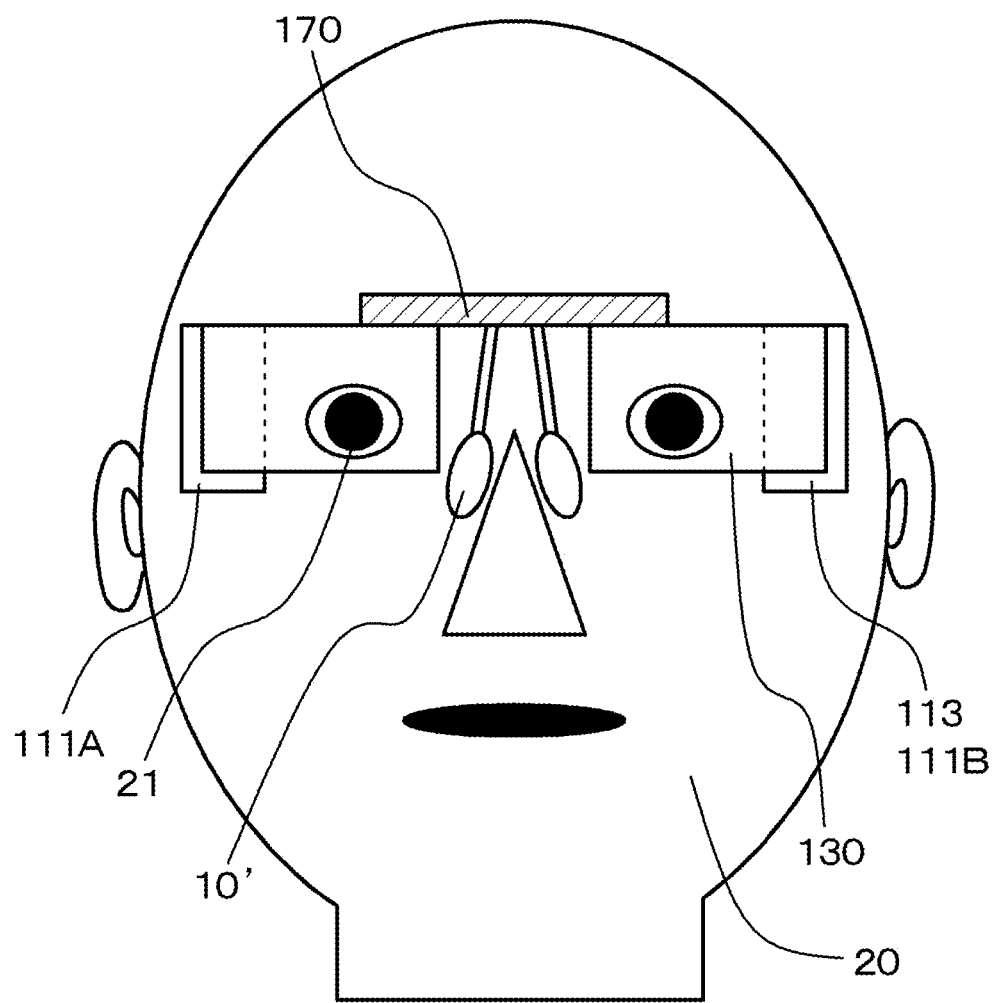
FIG. 28 is a schematic diagram of the display apparatus of Embodiment 14 (in a state assuming that a frame is removed) when viewed from the front.
Figure 29:
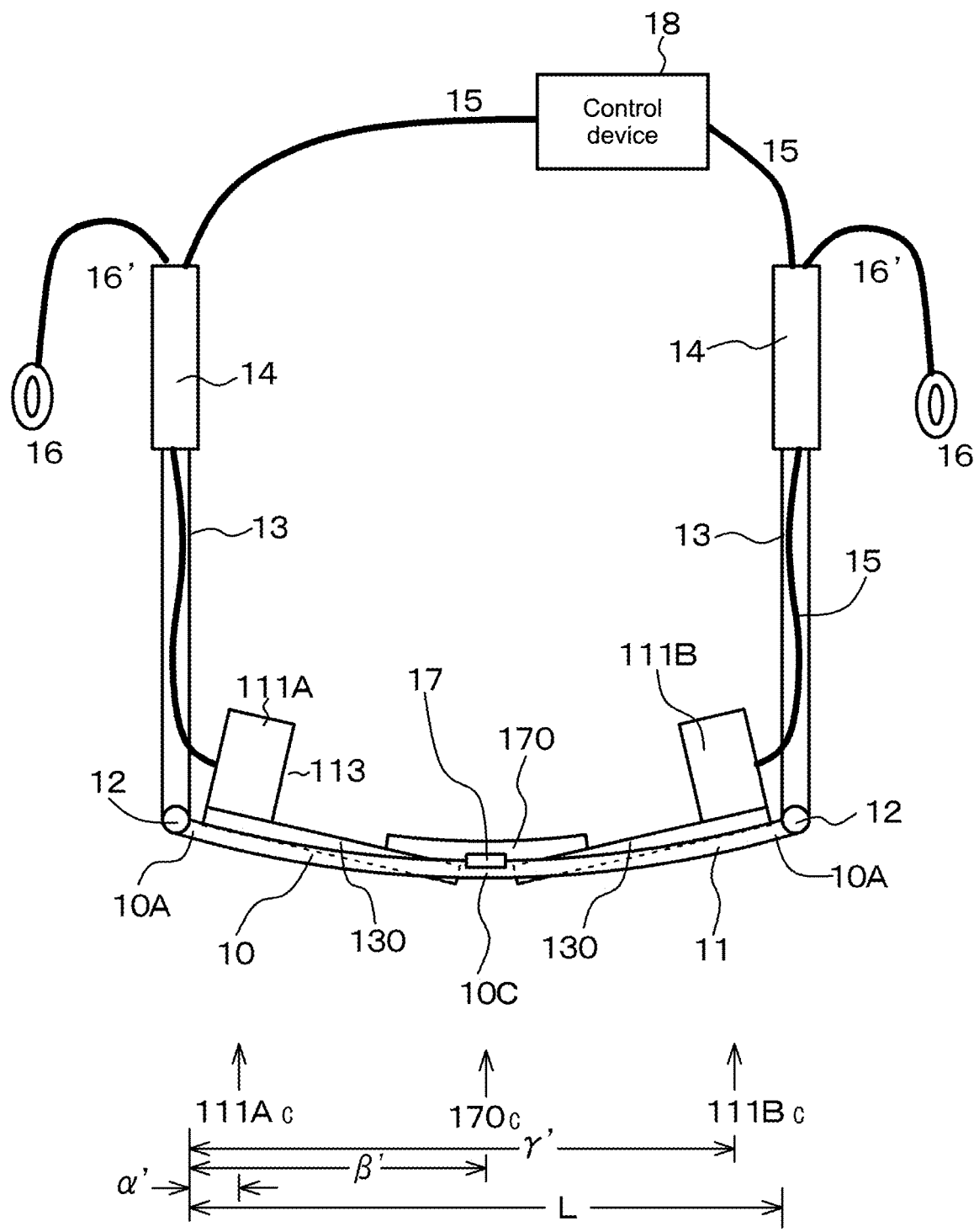
FIG. 29 is a schematic diagram of the display apparatus of Embodiment 14 when viewed from above.

Embodiment 14 is a modification of Embodiment 13. FIG. 27 is a schematic diagram of a head mounted display of Embodiment 14 when viewed from the front, and FIG. 28 is another schematic diagram of the head mounted display of Embodiment 14 (in a state assuming that a frame is removed) when viewed from the front. FIG. 29 is a schematic diagram of the head mounted display of Embodiment 14 when viewed from above.

In the head mounted display of Embodiment 14, unlike in Embodiment 13, a bar-like connection member 170 connects the two light guide units 120 instead of connecting the two image forming units 111A and 111B. It should be noted that the two light guide units 120 may be integrally produced and the connection member 170 may be attached to such a light guide unit 120 integrally produced.

Also in the head mounted display of Embodiment 14, the connection member 170 is attached to the frame 10 at a central part 10C located between two pupils 21 of the observer 20 with use of screws, for example. The image forming units 111 are located on the outside in relation to the pupils 21 of the observer 20. It should be noted that each image forming unit 111 is attached to the end of the light guide unit 120. Assuming that a distance from the center $170_C$ of the connection member 170 to one end of the frame 10 is β and the length of the frame 10 is L, the following expression is satisfied: 13=0.5*L. It should be noted that values of α' and γ' in Embodiment 14 are the same as the values of α and γ in Embodiment 13.

In Embodiment 14, the frame 10 and the image display devices have the same structures and configurations as the frame 10 and the image display devices described in Embodiment 13, and thus detailed description thereof will be omitted. The head mounted display of Embodiment 14 also has substantially the same structure and configuration as the head mounted display of Embodiment 13 except for the differences described above, and thus detailed description thereof will be omitted.

[Embodiment 15]

Figure 31:
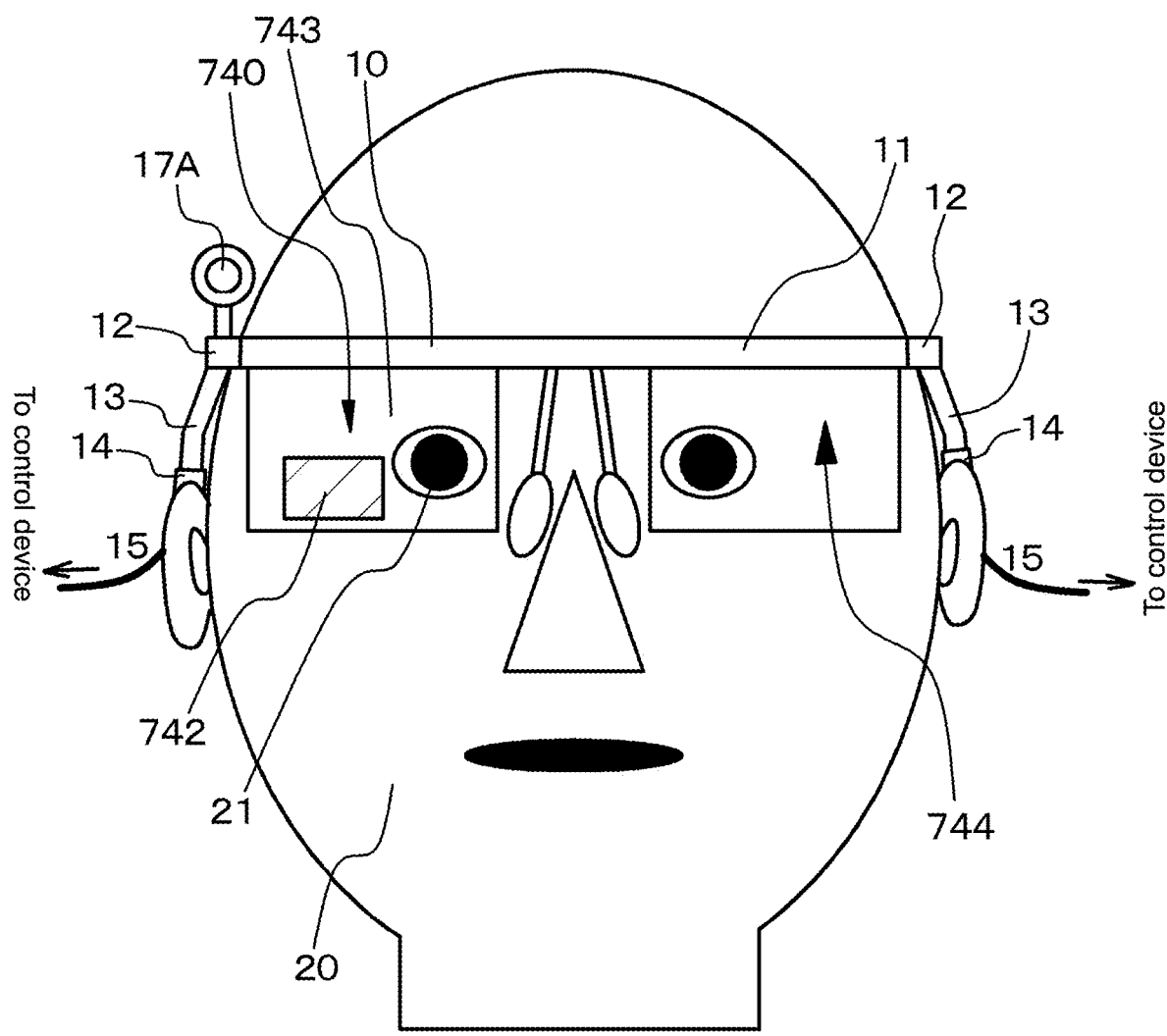
FIG. 31 is a schematic diagram of the optical apparatus and the like of Embodiment 15 when viewed from the front.

Embodiment 15 relates to the optical apparatus according to the first embodiment of the present disclosure. FIGS. 30 and 31 are each a schematic diagram of an optical apparatus and the like of Embodiment 15 when viewed from the front.

The optical apparatus of Embodiment 15 includes (i) a frame 10 mounted onto a head of an observer 20, (ii) an imaging device 17A attached to the frame 10, and (iii) a dimming device 740 attached to the frame 10 and configured to adjust the amount of outside light that comes from the outside. A spatial area imaged by the imaging device 17A is displayed on the dimming device 740. It should be noted that areas 741 and 742 are areas each corresponding to the spatial area that is imaged by the imaging device 17A and displayed on the dimming device 740. The dimming device 740 is disposed on the right-eye side of the observer 20, for example. A transparent lens 744 is attached to the frame 10 on the left-eye side of the observer 20, for example.

Herein, in the example shown in FIG. 30, the outer edge of the spatial area imaged by the imaging device 17A is displayed in the form of a frame 741 in the dimming device. Alternatively, as shown in FIG. 31, light transmittance of the area 742 of the dimming device that corresponds to the spatial area imaged by the imaging device 17A may be made lower or higher than light transmittance of an area 743 of the dimming device that corresponds to the outside of the spatial area imaged by the imaging device 17A.

The optical apparatus of Embodiment 15 may further include a dimming-device-controlling device, and the positions of the areas 741 and 742 of the dimming device that each correspond to the spatial area imaged by the imaging device may be corrected by the dimming-device-controlling device. Specifically, when the optical apparatus of Embodiment 15 includes a mobile phone or a smartphone, for example, or when the optical apparatus is combined with a mobile phone, a smartphone, or a personal computer, the spatial area imaged by the imaging device 17A may be displayed on the mobile phone, the smartphone, or the personal computer. In the case where there is a difference between the spatial area displayed on the mobile phone, the smartphone, or the personal computer and the area 741 or 742 of the dimming device that corresponds to the spatial area imaged by the imaging device 17A, the area 741 or 742 of the dimming device that corresponds to the spatial area imaged by the imaging device 17A is moved/turned or enlarged/contracted using the dimming-device-controlling device, which can be substituted by the mobile phone, the smartphone, or the personal computer. Thus, the difference between the spatial area displayed on the mobile phone, the smartphone, or the personal computer and the area 741 or 742 of the dimming device that corresponds to the spatial area imaged by the imaging device 17A may be eliminated.

In the optical apparatus of Embodiment 15, the spatial area imaged by the imaging device is displayed on the dimming device. This allows the observer to easily and reliably recognize which part of the outside is imaged by the imaging device.

The display apparatuses and the optical apparatuses described in Embodiments 1 to 14 are each applicable to the optical apparatus of Embodiment 15. Further, the optical apparatus according to the second embodiment of the present disclosure is also applicable to the optical apparatus of Embodiment 15. In other words, the optical apparatus may include a receiving device that is similar to that described in Embodiment 1, and based on a signal received by the receiving device, light transmittance of the area 741 or 742 of the dimming device 740 may be changed, for example.

Hereinabove, the present disclosure has been described based on the desirable embodiments, but the present disclosure is not limited to those embodiments. The configurations and structures of the display apparatuses (head mounted displays) and the image display devices described in the above embodiments are merely exemplary ones and can be appropriately modified. For example, a surface relief hologram (see U.S. Patent Application No. 20040062505A1) may be disposed on a light guide plate. In the light guide unit, the diffraction grating element may be formed of the transmissive diffraction grating element. Alternatively, the first or second deflection unit may be formed of a reflective diffraction grating element, and the remaining one may be formed of a transmissive diffraction grating element. Alternatively, the diffraction grating element may be a reflective blazed diffraction grating element.

The dimming device may be detachably provided in an area from which the light guide unit emits light. For detachably providing the dimming device, the dimming device may be attached to the light guide unit using a screw made of transparent plastic, for example. The dimming device may be then connected to a control circuit via connectors and wires. This control circuit is for controlling the light transmittance of the dimming device, and is provided in the control device 18 that controls the image forming unit, for example.

In some cases, an optical shutter may be used by application of electrodeposition/dissociation that occurs in response to the reversible oxidation reduction of metal, e.g., silver particles. Specifically, $Ag^+$ (silver) and $I^-$ (iodine) are dissolved in advance in an organic solvent, and Ag is precipitated by reduction of $Ag^+$ through appropriate voltage application to electrodes so that the dimming device is reduced in light transmittance. On the other hand, Ag is oxidized and dissolved as $Ag^+$, so that the dimming device is increased in light transmittance. Alternatively, in some cases, an optical shutter may be used by application of color change of substance that occurs in response to the oxidation reduction of an electrochromic material. Specifically, first and second electrodes are provided, and first and second electrochromic material layers are sandwiched between the first and second electrodes. The first electrochromic material layer is formed of a prussian blue metal complex, for example, and the second electrochromic material layer is formed of a nickel-substituted prussian blue metal complex, for example. In other cases, an optical shutter may be used which controls the light transmittance by electrowetting. Specifically, first and second electrodes are provided, and a gap between the first and second electrodes is filled with insulating first liquid and conductive second liquid. By voltage application between the first and second electrodes, the interface between the first liquid and the second liquid is changed in shape, e.g., from being flat to being bent, thereby controlling the light transmittance.

In the embodiments, the image forming unit 111 or 211 is described as one that displays a monochrome (for example, green) image, but the image forming unit 111 or 211 can also display a color image. In this case, the light source only needs to be formed of a light source that outputs red light, green light, and blue light, for example. Specifically, for example, red light, green light, and blue light that are output from a red light-emitting element, a green light-emitting element, and a blue light-emitting element, respectively, may be used to achieve color mixture and uniformity in luminance by using a light pipe, to thus obtain white light. As the image forming unit or the light source formed of the light-emitting elements and the light valve, the following configuration may also be exemplified other than the combination of a backlight that emits white light as a whole and a liquid crystal display including red, green, and blue light-emitting pixels.

Figure 32:
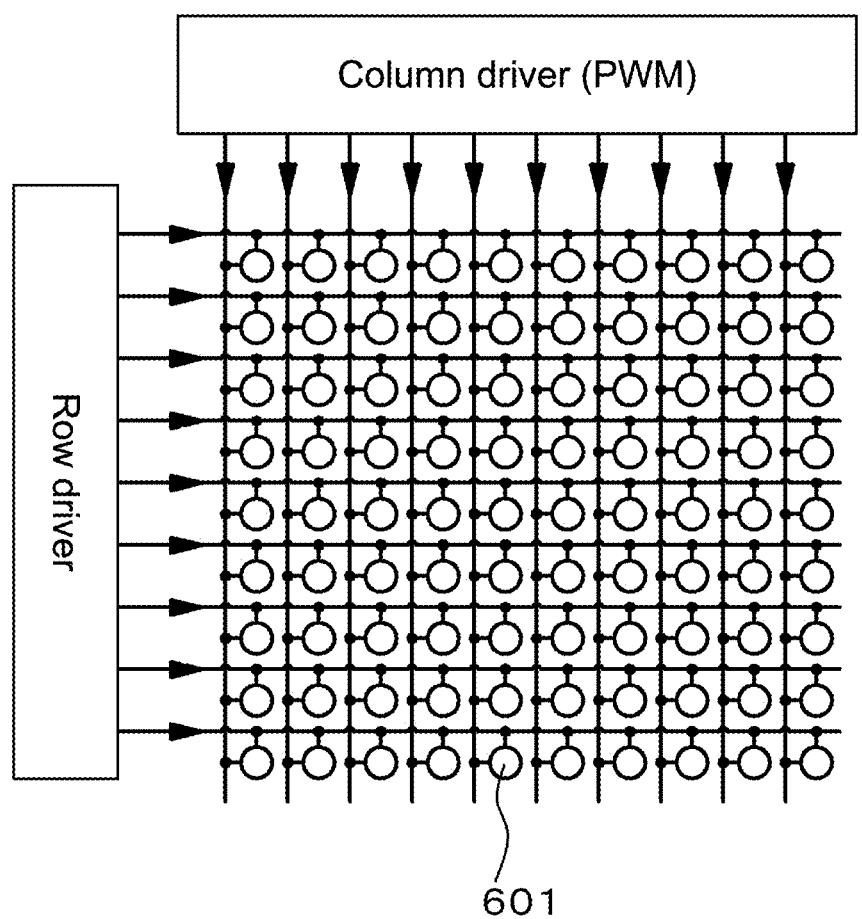
FIG. 32 is a conceptual diagram of a modification of an image forming unit.

As a modification of the image forming unit, for example, as shown in a conceptual diagram of FIG. 32, it is possible to provide an active matrix type image forming unit including a light-emitting panel on which light-emitting elements 601 formed of semiconductor laser elements are arranged in a two-dimensional matrix. In the active matrix type image forming unit, the light-emitting/non-light-emitting states of the light-emitting elements 601 is controlled and the light-emitting states of the light-emitting elements 601 are directly observed, and thus an image is displayed. Light output from this image forming unit is input to the light guide plate 121 via the collimating optical system 112. Also in the following description, the light-emitting element is formed of the semiconductor laser element.

Figure 33:
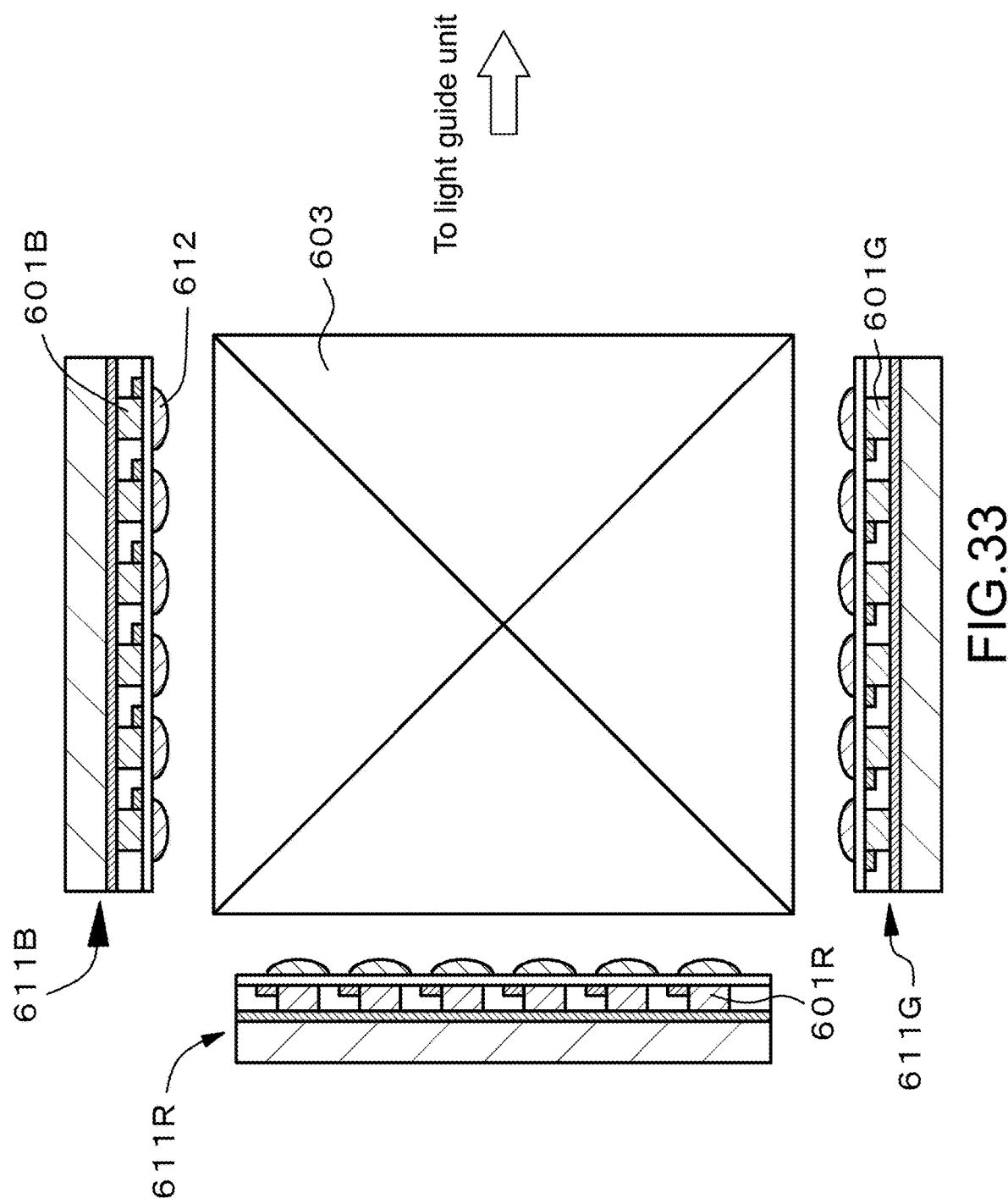
FIG. 33 is a conceptual diagram of another modification of the image forming unit.

Alternatively, as shown in a conceptual diagram of FIG. 33, there may be provided an image forming unit for color display, including (α) a red light-emitting panel 611R on which red light-emitting elements 601R that emit red light are arranged in a two-dimensional matrix, (β) a green light-emitting panel 611G on which green light-emitting elements 601G that emit green light are arranged in a two-dimensional matrix, (γ) a blue light-emitting panel 611B on which blue light-emitting elements 601B that emit blue light are arranged in a two-dimensional matrix, and (δ) a unit for collecting light beams output from the respective red light-emitting panel 611R, green light-emitting panel 611G, and blue light-emitting panel 611B into one optical path (for example, dichroic prism 603), in which the light-emitting/non-light-emitting states of the red light-emitting elements 601R, the green light-emitting elements 601G, and the blue light-emitting elements 601B are controlled. The light output from the image forming unit is also input to the light guide plate 121 via the collimating optical system 112. It should be noted that microlenses 612 are configured to collect the light beams output from the light-emitting elements.

Figure 34:
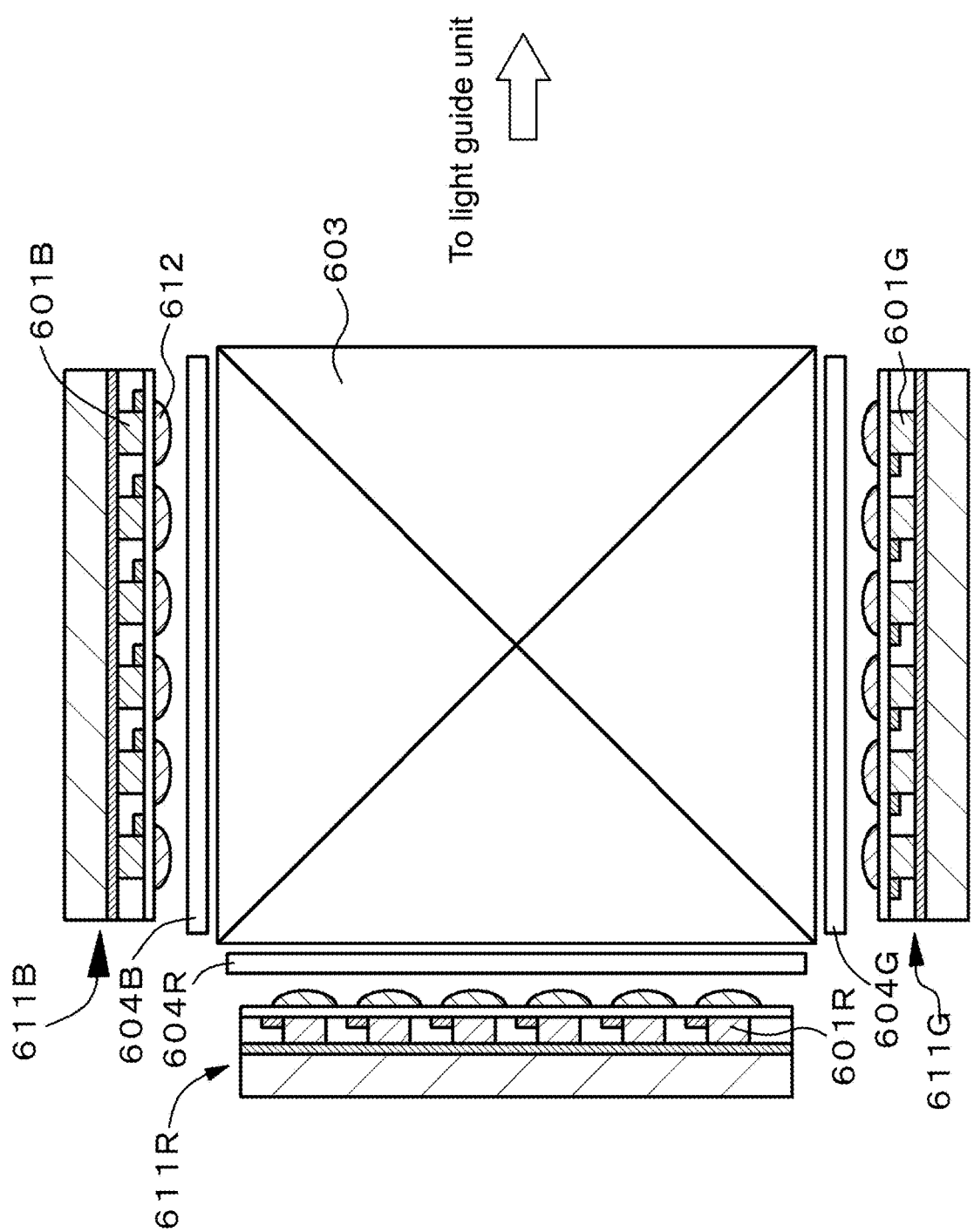
FIG. 34 is a conceptual diagram of still another modification of the image forming unit.

Alternatively, there may be provided an image forming unit including, as shown in a conceptual diagram of FIG. 34, light-emitting panels 611R, 611G, and 611B on which light-emitting elements 601R, 601G, and 601B are arranged in a two-dimensional matrix, respectively. The passages/non-passages of light beams output from the light-emitting panels 611R, 611G, and 611B are controlled by light passage control devices 604R, 604G, and 604B, and the light beams are input to a dichroic prism 603. The optical paths of those light beams are collected into one optical path and input to the light guide plate 121 via the collimating optical system 112.

Figure 35:
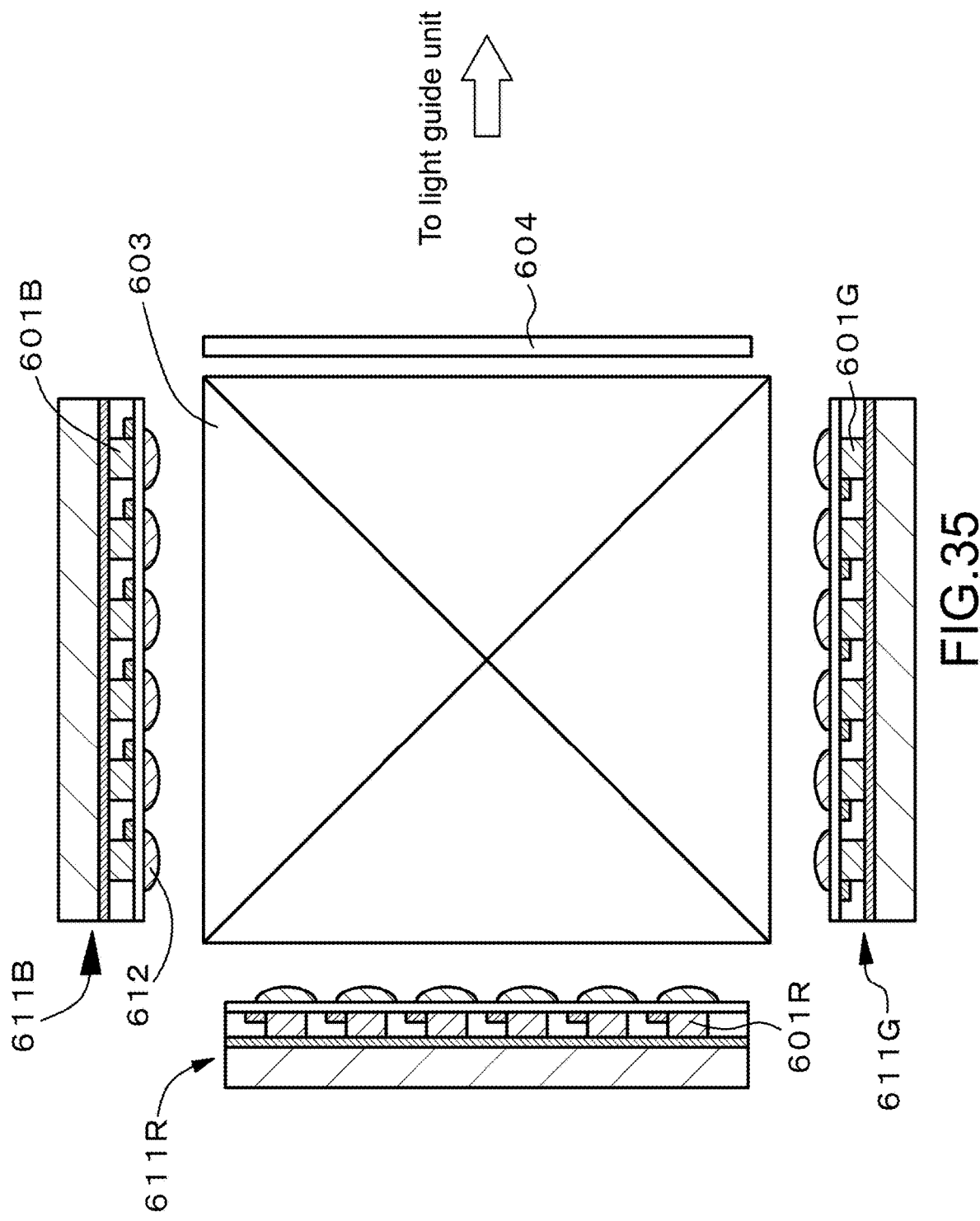
FIG. 35 is a conceptual diagram of still another modification of the image forming unit.

Alternatively, there may be provided an image forming unit including, as shown in a conceptual diagram of FIG. 35, light-emitting panels 611R, 611G, and 611B on which light-emitting elements 601R, 601G, and 601B are arranged in a two-dimensional matrix, respectively. Light beams output from the light-emitting panels 611R, 611G, and 611B are input to a dichroic prism 603, and the optical paths of those light beams are collected into one optical path. The passages/non-passages of the light beams output from the dichroic prism 603 are controlled by a light passage control device 604, and the light beams are input to the light guide plate 121 via the collimating optical system 112.

Figure 36:
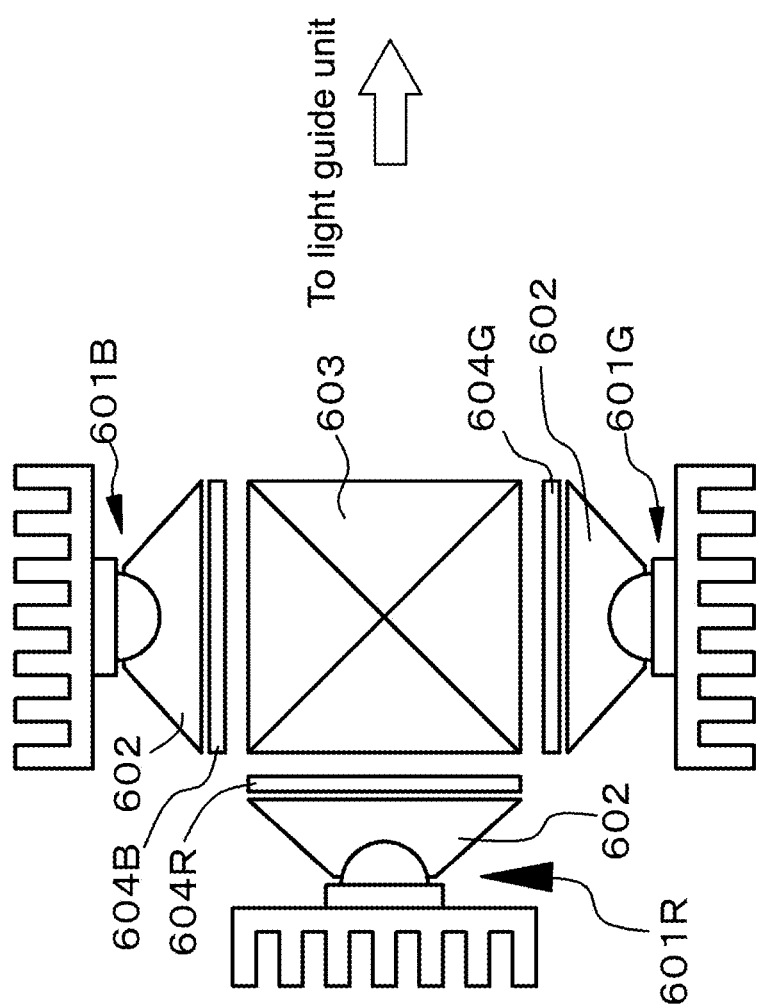
FIG. 36 is a conceptual diagram of still another modification of the image forming unit.

Alternatively, as shown in FIG. 36, there may be provided an image forming unit including: a light-emitting element 601R that emits red light; a light passage control device (for example, liquid crystal display 604R) as a kind of light valve, configured to control the passage/non-passage of output light output from the light-emitting element 601R that emits red light; a light-emitting element 601G that emits green light; a light passage control device (for example, liquid crystal display 604G) as a kind of light valve, configured to control the passage/non-passage of output light output from the light-emitting element 601G that emits green light; a light-emitting element 601B that emits blue light; a light passage control device (for example, liquid crystal display 604B) as a kind of light valve, configured to control the passage/non-passage of output light output from the light-emitting element 601B that emits green light; light leading members 602 configured to lead the light beams output from the light-emitting elements 601R, 601G, and 601B; and a unit for collecting the light beams into one optical path (for example, dichroic prism 603). Those light beams output from the dichroic prism 603 are input to the light guide plate 121 via the collimating optical system 112.

It should be noted that the present disclosure can have the following configurations as well.

[A01] (Display Apparatus)
A display apparatus, including:
(i) a frame mounted onto a head of an observer;
(ii) an image display device attached to the frame; and
(iii) a dimming device configured to adjust the amount of outside light that comes from the outside, light transmittance of a partial area of the dimming device being changed based on a signal for displaying an image on the image display device.

[A02] The display apparatus according to [A01], in which the image display device including
(A) an image forming unit, and
(B) a light guide unit configured to input, guide, and output light that is output from the image forming unit.

[A03] The display apparatus according to [A02], in which the light guide unit including
(a) a light guide plate configured to output light after input light is propagated inside the light guide plate by total reflection,
(b) a first deflection unit configured to deflect at least part of the light input to the light guide plate, to totally reflect the light input to the light guide plate inside the light guide plate, and
(c) a second deflection unit configured to deflect the light propagated inside the light guide plate by total reflection, to output, from the light guide plate, the light propagated inside the light guide plate by total reflection.

[A04] The display apparatus according to any one of [A01] to [A03], in which
the signal for displaying the image on the image display device is received from the outside.

[A05] The display apparatus according to [A04], further including a communication unit.

[A06] The display apparatus according to any one of [A01] to [A03], in which
the image display device is configured to store the signal for displaying the image on the image display device.

[A07] The display apparatus according to any one of [A01] to [A06], further including a sensor configured to measure brightness in an outside environment, in which
the light transmittance of the partial area of the dimming device is further changed based on a measurement result of the brightness in the outside environment by the sensor.

[A08] The display apparatus according to any one of [A01] to [A07], in which
the dimming device is attached to the image display device.

[A09] The display apparatus according to any one of [A01] to [A07], in which
the dimming device is attached to the frame.

[B01] (Optical Apparatus: First Embodiment)
An optical apparatus, comprising:
(i) a frame mounted onto a head of an observer;
(ii) an imaging device attached to the frame; and
(iii) a dimming device attached to the frame and configured to adjust the amount of outside light that comes from the outside, a spatial area imaged by the imaging device being displayed on the dimming device.

[B02] The optical apparatus according to [B01], in which
the dimming device is configured to display an outer edge of the spatial area imaged by the imaging device in the form of a frame.

[B03] The optical apparatus according to [B01], in which
light transmittance of an area of the dimming device, the area corresponding to the spatial area imaged by the imaging device, is made lower than light transmittance of an area of the dimming device, the area corresponding to an outside of the spatial area imaged by the imaging device.

[B04] The optical apparatus according to [B01], in which
light transmittance of an area of the dimming device, the area corresponding to the spatial area imaged by the imaging device, is made higher than light transmittance of an area of the dimming device, the area corresponding to an outside of the spatial area imaged by the imaging device.

[B05] The optical apparatus according to any one of [B01] to [B04], further including a dimming-device-controlling device, the dimming-device-controlling device being configured to correct a position of an area of the dimming device, the area corresponding to the spatial area imaged by the imaging device.

[C01] (Optical Apparatus: Second Embodiment)
An optical apparatus, comprising:
(i) a frame mounted onto a head of an observer;
(ii) a receiving device; and
(iii) a dimming device attached to the frame and configured to adjust the amount of outside light that comes from the outside, light transmittance of the dimming device being changed based on a signal received by the receiving device.

It should be understood by those skilled in the art that various modifications, combinations, sub-combinations and alterations may occur depending on design requirements and other factors insofar as they are within the scope of the appended claims or the equivalents thereof.

What is claimed is:

1. An optical apparatus, comprising:
a mounting frame configured to be mounted onto a head of an observer;
an image display device configured to be attached to the mounting frame;
an imaging device configured to be attached to the mounting frame to acquire an image of a spatial area within a field of view of the observer;
a light dimming device configured to control the amount of outside light that comes from the outside to the field of view of the observer;
a controller configured to change light transmittance of at least a first region and a second region on the light dimming device based on a signal for displaying an image on the image display device, wherein the light transmittance of the first region is different from the light transmittance of the second region; and
a transmitted-light illumination measurement sensor configured to measure light that passes through the dimming device from the outside environment,
wherein the controller is configured to change a difference in light transmittance between the first region and the second region of the light dimming device in response to the signal for displaying the image on the image display device, before the image is displayed.

2. The optical apparatus according to claim 1, wherein the image display device includes
an image forming unit, and
a light guide unit to input, guide, and output light that is output from the image forming unit.

3. The optical apparatus according to claim 2, wherein the light guide unit includes
a light guide plate to output light after input light is propagated inside the light guide plate by total reflection,
a first deflection unit to deflect at least part of the light input to the light guide plate, to totally reflect the light input to the light guide plate inside the light guide plate, and
a second deflection unit to deflect the light propagated inside the light guide plate by total reflection, to output, from the light guide plate, the light propagated inside the light guide plate by total reflection.

4. The optical apparatus according to claim 1, wherein the signal for displaying the image on the image display device is received from the outside.

5. The optical apparatus according to claim 4, further comprising a communication unit.

6. The optical apparatus according to claim 1, wherein the image display device is configured to store the signal for displaying the image on the image display device.

7. The optical apparatus according to claim 1, further comprising a sensor configured to measure brightness in an outside environment, wherein
the light transmittance of a partial area of the dimming device is further changed based on a measurement result of the brightness in the outside environment by the sensor.

8. The optical apparatus according to claim 1, wherein the dimming device is attached to the image display device.

9. The optical apparatus according to claim 1, wherein the dimming device is attached to the mounting frame.

10. The optical apparatus according to claim 1, wherein the controller is configured to correct a position of an area of the dimming device, the area corresponding to the spatial area imaged by the imaging device.

11. The optical apparatus according to claim 1, further comprising:
a receiving device,
wherein the dimming device further adjusts the amount of outside light that comes from the outside to the field of view of the observer based on a signal received by the receiving device.

12. The optical apparatus according to claim 1, further comprising:
a receiving device,
the image display device displaying an image based on data acquired via the receiving device, and the dimming device further changing light transmittance of at least a third portion of the dimming device before the image display device displays the image.

13. The optical apparatus according to claim 1, wherein first and second regions of the dimming device are independently dimmable and wherein the second region of the dimming device surrounds the first region of the dimming device.

14. The optical apparatus according to claim 13, wherein the light transmittance of the first region of the dimming device corresponding to the spatial area imaged by the imaging device within the field of view of the observer is made higher than the light transmittance of the second region of the dimming device corresponding to a region outside of the spatial area imaged by the imaging device within the field of view of the observer.

15. The optical apparatus according to claim 1, wherein the controller generates a border in the light dimming device that indicates an outer edge of the spatial area imaged by the imaging device.

16. The optical apparatus according to claim 15, wherein the border comprises an area in the light dimming device in which an image frame is displayed around the spatial area imaged by the imaging device.

17. The optical apparatus according to claim 1, further comprising:

a protection member disposed between the light dimming device and the image display device.

18. The optical apparatus according to claim 17, wherein the protection member protects the image display device.

19. The optical apparatus according to claim 1, wherein the light dimming device includes a first substrate, a second substrate, a first electrode configured to be disposed on the first substrate, a second electrode configured to be disposed on the second substrate and a light-transmission control material layer between the first electrode and the second electrode.

20. The optical apparatus according to claim 19, wherein the first substrate and the protection member are one specific member, and for shared use.

21. The optical apparatus according to claim 1, wherein the transmitted-light illumination measurement sensor is disposed between the light dimming device and the observer and is disposed to face the light dimming device.

* * * * *